(12) United States Patent
Kitahara

(10) Patent No.: US 8,375,152 B2
(45) Date of Patent: Feb. 12, 2013

(54) CONTROLLER, DATA TRANSFER DEVICE, INFORMATION PROCESSING DEVICE, PROCESSOR, AND CONTROL METHOD OF INFORMATION PROCESSING DEVICE

(75) Inventor: Yoshihiro Kitahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/097,500

(22) Filed: Apr. 29, 2011

(65) Prior Publication Data

US 2011/0202696 A1    Aug. 18, 2011

Related U.S. Application Data

(63) Continuation of application No. PCT/JP2008/003216, filed on Nov. 6, 2008.

(51) Int. Cl.
*G06F 13/00* (2006.01)
*G06F 11/00* (2006.01)

(52) U.S. Cl. ............................................. 710/33; 714/46

(58) Field of Classification Search ..................... 710/33; 714/46
See application file for complete search history.

(56) References Cited

U.S. PATENT DOCUMENTS

| | | | |
|---|---|---|---|
| 5,386,551 A * | 1/1995 | Chikira et al. | 714/46 |
| 5,890,007 A | 3/1999 | Zinguuzi | |
| 5,918,069 A | 6/1999 | Matoba | |
| 6,011,791 A | 1/2000 | Okada et al. | |
| 6,728,258 B1 | 4/2004 | Okada et al. | |
| 2002/0169930 A1 | 11/2002 | Hagiwara | |
| 2003/0009634 A1 | 1/2003 | Arimilli et al. | |
| 2003/0023666 A1 | 1/2003 | Conway et al. | |

FOREIGN PATENT DOCUMENTS

| | | |
|---|---|---|
| JP | 8-235141 | 9/1996 |
| JP | 9-138782 | 5/1997 |
| JP | 9-237223 | 9/1997 |
| JP | 2002-342162 | 11/2002 |
| JP | 2003-44455 | 2/2003 |
| JP | 2003-132037 | 5/2003 |

OTHER PUBLICATIONS

International Search Report for PCT/JP2008/003216, mailed Jan. 13, 2009.

* cited by examiner

*Primary Examiner* — Hyun Nam
(74) *Attorney, Agent, or Firm* — Staas & Halsey LLP

(57) ABSTRACT

A controller is provided that controls data transfer between a processor and a data transfer device and that includes: a storage unit that stores first data outputted from the processor; a determination unit that compares control information of the first data and control information of second data received from the processor after the first data, and determines whether a first case in which the first data and the second data include the same data body holds according to a result of the comparison; a management unit that stores a portion of the control information of the second data as duplicate information associated with the first data in the first case, and stores the second data in the storage unit in a second case other than the first case; and a control unit that controls output of data stored in the storage unit to the data transfer device.

18 Claims, 31 Drawing Sheets

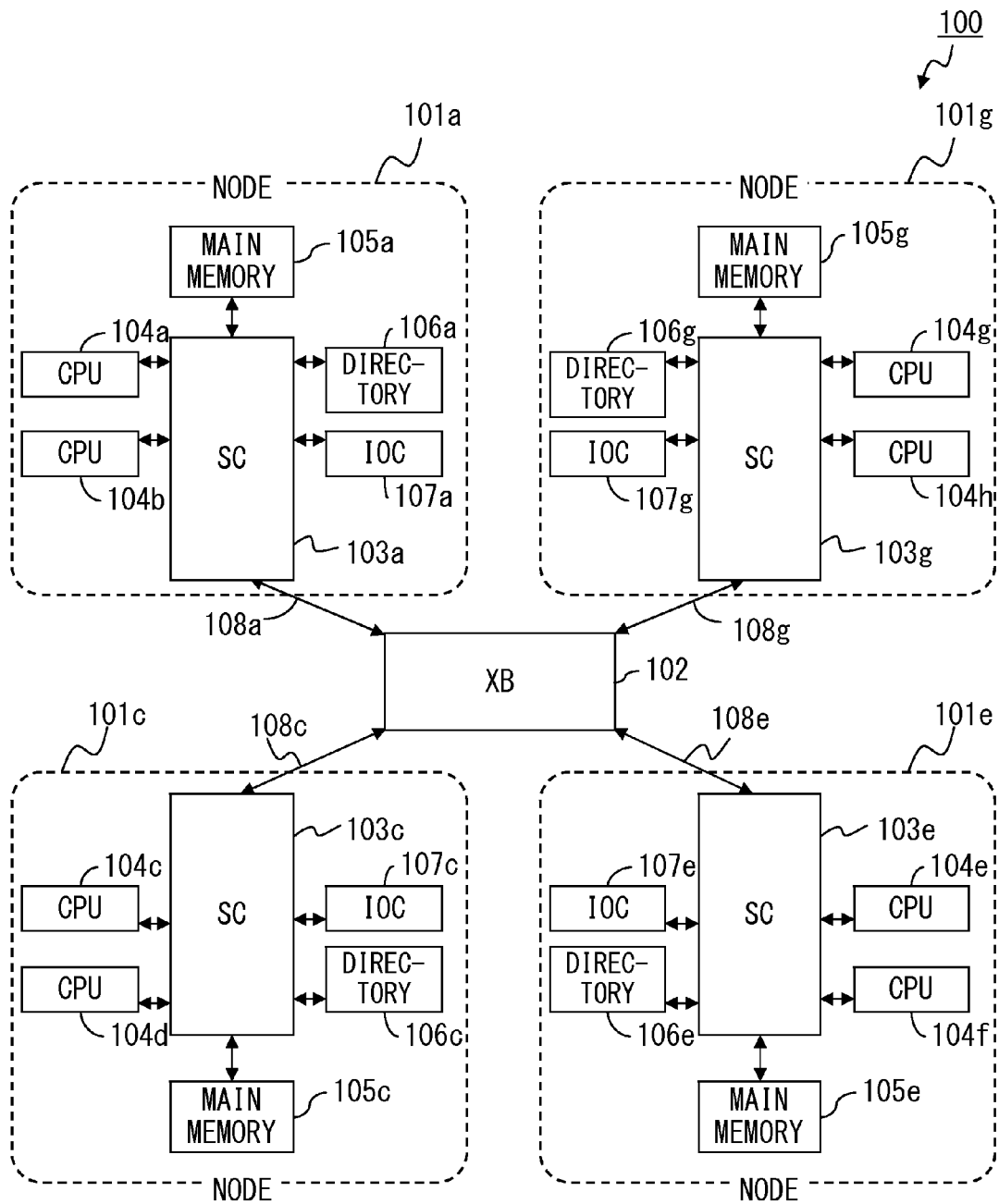
F I G. 1

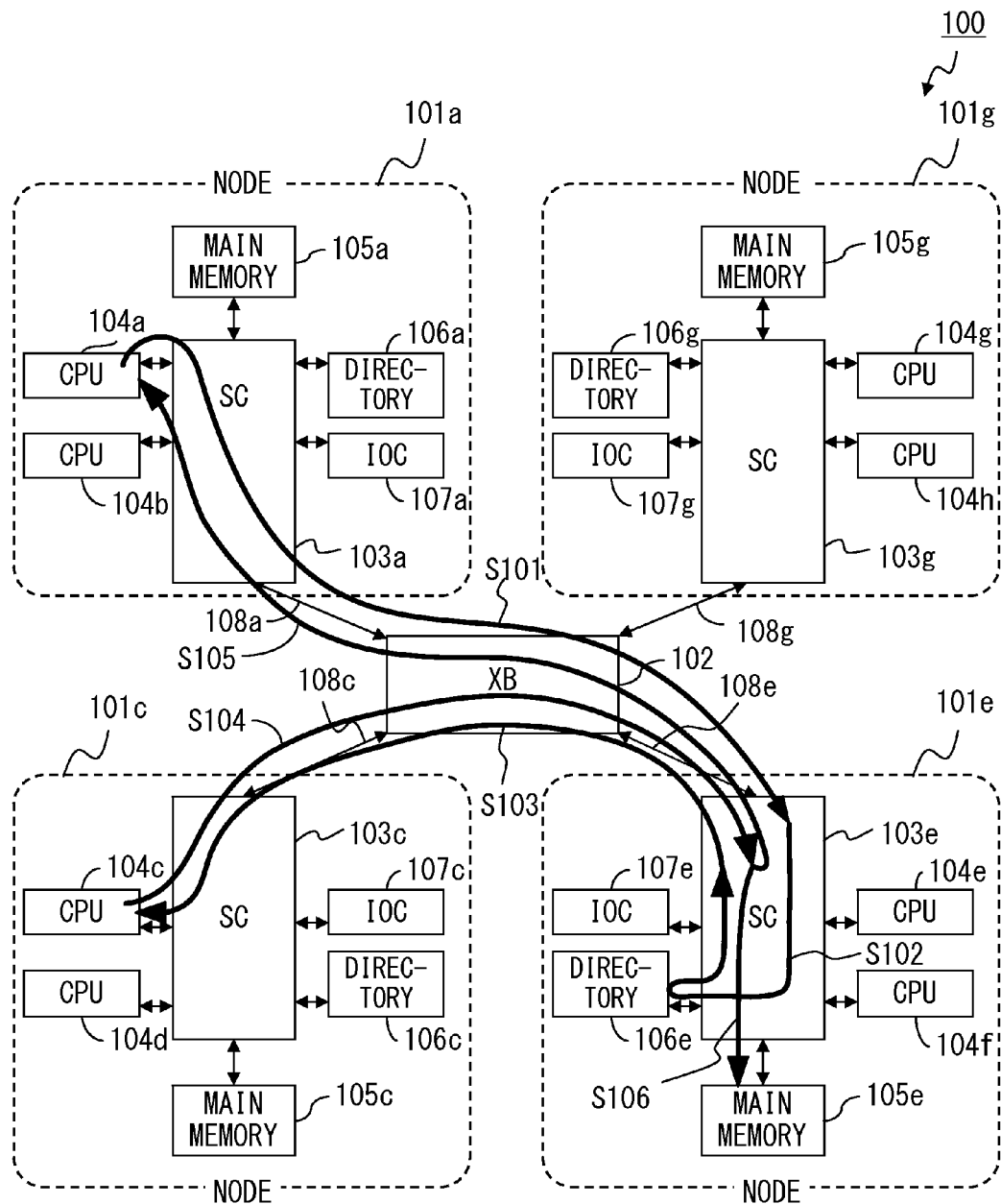
F I G. 2

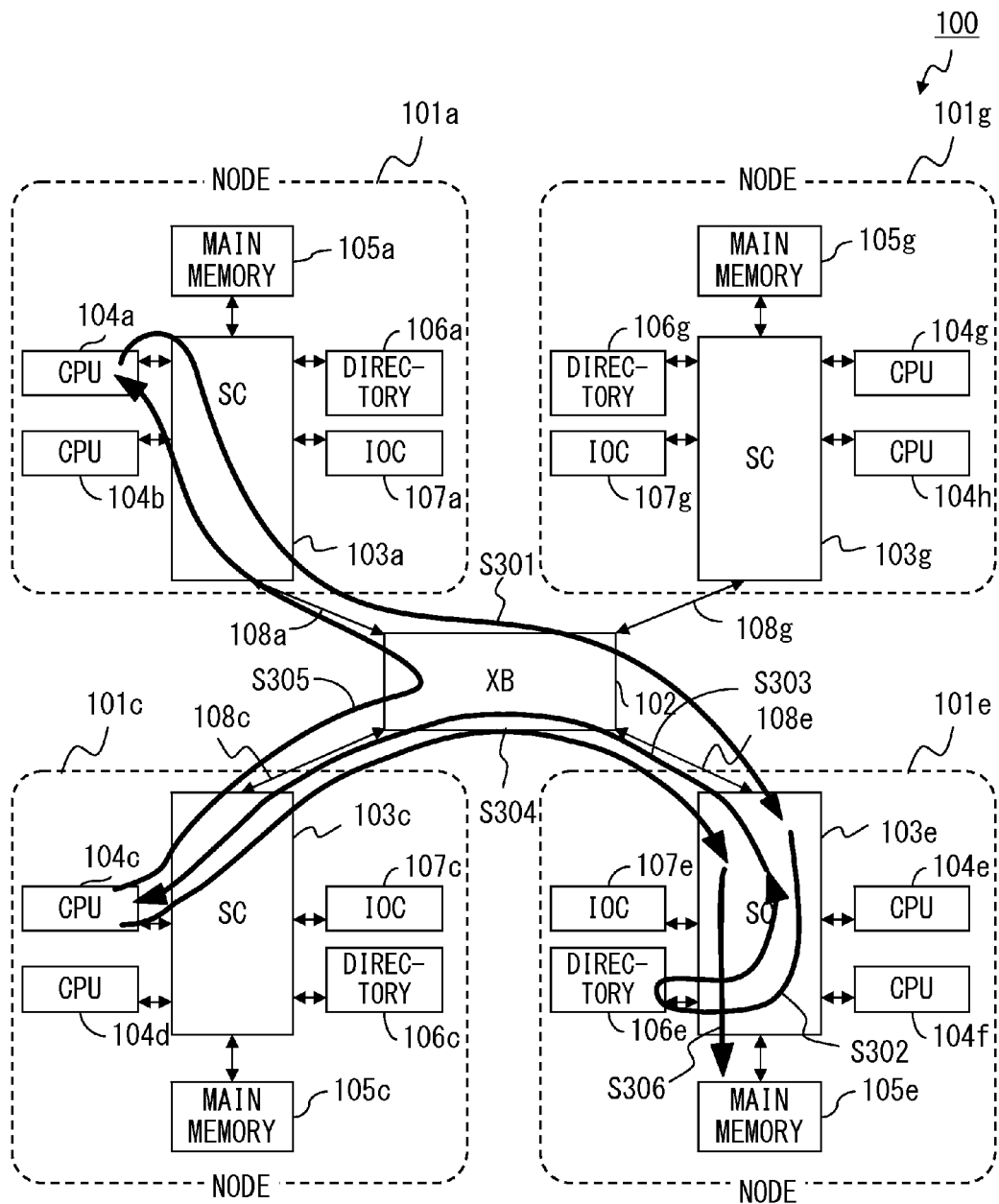
F I G. 4

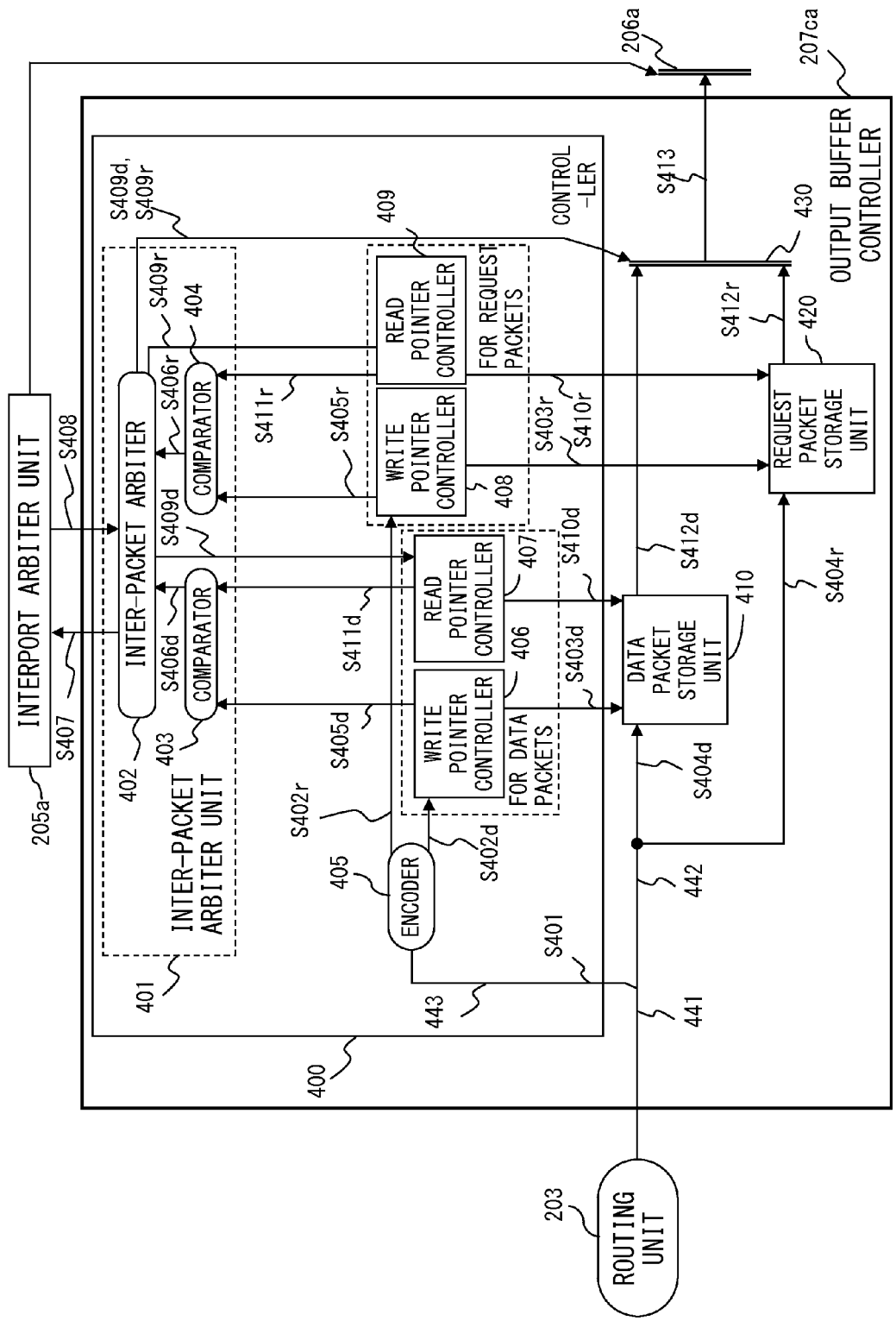
F I G. 7

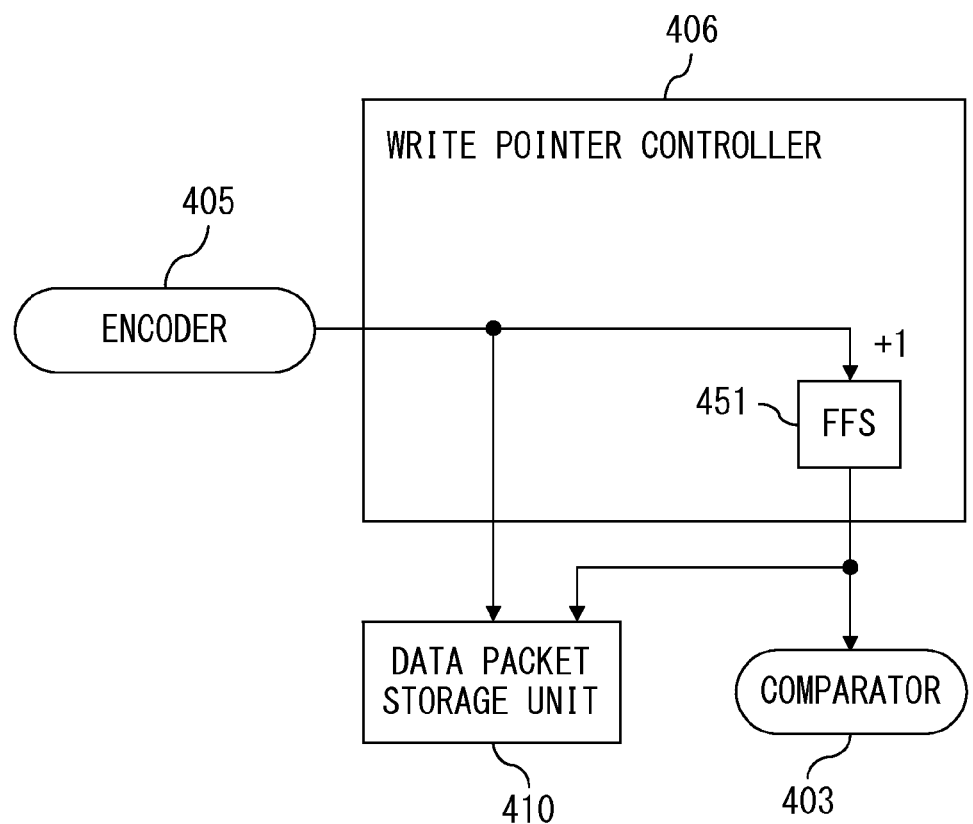
F I G. 8

| ADDRESS | OWNER | STATE |
|---|---|---|
| xxxx | CPU104b | exclusive |
| xxxx | CPU104a | shared |
| ⋮ | ⋮ | ⋮ |
| ⋮ | ⋮ | ⋮ |
| xxxx | CPU104a | shared |

106c

DIRECTORY

FIG. 11

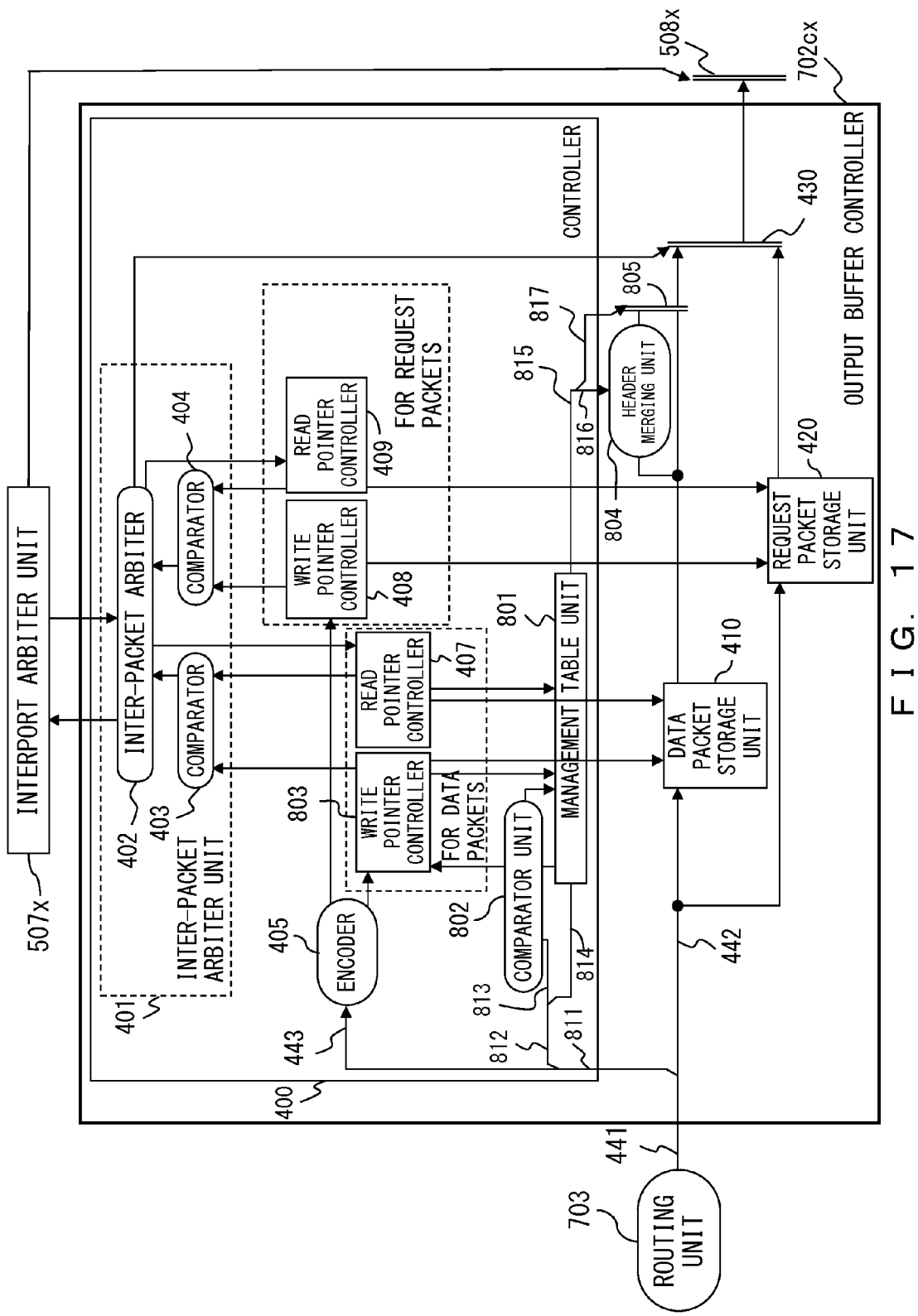
F I G. 17

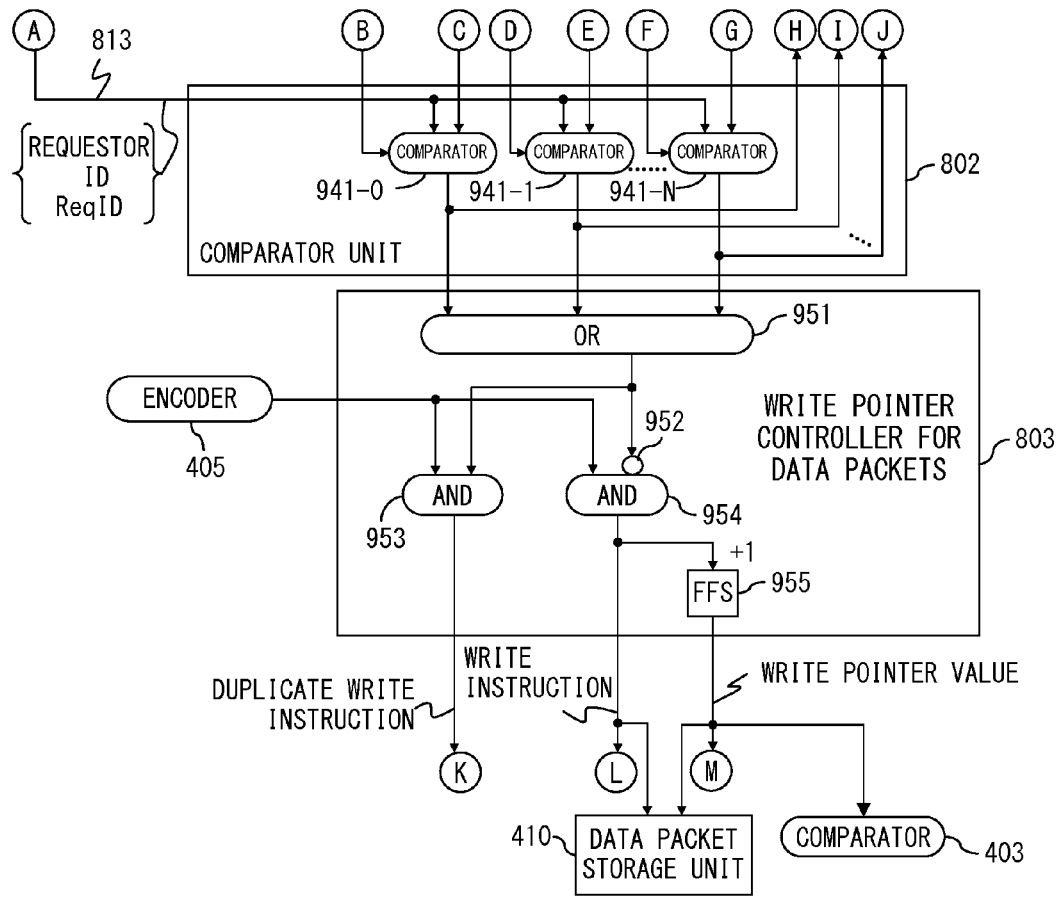
F I G. 18B

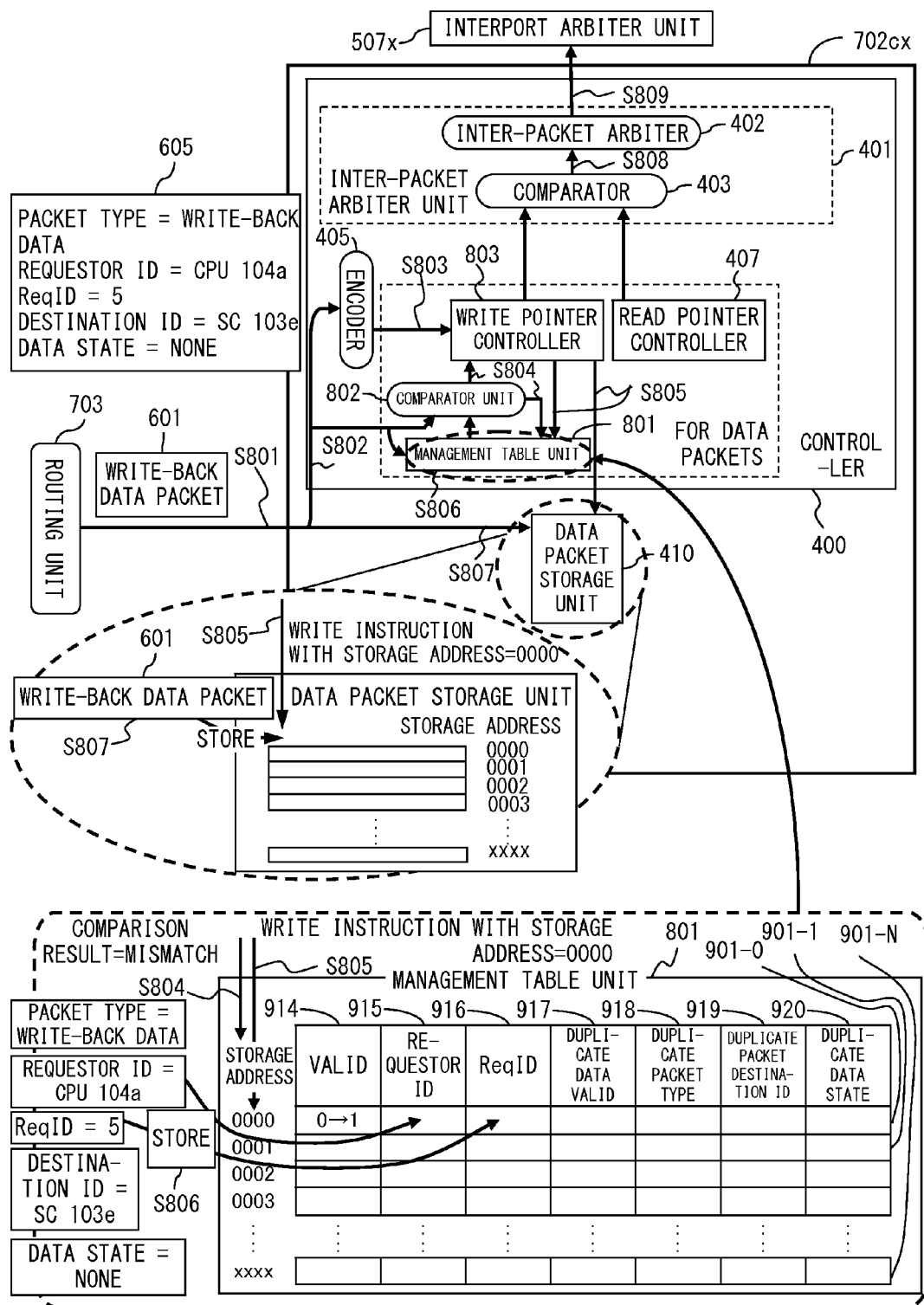
F I G. 2 0

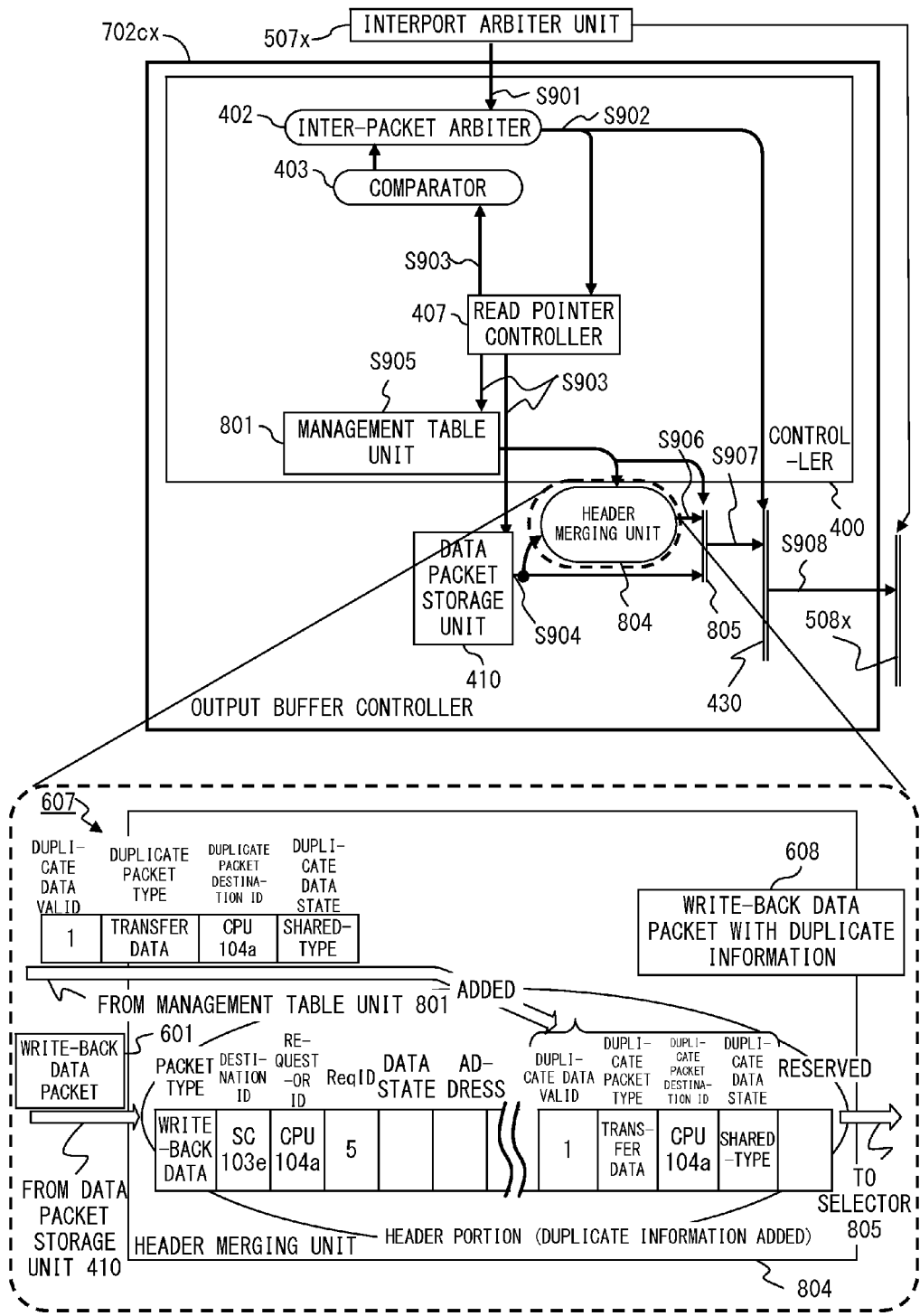
F I G. 22

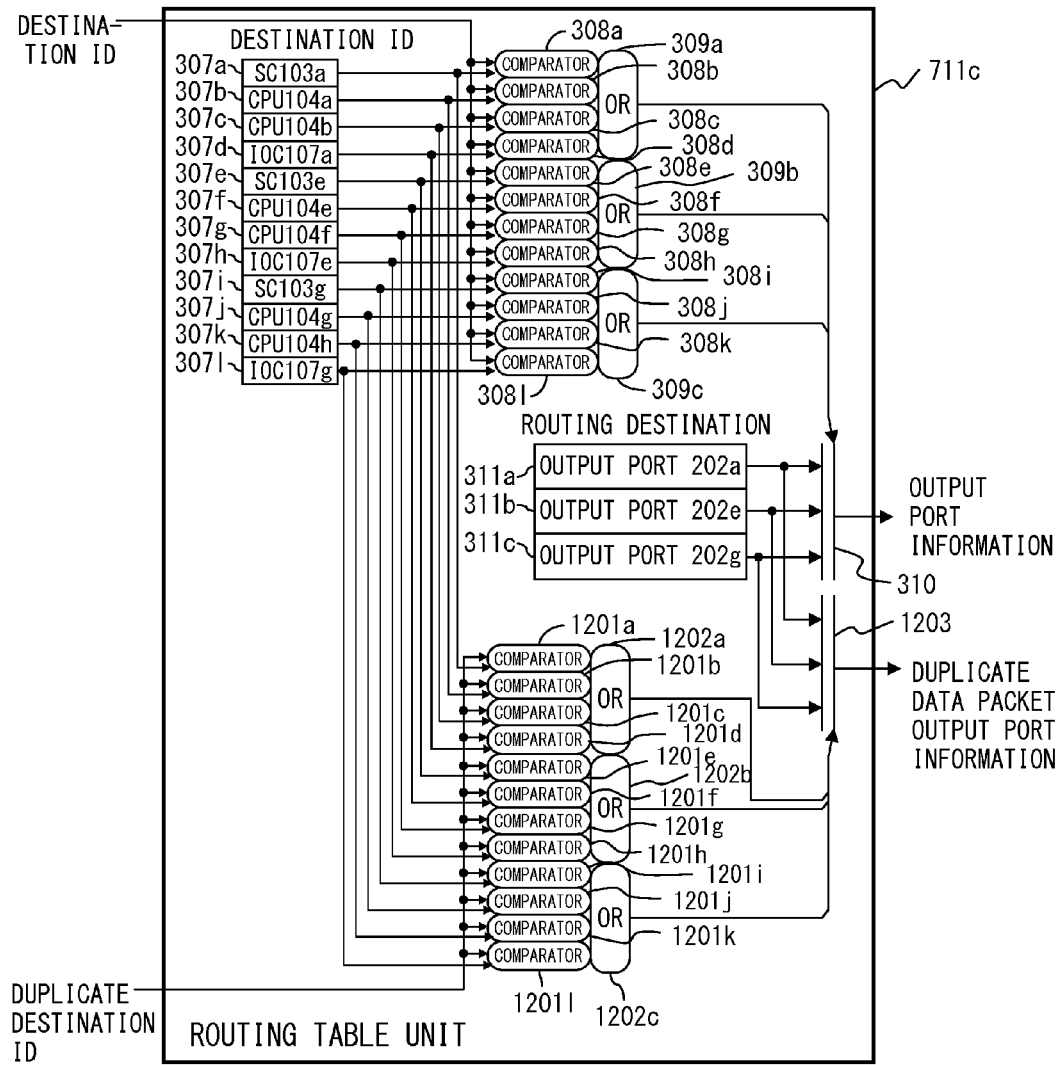
F I G. 25

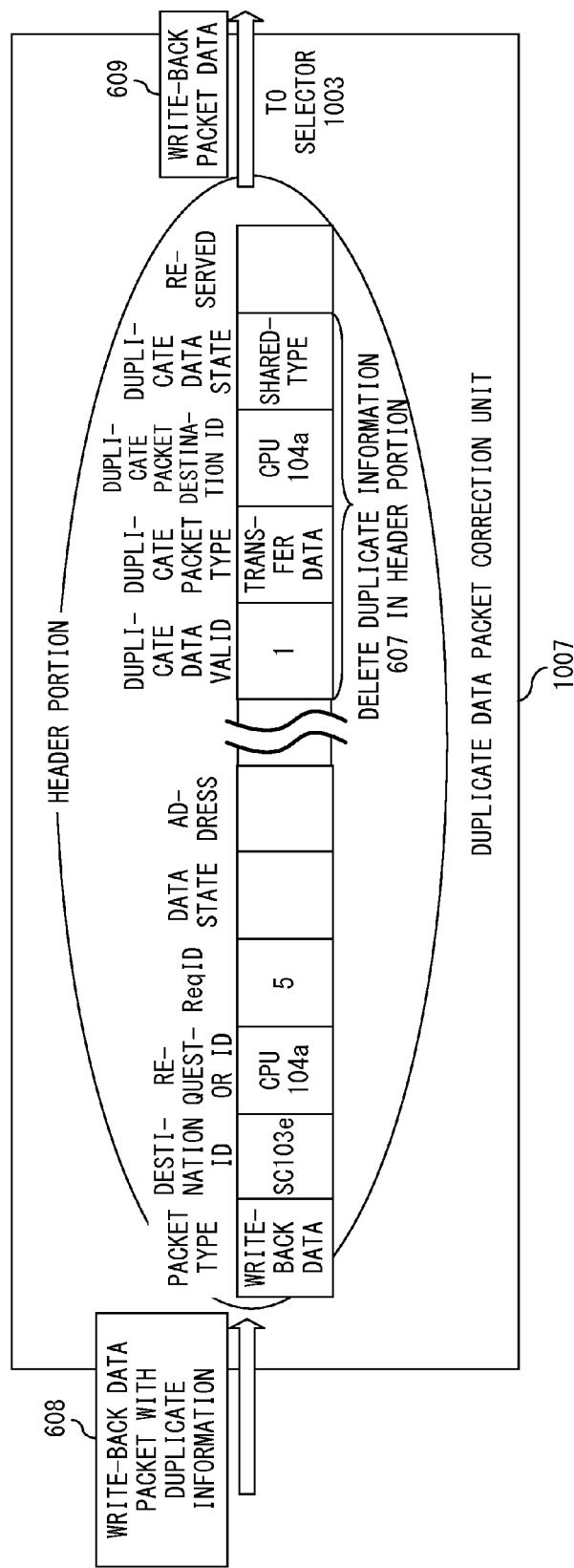
F I G. 27

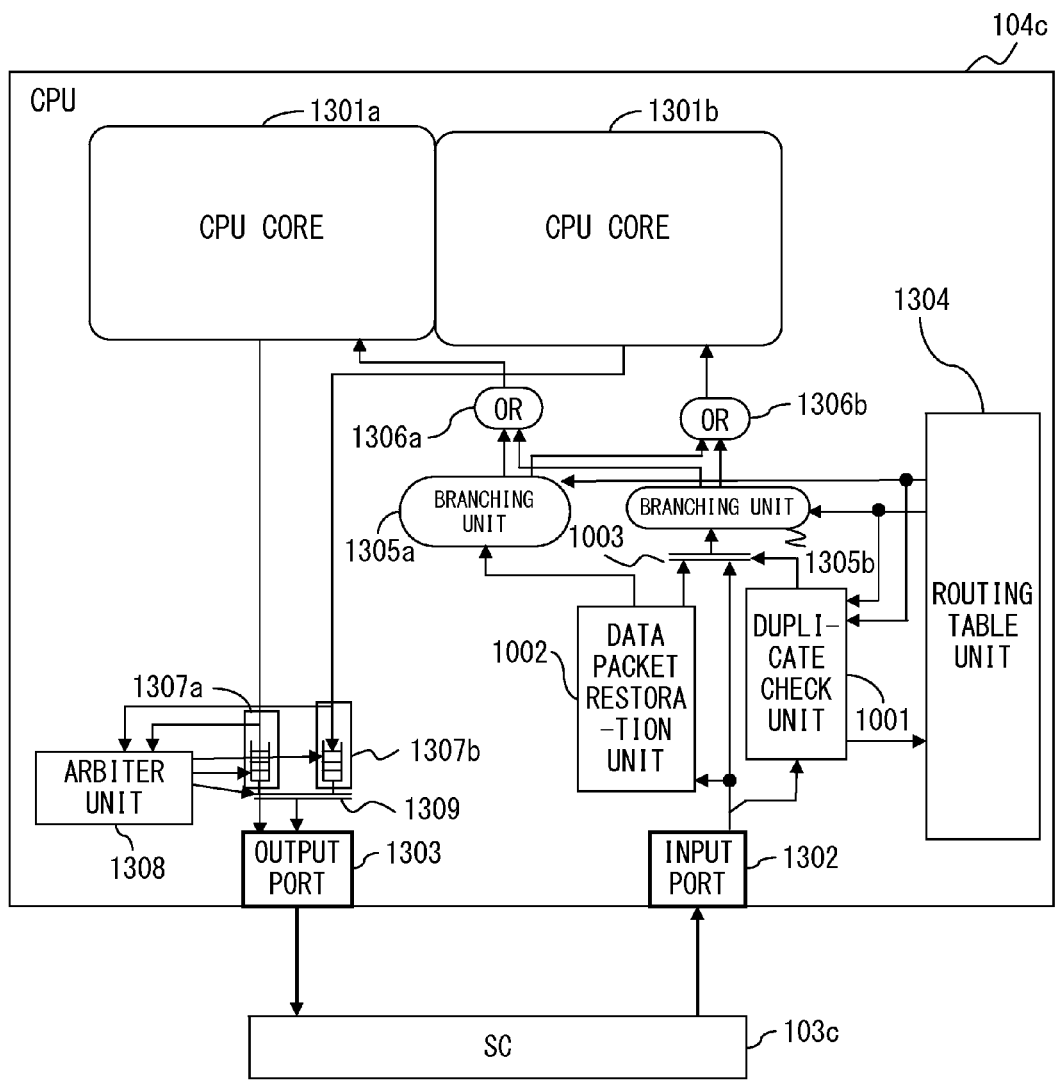
F I G. 30

US 8,375,152 B2

CONTROLLER, DATA TRANSFER DEVICE, INFORMATION PROCESSING DEVICE, PROCESSOR, AND CONTROL METHOD OF INFORMATION PROCESSING DEVICE

CROSS REFERENCE TO RELATED APPLICATION

This is a continuation of PCT application PCT/JP2008/003216, which was filed on Nov. 6, 2008, and the entire contents of which are incorporated herein by reference.

FIELD

An embodiment of the present invention relates to a controller, a data transfer device, an information processing device, a processor, and a control method of an information processing device.

BACKGROUND

In recent years, the use of multi-CPU (Central Processing Unit) systems (also referred to as multi-processor systems) has been popularized. For example, a NUMA (Non-Uniform Memory Access) computer system having two or more nodes coupled by a node interconnect switch that interconnects nodes has been disclosed.

Each node in the above NUMA computer system may be equal. Each node is coupled between a processing unit coupled to a local interconnect and the node interconnect switch. A node controller functions as a local agent for other nodes by transmitting a selecting instruction received on the local interconnect to the other nodes via the node interconnect switch and by transmitting the received selecting instruction onto the local interconnect.

In addition, in a number of computer systems in recent year, the CPU includes cache memory. Various technologies to maintain cache consistency (also known as cache coherency), which is the consistency of data among cache memories, when multiple devices share a main memory, have been known.

Patent Document 1: Japanese Laid-Open Patent Publication No. 2003-44455
Patent Document 2: Japanese Laid-Open Patent Publication No. 2002-342162
Patent Document 3: Japanese Laid-Open Patent Publication No. 09-237223

SUMMARY

A controller that controls data transfer between a processor and a data transfer device is provided. The controller includes a storage unit that stores first data outputted from the processor. The controller also includes a determination unit that compares control information of the first data and control information of second data received from the processor after the first data, and determines whether a first case in which the first data and the second data include a same data body holds according to a result of the comparison. The controller also includes a management unit that stores a portion of the control information of the second data as duplicate information associated with the first data in the first case, and stores the second data in the storage unit in a second case other than the first case. The controller also includes a control unit that controls output of data stored in the storage unit to the data transfer device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram illustrating an example of a system having plural CPUs;
FIG. 2 is a diagram illustrating an example of operations of a server system in accordance with the first cache protocol;
FIG. 4 is a diagram illustrating an example of operations of a server system in accordance with the third cache protocol;
FIG. 7 is a configuration diagram of an output buffer controller in the comparative example;
FIG. 8 is a configuration diagram of a write pointer controller in the comparative example;
FIG. 11 is a diagram illustrating an example of a directory in the comparative example;
FIG. 17 is a configuration diagram of an output buffer controller in an SC in the first embodiment;
FIG. 18B is a configuration diagram of a comparator unit and a write pointer controller in the first embodiment;
FIG. 20 is a diagram explaining a specific example of the operations performed by an output buffer controller when a write-back data packet is input first in the first embodiment;
FIG. 22 is a diagram explaining a specific example of the operations performed by a header merging unit in an output buffer controller when the output permission is issued from an interport arbiter unit after a shared-type transfer data packet is discarded in the first embodiment;

FIG. 25 is a configuration diagram of a routing table unit in the first embodiment;

FIG. 27 is a diagram explaining a specific example of the operations of a duplicate data packet correction unit in the first embodiment;

FIG. 30 is a configuration diagram of a CPU in the second embodiment.

DESCRIPTION OF EMBODIMENTS

Figure 3:
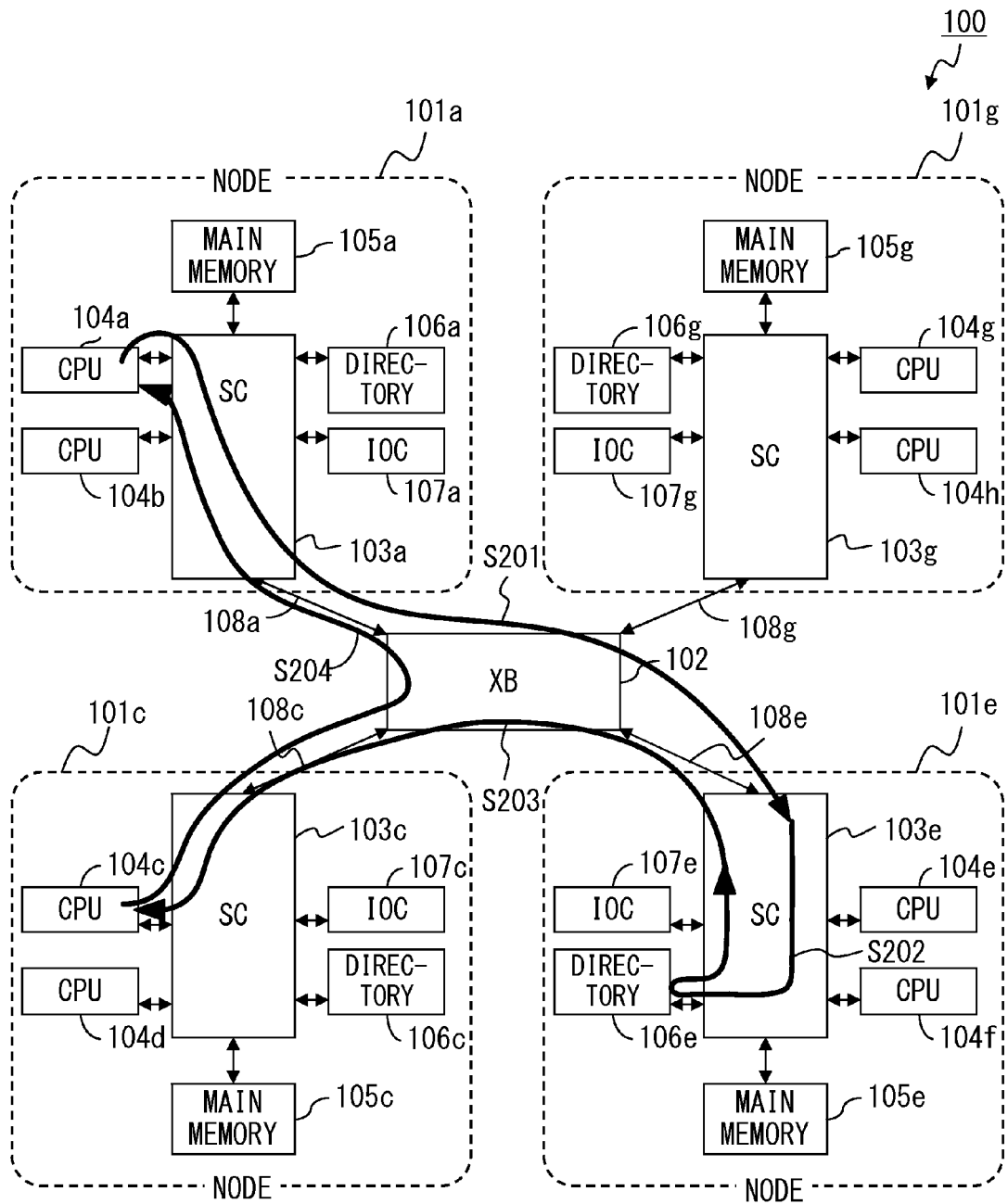
FIG. 3 is a diagram illustrating an example of operations of a server system in accordance with the second cache protocol.

An object of the following embodiments is to reduce a capacity required to store data by focusing on a case in which plural data including the same data body are output. The following embodiments enable reduction in memory capacity.

In the following description, details of the embodiments are explained with reference to the drawings. In order to facilitate understanding of the disclosed technology, a system that uses a write-back cache memory is explained first.

In the system using a write-back cache memory, a write back operation for writing data stored in the cache memory back into a main memory is performed. The following technologies have been disclosed as technologies relating to the improvement in system performance when the write back operation is performed.

As an example, a configuration of a system in which a CPU having a write-back cache and a host bridge share main memory via a CPU local bus has been disclosed as below.

The host bridge has an address hold circuit for holding a read access address of the main memory, and an address hit decision circuit for detecting whether or not the address held in the address hold circuit matches a line address involved in the write back operation by a CPU. The host bridge also has a memory access control circuit for, when the two addresses match each other, taking in write data involved in the write back operation and canceling the access to the main memory. According to the above configuration, desired data can be early obtained and traffic on the local bus can be reduced.

The following technology in a computer system where a CPU local bus and an IC (Input/Output) bus are connected by a bus bridge has also been disclosed. That is, if a cache snooping section reports, upon a read request, which is an access operation to the main memory, being issued via the IO bus from a bus master device connected to the IO bus, that write-back to cache is required, the main memory access operation is sped up as below.

More specifically, the write-back control section writes the write-back data back to the main memory via the main memory control section and simultaneously transfers the write-back data to a data bypass section. Then, intended data in accordance with a read request address is directly loaded into an IO bus control section via the data bypass section, and transferred from the IC bus to the bus master device. According to the above operation, it is no longer necessary to wait until write-back processing with respect to the main memory is completed before performing data read processing from the main memory.

As described above, some technologies relating to improvement of system performance when a write-back operation is performed have been disclosed. However, when write-back type cache memory is used in a multi-CPU system having plural CPUs, controllers and a data transfer device in the system may require a relatively large-sized buffer for some cache protocols.

In the following description, details of a buffer size required in the controllers and a data transfer device in a system when write-back type cache memory is used are explained.

FIG. 1 is a diagram of a configuration illustrating an example of a system having plural CPUs. In FIG. 1, a server system 100, which is an information processing device, includes plural nodes 101a, 101c, 101e, and 101g and a crossbar switch (hereinafter abbreviated as "XB") 102, which is a data transfer device. The plural nodes 101a, 101c, 101e and 101g are connected to one another via the XB 102. A configuration scaled out with nodes, as in the server system 100 in FIG. 1, is suitable as a server system.

In FIG. 1, the node 101a includes a system controller (hereinafter abbreviated as "SC") 103a connected to the XB 102 via a bus 108a. The node 101a further includes a CPU 104a, a CPU 104b, main memory 105a, a directory 106a, and an IOC (Input/Output Component) 107a, which are connected to the SC 103a via internal buses. Each unit in the node 101a may be mounted, for example, on a single motherboard, which is also called a system board. In the example of FIG. 1, other nodes 101c, 101e, and 101g are configured in the same manner as the node 101a.

Further details of each component in the server system 100 are explained below.

The XB 102 is a switching mechanism for performing data transmission among the SCs 103a to 103g. As explained later, data exchange between components in the server system 100 is performed by transmission of a packet. The XB 102 is an example of a data transfer device that performs packet routing among the nodes 101a to 101g.

The SC 103a is a controller that controls data transmission among components in the node 101a and that also controls data transmission between each component in the node 101a and other SCs 103c to 103g. The SC 103a also controls referencing and updating of the directory 106a. The SCs 103c to 103g are similar to the SC 103a.

Each of the CPUs 104a to 104h executes operations, controls, and the like, and includes cache memory that is not illustrated in the drawings. The cache memory may be hierarchized.

The main memory 105a is for example RAM (Random Access Memory). An access to the main memory 105a is performed from the components in the same node 101a, and is also performed from the components in other nodes 101c to 101g. Similarly to the main memory 105a, the main memories 105c to 105g are also RAMs that are accessible from components in any node.

The directory 106a stores, for example in a table format, information indicating which CPU's cache memory is caching data stored in the main memory 105a within the same node 101a. In other words, SC 103a, which performs referencing and updating of the directory 106a, not only controls data transmission but also manages cache consistency, which is data consistency between the main memory 105a and the cache memories in the CPUs. Similarly to the directory 106a, the directories 106c to 106g also manage data stored in the main memories 105c to 105g, respectively, in the same node.

The IOC 107a is a chipset component connecting various I/O devices such as PCI (Peripheral Component Interconnect) devices that are not illustrated in the drawings and a system bus between the IOC 107a and the SC 103a. The IOC 107c to 107g are the same as the IOC 107a.

In the server system 100 with the above configuration, the communication between components is performed by transmission and reception of a packet. Packets are transmitted for the purposes of, for example, requesting data, notifying of data, responding to the request for data, and transferring data. A packet includes at least a packet header, and may further include a data payload depending on the kind (type) of the packet. The packet may further include a trailer for error detection.

Hereinafter, an explanation is given assuming that a packet header includes each of the following fields (a1) to (a3).

(a1) A destination ID (identifier) for identifying a component that is a destination of the packet (a2) A requestor ID for identifying a component that is a requestor of the packet: for example, a requestor ID of a request packet that the CPU 104a transmits in requesting something from another component is an ID of the CPU 104a; and a requestor ID of a packet that is transmitted to the CPU 104a as a response to the request packet from the CPU 104a is also the ID of the CPU 104a.

(a3) A request ID (hereinafter abbreviated as "ReqID") for identifying plural different requests from a single requestor In the example of FIG. 1, it is assumed that the cache memories respectively included in the CPUs 104a to 104h are write-back type cache memories. The write-back operation is therefore needed when data read out from any of the main memories 105a to 105g and stored in the cache memory is rewritten. However, the specific timing to perform the write-back operation varies depending on the cache protocols to maintain cache consistency.

Cache protocols are referred to as "MESI protocol", "MOSI protocol", and "MOESI protocol", for example, and are named by using the initials of cache line states. Those states include the following (b1) to (b5).

(b1) The M (Modified) state is a state in which a cache line is stored only in the cache memory of a single CPU, and at least part of the data in the cache line is rewritten after being stored in the cache memory. In other words, the cache line in the M state is dirty.

(b2) The E (Exclusive) state is a state in which a cache line is stored only in the cache memory of a single CPU, and the cache line has not been rewritten after it is stored in the cache memory. In other words, the cache line in the E state is clean.

(b3) The S (Shared) state is a state in which an identical cache line is stored in a cache memory in another CPU.

(b4) The I (Invalid) state is a state in which a cache line is invalidated.

(b5) The O (Owned) state is a state of being responsible for write-back to the main memory. The cache line in the O state is dirty and an identical cache line is also stored in a cache memory of another CPU.

Depending on the cache protocol, the states to be used and the transition between the states vary and the method of write-back also varies. Which cache protocol is to be employed is determined by the specification of the CPU.

For example, depending on the specification of the CPU and the cache protocol, there are three types of operations (c1) to (c3) provided below for the operations of the CPU 104c performed when a shared-type data transfer request arrives with respect to data in a dirty cache line held in the M state in the CPU 104c.

(c1) The CPU 104c outputs only a write-back data packet. Transmission of a shared-type transfer data packet to a requestor requesting the data is performed by the SC that receives the write-back data packet and that writes the data back to the main memory. Note that, in the CPU 104c, the cache line requested by the shared-type data transfer request changes into the I or S state in accordance with the cache protocol.

(c2) The CPU 104c outputs only a shared-type transfer data packet addressed to the requestor requesting the data. In the CPU 104c, the cache line requested by the shared-type data transfer request changes into the O state. In an example of MOESI protocol, the operation in (c2) is performed and the write-back is not immediately performed.

(c3) The CPU 104c outputs both the write-back data packet and the shared-type transfer data packet. In the CPU 104c, the cache line requested by the shared-type data transfer request changes into the I or S state in accordance with the cache protocol.

Note that the following description assumes that the packet types are defined as in the following (d1) to (d4).

(d1) There is a "memory access request packet" that a CPU uses when it requests data stored in any main memory in the server system 100. The memory access request packet has some types, such as an exclusive type and a shared type, in accordance with the cache protocol.

(d2) There is a "data transfer request packet" that is used, when a certain CPU is caching target data for which a memory access is requested, in order to request a data transfer to a requestor that requested the memory access. As in the example of FIG. 4 described later, an SC other than the requestor outputs the data transfer request packet, for example. The data transfer request packet also has some types, such as an exclusive type and a shared type, in accordance with the cache protocol. For example, the shared-type data transfer request packet is a packet for requesting a transfer of data cached in a cache memory in a certain CPU to another CPU.

(d3) There is a "write-back data packet" that a CPU outputs when it writes, back to the main memory, data in a dirty (i.e., the M state) cache line cached in a cache memory in the CPU itself.

(d4) There is a "transfer data packet" that is used for transferring requested data to a requestor that requested the data. The transfer data packet has some types, such as an exclusive type, a shared type and a write-back responsible shared type, in accordance with the cache protocol.

Next, further details of the above-explained cases of (c1) to (c3) are explained with reference to FIGS. 2 to 4, respectively.

FIG. 2 is a diagram illustrating an example of operations of the server system 100 in accordance with the first cache protocol.

In step S101, the CPU 104a outputs a shared-type memory access request packet addressed to the SC 103e in order to request data stored in the main memory 105e. For convenience of explanation, hereinafter suppose that the ReqID for identifying the shared-type memory access request packet output in step S101 is 5.

The shared-type memory access request packet output from the CPU 104a is transmitted to the SC 103e, which is provided in the same node 101e as the main memory 105e, via the SC 103a and the XB 102.

Then in step S102, the SC 103e, which received the shared-type memory access request packet, refers to the directory 106e, and searches for a CPU that holds in its cache memory a cache line including the requested data.

In the following description, suppose, for example, that as a result of the reference to the directory 106e in step S102, it is found that only the CPU 104e holds the requested data.

In step S103, the SC 103e then outputs a shared-type data transfer request packet addressed to the CPU 104c. The shared-type data transfer request packet output from the SC 103e is transmitted to the CPU 104c via the XB 102 and the SC 103c.

As has been explained as the premise of the above-explained (c1) to (c3), in the example of FIG. 2, the requested data is data in the dirty cache line held in the M state by the CPU 104c. In step S104, the CPU 104c therefore outputs a write-back data packet addressed to the SC 103e in the same node 101e as the main memory 105e, in order to write the data in the cache line in the M state back to the main memory 105e. The output write-back data packet is transmitted to the SC 103e via the SC 103c and the XB 102.

As stated in the above (c1), the CPU 104c also updates the state of the cache line including the requested data to the I or S state in accordance with the cache protocol.

Then the SC 103e that received the write-back data packet, in the subsequent step S105, outputs a shared-type transfer data packet addressed to the CPU 104a, which is the requestor that requested the data in step S101. The data payload of the shared-type transfer data packet is copied from the data payload of the write-back data packet by the SC 103e.

The shared-type transfer data packet is transmitted to the CPU 104a via the XB 102 and the SC 103a.

In addition, the SC 103e, in step S106, writes the data in the cache line held in the M state by the CPU 104c back to the main memory 105e based on the received write-back data packet.

According to the above operations, cache consistency, which is data consistency between the cache memory in the CPU 104c and the main memory 105e, is maintained in the case of (c1).

Next, the case of the above-explained (c2) is explained with reference to FIG. 3. FIG. 3 is a diagram illustrating an example of operations of the server system 100 in accordance with the second cache protocol.

Steps S201 and S202 of FIG. 3 are the same as steps S101 and s102 in FIG. 2, and therefore explanations of them are omitted.

Step S203 is also mostly the same as step S103 in FIG. 2, but is different from step S103 in the following points. In other words, as described in the above-explained (c2), the CPU 104c changes the state of the cache line including the requested data into the O state.

The CPU 104c then in the subsequent step S204 outputs a shared-type transfer data packet addressed to the CPU 104a, which is a requestor that requested the data. The output shared-type transfer data packet is transmitted to the CPU 104a from the CPU 104c via the SC 103c, the XB 102, and the SC 103a.

Note that unlike the example in FIG. 2, the write-back is performed later in the example in FIG. 3. More specifically, when a refill occurs later, in which the cache line that was changed into the O state in step S203 is purged from the cache memory, the CPU 104c outputs a write-back data packet to perform the write-back to the main memory 105e.

According to the above operations, cache consistency, which is data consistency between the cache memory in the CPU 104c and the main memory 105e, is also maintained in the case of (c2).

Next, the case of the above-explained (c3), in which the CPU 104c outputs both a write-back data packet and a shared-type transfer data packet, is explained with reference to FIG. 4. FIG. 4 is a diagram illustrating an example of operations of the server system 100 in accordance with the third cache protocol.

Steps S301 to S304 in FIG. 4 are the same as steps S101 to S104 in FIG. 2 and therefore the explanations are omitted.

In the example of FIG. 4, in step S305 subsequent to step S304 outputting the write-back data packet, the CPU 104c outputs a shared-type transfer data packet addressed to the CPU 104a, which is a requestor that requested the data in step S301. The shared-type transfer data packet is transmitted via the SC 103c, the XB 102, and the SC 103a and is received in the CPU 104a.

Note that the execution order of steps S304 and S305 is arbitrary, and that the two steps may be performed in parallel. The CPU 104c also updates the state of the cache line including the requested data to the I or S state in accordance with the cache protocol.

In step S306, the CPU 103e, in the same manner as step S106 in FIG. 2, writes the data of the cache line, which has been held by the CPU 104c in the M state, back to the main memory 105e based on the received write-back data packet.

According to the above operations, cache consistency, which is data consistency between the cache memory in the CPU 104c and the main memory 105e, is also maintained in the case of (c3).

In the above description, examples of operations of the server system 100 depending on the cache protocols are explained with reference to FIG. 2 to FIG. 4. The capacities of the buffers necessary for each of the SC 103a to 103g and the XB 102 also vary in accordance with differences in the operations. More specifically, the example in FIG. 4 requires a larger buffer capacity than the examples in FIG. 2 and FIG. 3. The reason is explained in the following description.

As described above, the XB 102 and the SCs 103a to 103g control the data transmission among components in the server system 100, or more specifically, they perform packet routing. For that reason, the XB 102 and the SCs 103a to 103g each have input ports for receiving a packet, a switching mechanism for routing the input packet, and output ports for outputting the packet to a component at a routing destination. In order to avoid packet overflow in the component at the routing destination, each of the SCs 103a to 103g has a buffer in the preceding stage of the output port to the XB 102, and the XB 102 has a buffer in the preceding stage of each output port to each of the SCs 103a to 103g.

The SC 103a, for example, temporarily stores a packet which is to be output to the XB 102 in the buffer, and outputs the packet in the buffer from the output port to the XB 102 when output permission is obtained from the XB 102. Therefore, the required buffer capacity varies depending on how many packets may possibly remain in the buffer at maximum.

In the example of FIG. 4, the cache protocol inevitably leads two packets to be output from the CPU 104c to the SC 103c at close time points as step S304 and S305. On the other hand, in the examples of FIG. 2 and FIG. 3, there is no such case in which two packets are output from the CPU 104c to the SC 103c at close time points. Because of this difference, the example in FIG. 4 requires greater buffer capacity than the examples in FIG. 2 and FIG. 3.

The buffer capacity required in the SC 103c is described as below for example, letting P be the maximum outstanding number, which is a maximum number of packets allowed to be sequentially issued without waiting for the response, with respect to data transfer request packets that the SC 103*c* outputs to the CPUs 104*c* and 104*d* within the same node 101*c*.

In the example of FIG. 2, the SC 103*c* outputs one shared-type data transfer request packet to the CPU 104*c* in step S103. In other words, the SC 103*c* routes the shared-type data transfer request packet received from the XB 102 to the CPU 104*c*.

Upon the shared-type data transfer request packet being output from the SC 103*c* to the CPU 104*c*, the CPU 104*c* outputs one write-back data packet to the SC 103*c* in step S104. Therefore, the SC 103*c* needs to have a buffer with sufficient capacity to store at least P write-back data packets.

Similarly in the example of FIG. 3, upon one shared-type data transfer request packet being output from the SC 103*c* to the CPU 104*c* in step S203, the CPU 104*c* outputs one shared-type transfer data packet in step S204. Therefore, the SC 103*c* needs to have a buffer with sufficient capacity to store at least P shared-type transfer data packets.

For example, each of the data payloads of the write-back data packets and the shared-type transfer data packets may be the data in one requested cache line. Accordingly, the required buffer capacities are the same in the examples of FIG. 2 and FIG. 3.

Meanwhile, in the example of FIG. 4, upon one shared-type data transfer request packet being output from the SC 103*c* to the CPU 104*c* in step S303, the CPU 104*c* outputs one write-back data packet to the SC 103*c* in step S304. In step S305, which is performed at approximately the same time as step S304, the CPU 104*c* outputs one shared-type transfer data packet to the SC 103*c*.

Consequently, the SC 103*c* needs to have a buffer with sufficient capacity to store at least P write-back data packets and P shared-type transfer data packets. In other words, the number of data packets output from the CPU 104*c* to the SC 103*c* triggered by one shared-type data transfer request packet is one in each of the examples in FIG. 2 and FIG. 3, whereas it is two in the example of FIG. 4; for that reason, the required buffer capacity is larger in the example of FIG. 4.

As a matter of course, the buffer capacity provided in the SC 103*c* also depends on other factors such as the maximum outstanding number of packets received from IOC 107*c*, for example. However, it is obvious from the above descriptions that the required buffer capacity is larger in the example of FIG. 4 than in the example of either FIG. 2 or FIG. 3, if the various maximum outstanding numbers defined by the specification are shared. For a similar reason, the required buffer capacity of the XB 102 is larger in the example of FIG. 4 than in the example of either FIG. 2 or FIG. 3.

Next, in order to facilitate understanding of the disclosed technology, details of a comparative example are explained with reference to FIG. 5 to FIG. 13. Afterwards, details of the first embodiment in which the required buffer capacity is reduced to approximately ½ of that in the comparative example are explained with reference to FIG. 14 and FIG. 29. Furthermore, the second embodiment, which employs another configuration to reduce the required buffer capacity, is explained with reference to FIG. 30.

The comparative example explained below by using FIG. 5 to FIG. 13 is an example of the case illustrated in FIG. 4 in which a CPU performs operations for outputting both a write-back data packet and a shared-type transfer data packet in the server system 100 in FIG. 1 explained above.

Figure 5:
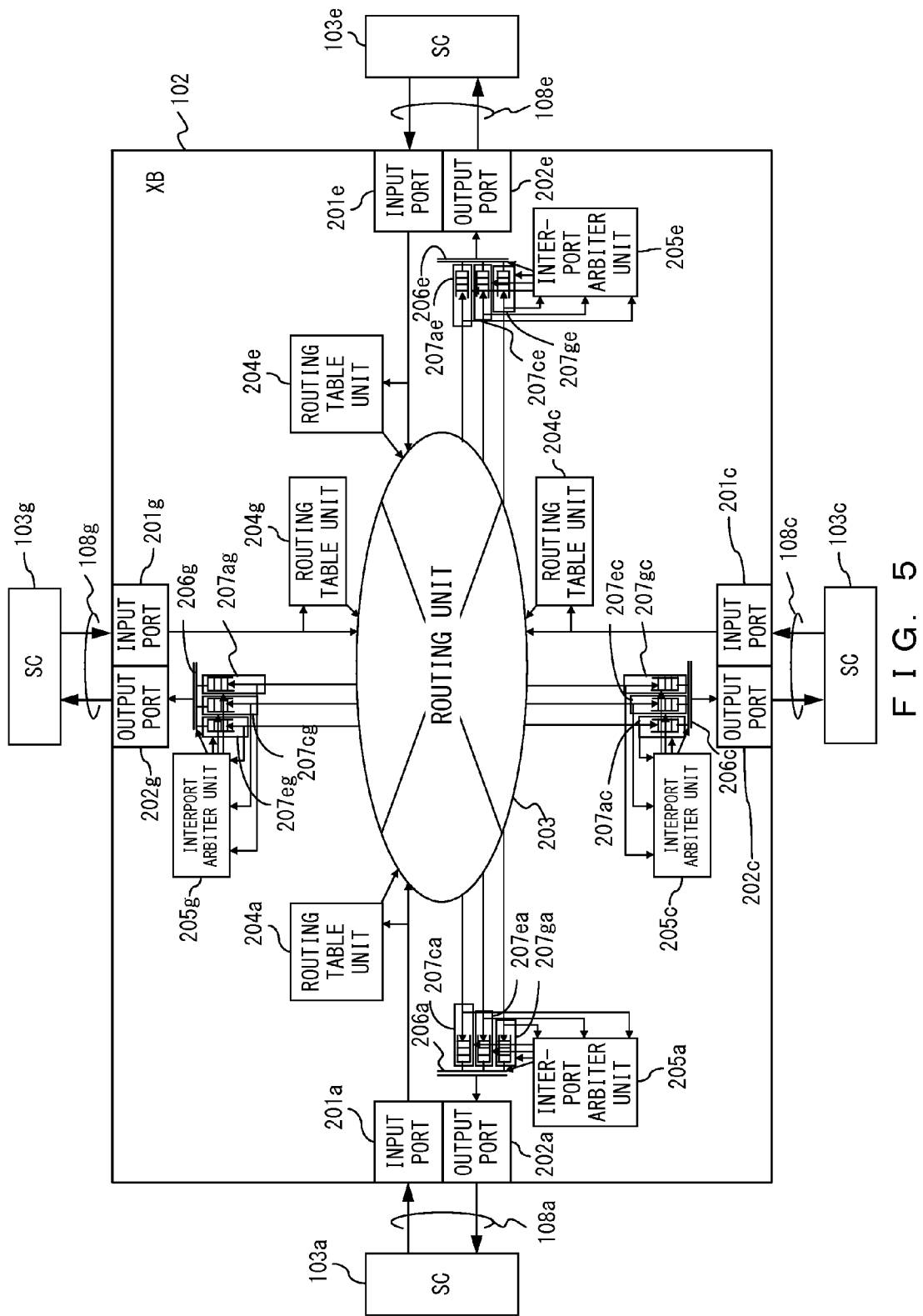
FIG. 5 is a configuration diagram of an XB in a comparative example.

FIG. 5 is a configuration diagram of the XB 102 illustrated in FIG. 1 in the comparative example. As illustrated in FIG. 1, the XB 102 is connected to each of the SCs 103*a* to 103*g* via buses 108*a* to 108*g*, and performs data transmission among the SCs 103*a* to 103*g*. Each of buses 108*a* to 108*g* represented by a single two-headed arrow in FIG. 1 is represented by two arrows in FIG. 5.

The XB 102 has an input port 201*a* for receiving packets output from the SC 103*a* and an output port 202*a* for outputting packets to the SC 103*a*. In the same manner, with respect to the SCs 103*c*, 103*e*, and 103*g*, the XB 102 has input ports 201*c*, 201*e* and 201*g*, and output ports 202*c*, 202*e*, and 202*g*.

When the operating frequency of the inside of the XB 102 differs from the operating frequency of the buses 108*a* to 108*g* connected to the SCs 103*a* to 103*g*, each of the input ports 201*a* to 201*g* and each of the output ports 202*a* to 202*g* also perform a frequency conversion called "frequency switching".

The XB 102 further has a routing unit 203, and four routing table units 204*a* to 204*g* corresponding to the four input ports 201*a* to 201*g*.

The routing unit 203 is connected to each of the input ports 201*a* to 201*g* and receives packets from the input ports 201*a* to 201*g*. The routing table units 204*a* to 204*g* have respective tables (each being a table 305 in FIG. 6 described later) to determine to which of the output ports 202*a* to 202*g* the packets received by the input ports 201*a* to 201*g* are to be sorted.

The routing unit 203 sorts the packets received from the input ports 201*a* to 201*g* in accordance with the determination of the routing table units 204*a* to 204*g*. Details of packet sorting are described later with reference to FIG. 6.

The XB 102 also has four sets of circuits corresponding to four output ports 202*a* to 202*g*.

For example, circuits which are provided correspondingly to the output port 202*a* and provided in the preceding stage of the output port 202*a* include an interport arbiter unit 205*a*, an interport selector 206*a*, and three output buffer controllers 207*ca*, 207*ea*, and 207*ga*. Each of the output buffer controllers 207*ca*, 207*ea*, and 207*ga* is connected to the routing unit 203, the interport arbiter unit 205*a*, and the interport selector 206*a*. The interport selector 206*a* is connected to the interport arbiter unit 205*a* and the output port 202*a*.

Note that the output buffer controller 207*ca* handles the transmission from the SC 103*c* to the SC 103*e* (i.e., the transmission from the input port 201*c* to the output port 202*a*) as indicated by the subscript "ca". In the same manner, the output buffer controllers 207*ea* and 207*ga* handle the transmission from the SC 103*e* to the SC 103*a* and the transmission from the SC 103*g* to the SC 103*a*, respectively.

Although the details are described later with reference to FIG. 7, the three output buffer controllers 207*ca*, 207*ea*, and 207*ga* each have a buffer for storing packets to be output to the SC 103*a* via the output port 202*a*. It is stated in the above description that the example in FIG. 4 requires a larger buffer capacity than the example of either FIG. 2 or FIG. 3. More specifically, such buffers are included in the twelve output buffer controllers illustrated in FIG. 5.

When a packet received by the input port 201*c* from the SC 103*c* is input to the output buffer controller 207*ca* via the routing unit 203, the output buffer controller 207*ca* issues an output request to the interport arbiter unit 205*a*. Here, the "output request" is a request for outputting the packet input to the output buffer controller 207*ca* to the output port 202*a* via the interport selector 206*a*.

In a similar manner, when a packet received by the input port 201*e* from the SC 103*e* is input to the output buffer controller 207*ea* via the routing unit 203, the output buffer controller 207*ea* issues an output request to the interport arbiter unit 205a. The output buffer controller 207ga similarly issues an output request to the interport arbiter unit 205 when a packet is input.

The interport arbiter unit 205a arbitrates plural output requests issued from each of the output buffer controllers 207ca, 207ea, and 207ga. In other words, "interport" in the interport arbiter unit 205a represents arbitration among the input ports 201c, 201e, and 201g to which packets to be output to the output port 202a are input.

Note that the algorithm for arbitration may be arbitrary. For example, the interport arbiter unit 205a may perform arbitration by using an LRU (Least Recently Used) algorithm, a round robin algorithm, or a FIFO (First In First Out) algorithm.

As a result of the arbitration, the interport arbiter unit 205a selects one output buffer controller.

For example, assume that the output buffer controller 207ca is selected as a result of the arbitration. The interport arbiter unit 205a then notifies the output buffer controller 207ca of an output permission and also notifies the interport selector 206a that the output buffer controller 207ca is selected. The interport selector 206a then receives a packet from the buffer in the selected output buffer controller 207ca in accordance with the selection result reported from the interport arbiter unit 205a and outputs the packet to the output port 202a.

As explained above, each buffer in each of the output buffer controllers 207ca, 207ea, and 207ga is an area to temporarily store a packet until an output permission is reported from the interport arbiter unit 205a (i.e., during waiting for routing to the SC 103a).

Figure 6:
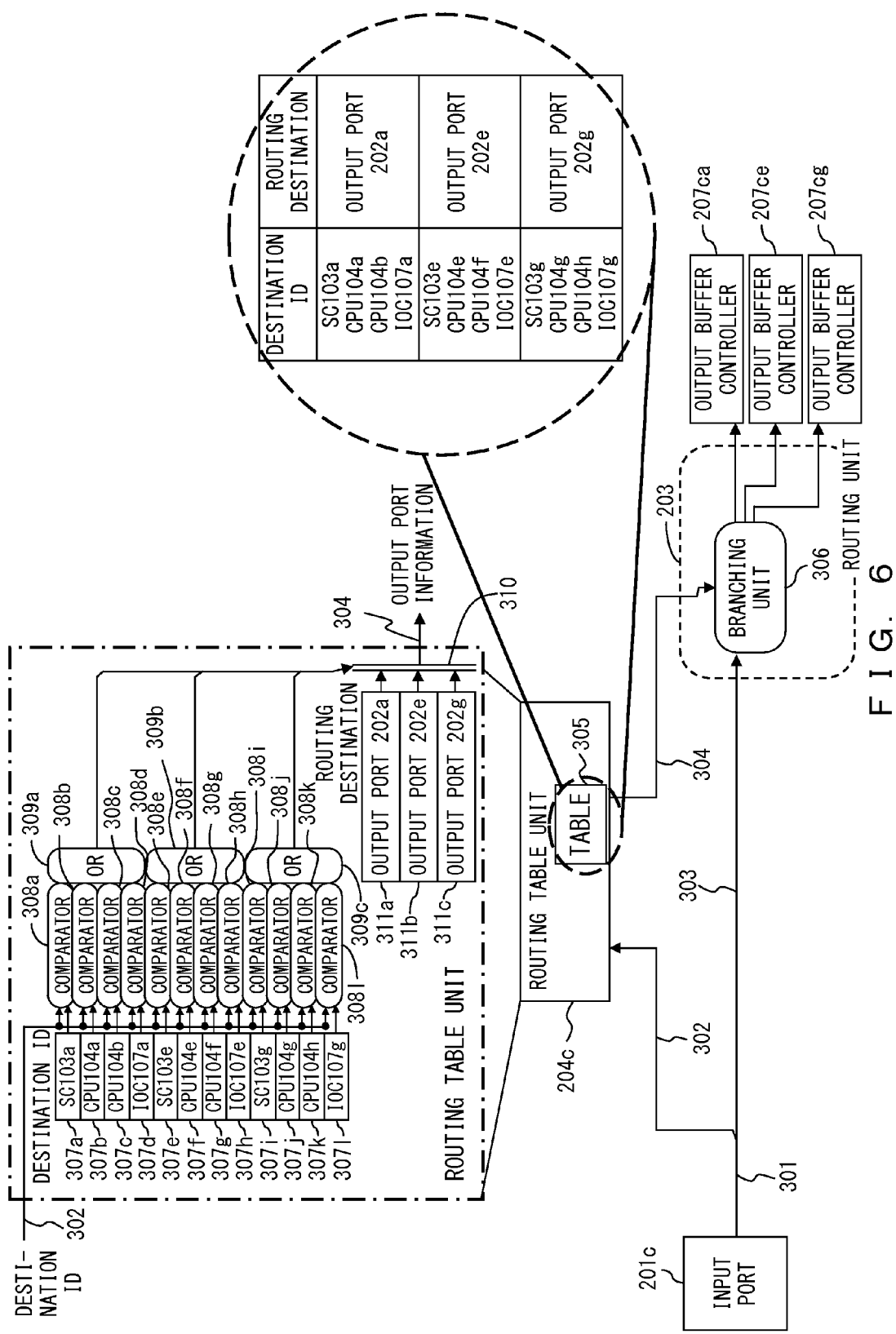
FIG. 6 is a configuration diagram extracting a portion of the XB in the comparative example to illustrate the details of the portion.

Next, with reference to FIG. 6, the operations of the XB 102 performed when the input port 201c receives a packet output from the SC 103c are explained with details of the routing table unit 204c.

FIG. 6 is a configuration diagram extracting a portion of the XB 102 to illustrate the details of the portion. FIG. 6 illustrates the input port 201c, a portion of the routing unit 203, the routing table unit 204c, and three output buffer controllers 207ca, 207ce, and 207cg. A packet input from the input port 201c is output to any of the three output buffer controllers 207ca, 207ce, and 207cg via the routing unit 203.

The relationships, each between the routing unit 203 and another routing table unit 204a, 204e, or 204g and another input port 201a, 201e, or 201g in the XB 102, are the same as the relationship in FIG. 6.

Signals representing a packet received by the input port 201c from the SC 103c are output to a signal line 301. In the following description, this is simply described as "a packet is output to the signal line 301".

The signal line 301 branches into a signal line 302 and a signal line 303. The signal line 302 is connected to the routing table unit 204c, and the signal line 303 is connected to the routing unit 203. What is transmitted to the routing table unit 204c via the branched signal line 302 is a destination ID included in the header of the packet output to the signal line 301. In addition, what is transmitted to the routing unit 203 via the branched signal line 303 is the entirety of the packet output to the signal line 301. The routing table unit 204c is connected to the routing unit 203 via a signal line 304.

In each of the drawings provided below, if a certain signal line (e.g., the signal line 301) branches into plural signal lines (e.g., the signal line 302 and the signal line 303) and pieces of data respectively output to the plural signal lines differ as described above, a branching point is indicated by branching lines at an angle as in FIG. 6. Note that when the same data is output to plural branched signal lines, the branching is indicated by a black circle as in the branching point of the signal lines in FIG. 8 explained later.

The branching illustrated by branching lines at an angle may be implemented in various ways, including for example the following (e1) to (e3).

(e1) The first and second circuit elements are connected by a signal line realized by a set of a quantity A of conductive wires (i.e., connected by a transmission path whose bit width is A bits). A quantity B out of the quantity A of conductive wires are branched and connected to the third circuit element (A>B). In FIG. 6, for example, the first to third circuit elements may be the input port 201c, the routing unit 203, and the routing table 204c, respectively, and the bit widths of the signal line 301 and the signal line 303 may be A bits, and the bit width of the signal line 302 may be B bits.

(e2) From the first circuit element, an A-bit signal is output to a signal line realized by a set of a quantity A of conductive wires. Among the quantity A of conductive wires, a quantity B of them are connected to the second circuit element and a quantity C of them are connected to the third circuit element (A=B+C).

(e3) The first and fourth circuit elements are connected by a set of a quantity A of conductive wires. The fourth circuit element is connected to the second circuit element by a set of a quantity B of conductive wires and is also connected to the third circuit element by a set of a quantity C of conductive wires ($A \geq B$ and $A \geq C$). The fourth circuit element outputs B bits of the A-bit signal input from the first circuit element to the second circuit element, for example, and outputs C bits of the A bits to the third circuit element. The fourth circuit element, when necessary, may delay the output of B bits or may delay the output of C bits. In FIG. 6, for example, the fourth circuit element, which is not shown in the drawing, may be placed at a portion in which the signal line 302 and the signal line 303 are branched. Without delaying the input, the fourth circuit element may output the destination ID to the routing table unit 204c via the signal line 302 and may output the packet to the routing unit 203 via the signal line 303.

As described in (e1) to (e3) above, the branching illustrated by lines branching at an angle in the drawing may be implemented in various ways. However, the function in which part of or all of data output to a certain signal line is branched and output to plural signal lines is the same in (e1) to (e3). The same holds with respect to the branching into three or more branches.

Here, the description returns to the explanation of FIG. 6. The routing table unit 204c has a table 305. The routing unit 203 has a branching unit 306 corresponding to the input port 201c, and also has three more branching units which are not illustrated in the drawings and which respectively correspond to three other input ports 201a, 201e, and 201g.

The routing table unit 204c refers to the table 305 and determines a routing destination of the packet received by the input port 201c according to the destination ID input through the signal line 302. In other words, the routing table unit 204c determines which of the output ports 202a, 202e or 202g the packet received by the input port 201c is to be output to. The routing table unit 204c then outputs and reports output port information for identifying the determined output port to the branching unit 306 via the signal line 304.

To be more specific, the signal line 303 is connected to the branching unit 306 in the routing unit 203. The branching unit 306 may for example be a multiplexer. The branching unit 306 receives a packet input via the signal line 303 and switches the output destinations of the received packet in the following manner according to the reported output port information.

When the output port information indicates the output port 202a, the branching unit 306 outputs the packet to the output buffer controller 207ca, which corresponds to the output port 202a and is provided in the preceding stage of the output port 202a.

When the output port information indicates the output port 202e, the branching unit 306 outputs the packet to the output buffer controller 207ce, which corresponds to the output port 202e and is provided in the preceding stage of the output port 202e.

When the output port information indicates the output port 202g, the branching unit 306 outputs the packet to the output buffer controller 207cg, which corresponds to the output port 202g and is provided in the preceding stage of the output port 202g.

As described above, the routing unit 203 is a switching mechanism for sorting the packets received by each of the input ports 201a to 201g to proper output ports 202a to 202g.

Next, operations of the above-described routing table unit 204c are explained with details of the table 305.

The table 305 is realized by rewritable memory elements. For example, the table 305 is realized by FFs (Flip-Flops). The table 305 associates the destination ID with the output port information of the routing destination and stores them.

More specifically, the IDs respectively identifying the SC 103a, the CPU 104a, the CPU 104b and the IOC 107a in the node 101a are associated with the output port information identifying the output port 202a connected to the SC 103a of the node 101a. Similarly, the IDs of the SC 103e, the CPU 104e, the CPU 104f and the IOC 107e in the node 101e are associated with the output port information identifying the output port 202e. Furthermore, the IDs of the SC 103g, the CPU 104g, the CPU 104h and the IOC 107g in the node 101g are associated with the output port information identifying the output port 202g.

The routing table unit 204c further includes comparators 308a to 308l, OR circuits 309a to 309c implementing logical disjunction operation, and a selector 310, in addition to the table 305. In the example of FIG. 6, the FFs configuring the table 305 include, more specifically, twelve sets of FFs 307a to 307l for respectively storing the above twelve destination IDs and three sets of FFs 311a to 311c for respectively storing three pieces of output port information. Note that the number of FFs constituting one set of FFs (e.g. FFs 307a and FFs 311a) is determined in accordance with the number of bits used to represent the destination ID and the output port information.

As illustrated in FIG. 6, the twelve comparators 308a to 308l are respectively provided correspondingly to the twelve sets of FFs 307a to 307l, which are equivalent to the left column of the table 305 and which store the respective destination IDs. In addition, the three OR circuits 309a to 309c are respectively provided correspondingly to the three sets of FFs 311a to 311c, which are equivalent to the right column of the table 305 and which store respective pieces of output port information of routing destinations.

The destination ID input to the routing table unit 204c from the signal line 302 is input to each of the comparators 308a to 308l.

For example, the comparator 308a compares the destination ID held in the FFs 307a corresponding to the comparator 308a with the input destination ID. The comparator 308a outputs a logical value 1 to the OR circuit 309a when the two destination IDs match, and outputs a logical value 0 to the OR circuit 309a when the two destination IDs do not match. The other comparators 308b to 308l operate in the same manner.

In the example of FIG. 6, the OR circuit 309a outputs, to the selector 310, the logical disjunction of inputs from the comparators 308a to 308d. Similarly, the OR circuit 309b outputs, to the selector 310, the logical disjunction of inputs from the comparators 308e to 308h, and the OR circuit 309c outputs, to the selector 310, the logical disjunction of inputs from the comparators 308i to 308l.

Accordingly, a control signal of 3 bits in total is input to the selector 310, each 1 bit being input from each of the OR circuits 309a to 309c. This 3-bit control signal is a one-hot signal, in which only 1 bit has a logical value 1. The selector 310 selects any of the pieces of output port information held in the FFs 311a to 311c in accordance with the bit position of a logical value 1, and outputs the output port information to the branching unit 306 via the signal line 304. In other words, the selector 310 operates as below.

When a logical value 1 is output from the OR circuit 309a and a logical value 0 is output from the OR circuits 309b and 309c, the selector 310 outputs the output port information held in the FFs 311a corresponding to the OR circuit 309a to the branching unit 306.

When a logical value 1 is output from the OR circuit 309b and a logical value 0 is output from the OR circuits 309a and 309c, the selector 310 outputs the output port information held in the FFs 311b corresponding to the OR circuit 309b to the branching unit 306.

When a logical value 1 is output from the OR circuit 309c and a logical value 0 is output from the OR circuits 309a and 309b, the selector 310 outputs the output port information held in the FFs 311c corresponding to the OR circuit 309c to the branching unit 306.

The operations of the routing table unit 204c as explained above result in the packet received by the input port 201c being sorted properly to any of the output buffer controllers 207ca, 207ce, and 207cg in accordance with the destination ID designated by the header.

Next, details of the output buffer controller are explained with reference to FIG. 7. Although FIG. 7 illustrates a configuration diagram of the output buffer controller 207ca, the other eleven output buffer controllers illustrated in FIG. 5 also have the same configuration.

As illustrated in FIG. 7, the output buffer controller 207ca includes a controller 400, a data packet storage unit 410, a request packet storage unit 420, and an inter-packet selector 430. In addition, as stated in the explanation of FIG. 5, the output buffer controller 207ca is connected to the routing unit 203, the interport arbiter unit 205a, and the interport selector 206a.

The controller 400 controls the entire output buffer controller 207ca. Further details are explained later, but, as an example, the controller 400 performs the following operations (f1) to (f4).

(f1) Control of writing packets in the data packet storage unit 410 and the request packet storage unit 420

(f2) Control of outputting packets from the data packet storage unit 410 and the request packet storage unit 420 to the inter-packet selector 430

(f3) Arbitration between the data packet storage unit 410 and the request packet storage unit 420 with respect to from which a stored packet is to be output to the inter-packet selector 430 when both store packets (f4) Control of the issue of the output request to the interport arbiter unit 205a The controller 400 includes an inter-packet arbiter unit 401 which performs the control of (f3) above. The inter-packet arbiter unit 401 includes an inter-packet arbiter 402, a comparator 403, and a comparator 404. In addition, the controller 400 includes an encoder 405 which outputs a VALID signal in accordance with the packet type. More specifically, the encoder 405 distinguishes between a data packet and a request packet and outputs a VALID signal.

Note that in the following description, the "data packet" refers to a packet that has a data payload, and the "request packet" refers to a packet that does not have a data payload. For example, the write-back data packet in the above (d3) and the transfer data packet in (d4) are examples of data packets. The memory access request packet in (d1) and the data transfer request packet in (d2) are examples of request packets.

In addition, the controller 400 includes a write pointer controller 406 and a read pointer controller 407 for data packets, and also includes a write pointer controller 408 and a read pointer controller 409 for request packets.

A "read pointer" and a "write pointer" are pointers indicating an address in the data packet storage unit 410 and the request packet storage unit 420. The write pointer represents the address in which a packet is to be stored next, and the read pointer represents the address in which the packet to be read next is stored.

The data packet storage unit 410 is a buffer temporarily storing the data packet(s), and the request packet storage unit 420 is a buffer temporarily storing the request packet(s). In other words, the "buffers" in the explanations on each of the drawings above are the data packet storage unit 410 and the request packet storage unit 420, and in particular, the buffer capacity focused on in the above explanations is the capacity of the data packet storage unit 410, which requires a capacity to store the data payload. For the data packet storage unit 410 and the request packet storage unit 420, RAM is used as an example.

In addition, the read control and write control of the packets in the data packet storage unit 410 and the request packet storage unit 420 are performed in accordance with the FIFO algorithm. Therefore the write pointer controllers 406 and 408 may each manage the write pointer with a counter in which FFs (Flip-Flops) are used, while details will be explained later with reference to FIG. 8. Similarly, the read pointer controllers 407 and 409 may also each manage the read pointer with a counter in which FFs are used, while details will be explained later with reference to FIG. 9.

The inter-packet selector 430 selects either the data packet storage unit 410 or the request packet storage unit 420 in accordance with the control of the controller 400 and outputs the packet to the interport selector 206a.

Note that in the following description, the following (g1) to (g4) are defined in regard to the inside of the data packet storage unit 410 and the request packet storage unit 420.

(g1) The capacity necessary to store one data packet is D bytes at a maximum. In other words, the specification determines that a data packet has a fixed length of D bytes or a variable length of the maximum of D bytes.

(g2) Addresses in the data packet storage unit 410 are managed by block numbers, while D bytes being assumed to be one block. In other words, a value of the write pointer controlled by the write pointer controller 406 and a value of the read pointer controlled by the read pointer controller 407 are block numbers in the data packet storage unit 410.

(g3) The capacity necessary to store one request packet is R bytes at a maximum (R<D). In other words, the specification determines that a request packet has a fixed length of R bytes or a variable length of the maximum of R bytes.

(g4) Addresses in the request packet storage unit 420 are managed by block numbers, while R bytes being assumed to be one block. In other words, a value of the write pointer controlled by the write pointer controller 408 and a value of the read pointer controlled by the read pointer controller 409 are block numbers in the request packet storage unit 420.

In the above description, the configuration of the output buffer controller 207ca is explained. Next, operations performed from when a packet is output from the routing unit 203 to the output buffer controller 207ca and to when the output buffer controller 207ca outputs the packet to the interport selector 206a are explained.

Firstly, the routing unit 203 outputs a packet to the output buffer controller 207ca via a signal line 441. The signal line 441 branches into a signal line 442 and a signal line 443, as illustrated in FIG. 7, and the packet is output to the signal line 442.

As indicated as step S401, a packet type field in a packet header is output to the signal line 443. Then the encoder 405, to which the signal line 443 is connected, determines whether the packet input from the routing unit 203 is a data packet or a request packet according to the value in the packet type filed.

The operations performed when the packet is determined to be a data packet in step S401 are described below as steps S402d to S406d.

The encoder 405 outputs a VALID signal to the write pointer controller 406 for data packets as indicated in step S402d. In the following description, suppose for convenience that the VALID signal is in positive logic. In step S402d, the encoder 405 outputs a signal with a logical value 1 to the write pointer controller 406. Note that in this case, the encoder 405 outputs a logical value 0 denoting invalidity to the write pointer controller 408 for request packets.

In the next step S403d, the write pointer controller 406, which received the VALID signal, outputs a write instruction and a write pointer value to the data packet storage unit 410 and updates the write pointer value. In addition, the write pointer controller 408, to which a logical value 0 was input, does not update the write pointer value, but maintains the previous write pointer value. Note that the "write instruction" to the data packet storage unit 410 is an instruction to write the packet input via the signal line 442 at an address in the data packet storage unit 410 indicated by the write pointer value. In the following description, it is assumed that the write instruction is also in positive logic for the convenience of explanation. In other words, it is assumed that a logical value 1 indicates that a write instruction is asserted and a logical value 0 indicates that a write instruction is negated.

Here, in order to explain the operation in step S403d more specifically, FIG. 8 is referred to. FIG. 8 is a configuration diagram of the write pointer controller 406.

As illustrated in FIG. 8, the write pointer controller 406 includes FFs 451 for storing a write pointer value. The FFs 451 form a counter circuit that uses the VALID signal input from the encoder 405 as a count enable signal. The number of bits of the FFs 451 depends on the maximum value of the block number in the data packet storage unit 410 explained in the above (g2). In addition, the write pointer controller 406 outputs the signal itself input from the encoder 405 to the data packet storage unit 410.

In other words, when a logical value 1 is input as the VALID signal from the encoder 405 in step S402d, the write pointer controller 406 outputs the input logical value 1 as-is to the data packet storage unit 410 as a write instruction in step S403d. The write pointer controller 406 also outputs the write pointer value held in the FFs 451 to the data packet storage unit 410. Afterwards, the write pointer controller 406 increments the value held in the FFs 451 by 1 in accordance with the VALID signal serving as the count enable signal.

On the other hand, when a logical value 0 is input from the encoder 405, the write pointer controller 406 outputs the logical value 0 as-is to the data packet storage unit 410, and the FFs 451 do not perform the counting-up operation.

Here, the description returns to the explanation of FIG. 7. The data packet storage unit 410 operates as below in step S404d. That is, the data packet storage unit 410 stores the data packet input via the signal line 442 at the address indicated by the write pointer value input in step S403d in accordance with the write instruction received in step S403d.

In addition, as indicated as step S405d, the write pointer controller 406 outputs the write pointer value updated in step S403d to the comparator 403 in the inter-packet arbiter unit 401. Note that steps S404d and S405d may be performed at the same time in parallel.

Furthermore, the read pointer controller 407 is also connected to the comparator 403 as illustrated in FIG. 7, and the read pointer value has been input to the comparator 403 upon the read pointer held in the read pointer controller 407 being updated previously.

In step S406d next, the comparator 403 compares the write pointer value input from the write pointer controller 406 with the read pointer value input from the read pointer controller 407.

When the write pointer value matches the read pointer value as a result of the comparison, there is no data packet that is stored in the data packet storage unit 410 to wait for the output to the interport selector 206a. Consequently, the comparator 403 does not output an output request to the inter-packet arbiter 402. In other words, the comparator 403 negates the output request.

On the other hand, when the write pointer value does not match the read pointer value, there is/are a data packet(s) that is/are stored in the data packet storage unit 410 to wait for the output to the interport selector 206a. Consequently, the comparator 403 outputs (i.e., asserts) an output request to the inter-packet arbiter 402.

Steps S402d to S406d explained above represent the operations in a case in which the packet is determined, in step S401, to be a data packet, which has a data payload. On the other hand, the operations in a case in which the packet is determined, in step S401, to be a request packet, which do not have a data payload, are described as the following steps S402r to S406r. Since steps S402r to S406r are similar to steps S402d to S406d, an explanation of these steps is provided briefly.

When a packet is determined to be a request packet in step S401, the encoder 405 outputs a VALID signal to the write pointer controller 408 for request packets, as indicated by step S402r, and outputs a logical value 0 representing invalidity to the write pointer controller 406 for data packets.

In the next step S403r, the write pointer controller 408, which received the VALID signal, outputs a write instruction and a write pointer value to the request packet storage unit 420 and updates the write pointer value. The write pointer controller 408 is configured in the same manner as the write pointer controller 406 in FIG. 8.

In the next step S404r, the request packet storage unit 420 stores the request packet input via the signal line 442 at the address indicated by the write pointer value input in step S403r in accordance with the write instruction received in step S403r.

As indicated as step S405r, the write pointer controller 408 outputs the updated write pointer value to the comparator 404. Steps S404r and S405r may be performed in parallel.

In step S406r, the comparator 404 compares the write pointer value input from the write pointer controller 408 with the read pointer value input from the read pointer controller 409. When the two values match, the comparator 404 does not output an output request to the inter-packet arbiter 402. When the two values do not match, the comparator 404 issues an output request to the inter-packet arbiter 402.

The inter-packet arbiter 402, when receiving the output request in step S406d or S406r, outputs an output request to the interport arbiter unit 205a in the subsequent step S407.

Note that when both comparators 403 and 404 output the output requests, the inter-packet arbiter 402 performs arbitration according to an LRU algorithm or a round robin algorithm. The inter-packet arbiter 402 determines which of the output requests is to be output to the interport arbiter unit 205a first in accordance with the arbitration result, and outputs the output request to the interport arbiter unit 205a.

As explained in connection with FIG. 5, the interport arbiter unit 205a arbitrates the output requests from the output buffer controllers 207ca, 207ea, and 207ga. As a result of the arbitration, the interport arbiter unit 205a notifies the output buffer controller 207ca of output permission in step S408.

Then the output buffer controller 207ca operates as in the following steps S409d to S412d if the output request from the comparator 403 for data packets is selected and is output to the interport arbiter unit 205a in step S407. The output buffer controller 207ca operates as in the following steps S409r to S412r if the output request from the comparator 404 for request packets is selected and is output to the interport arbiter unit 205a in step S407.

Specifically, the inter-packet arbiter 402 in step S409d outputs, to the inter-packet selector 430, an output packet type selection signal for giving an instruction to output the data packet. For example, letting the output packet type selection signal be represented by 2 bits and decoding these 2 bits lead "10" to indicate the output of a data packet, "01" to indicate the output of a request packet, "00" to indicate the output of neither type of packet, and "11" not to be used as indicating "don't care". Of course, the output packet type selection signal may have other formats.

In addition, the inter-packet arbiter 402 in step S409d outputs a read pointer update instruction to the read pointer controller 407 for data packets. Note that for convenience of explanation, it is assumed that the read pointer update instruction is also in positive logic in the following description.

Figure 9:
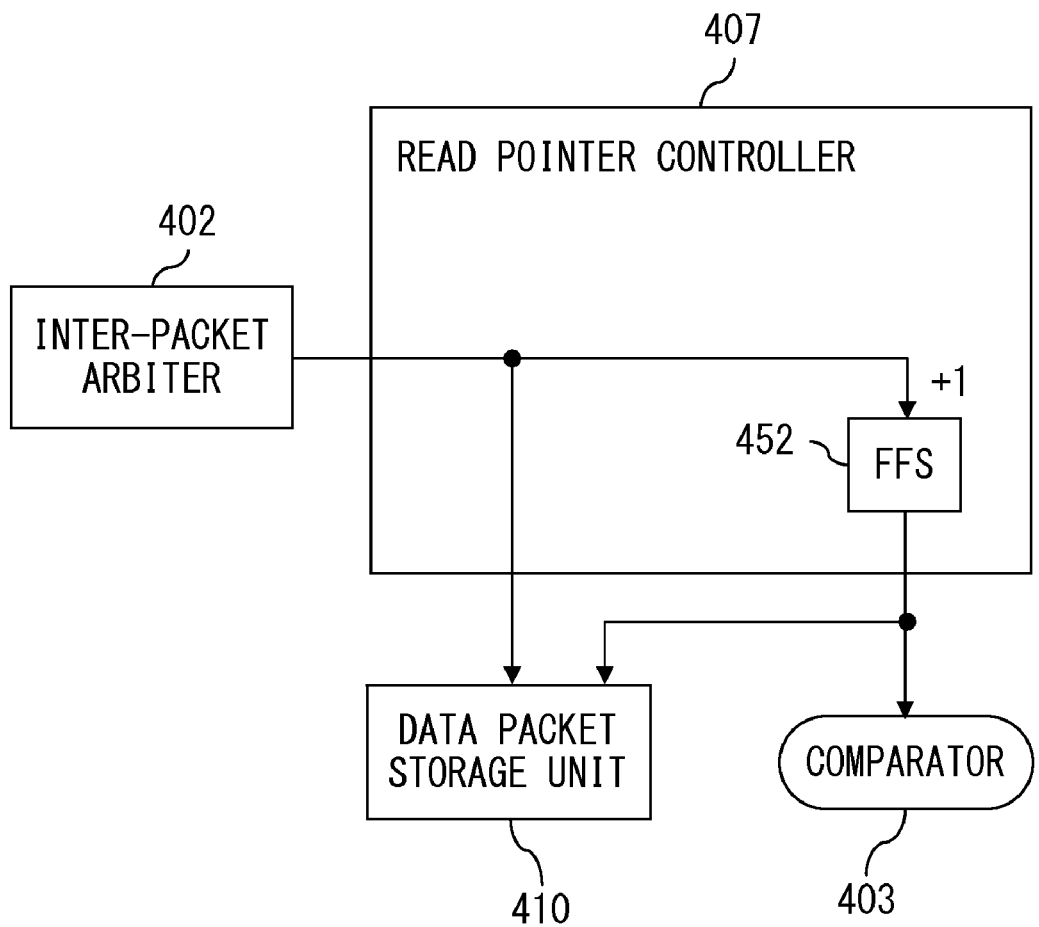
FIG. 9 is a configuration diagram of a read pointer controller in the comparative example.

Here, FIG. 9 is referred to for an explanation of further details of the operation of step S409d. FIG. 9 is a configuration diagram of the read pointer controller 407.

As illustrated in FIG. 9, the read pointer controller 407 includes FFs 452 for storing a read pointer value. The FFs 452 form a counter circuit that uses the read pointer update instruction input from the inter-packet arbiter 402 as a count enable signal. The number of bits of the FFs 452 is also required to be the number of bits sufficient to represent the maximum value of the block number in the data packet storage unit 410 explained in (g2) above. In addition, the read pointer controller 407 outputs the signal itself input from the inter-packet arbiter 402 to the data packet storage unit 410.

In the following description, steps S409d to S411d are explained with reference to both FIG. 9 and FIG. 7. When a logical value 1 is input as the read pointer update instruction in step S409d, the read pointer controller 407 outputs the input logical value 1 as-is to the data packet storage unit 410 as a read instruction in step S410d. In addition, the read pointer controller 407 outputs the read pointer value held in the FFs 452 to the data packet storage unit 410. Afterwards, the read pointer controller 407 increments the value held in FFs 452 by 1 in accordance with the read pointer update instruction serving as the count enable signal.

On the other hand, when a logical value 0 is input from the inter-packet arbiter 402, the read pointer controller 407 outputs the logical value 0 as-is to the data packet storage unit 410, and the FFs 452 do not perform the counting-up operation.

When the read pointer value is updated in step S410*d*, the read pointer controller 407 outputs the updated read pointer value to the comparator 403 in the inter-packet arbiter unit 401 in the following step S411*d*. Furthermore, in step S412*d*, the data packet storage unit 410 outputs the data packet stored at the address indicated by the read pointer value input in step S410*d* to the inter-packet selector 430 in accordance with the read instruction received in step S410*d*.

Note that steps S411*d* and S412*d* may be performed in parallel. When the read pointer value is not updated, the read instruction is not asserted, and therefore step S412*d* is not performed.

The above-explained steps S409*d* to S412*d* are the operations performed when the output request from the comparator 403 for data packets is selected in step S407. On the other hand, the operations performed when the output request from the comparator 404 for request packets is selected in step S407 are described below as steps S409*r* to S412*r*. Since steps S409*r* to S412*r* are similar to steps S409*d* to S412*d*, a brief explanation is provided.

In step S409*r*, the inter-packet arbiter 402 outputs, to the inter-packet selector 430, an output packet type selection signal ("01" in the above example format) for giving an instruction to output the request packet. The inter-packet arbiter 402 also outputs a read pointer update instruction to the read pointer controller 409 for request packets. The read pointer controller 409 is configured in the same manner as the read pointer controller 407 in FIG. 9.

When a logical value 1 is input as the read pointer update instruction in step S409*r*, the read pointer controller 409 outputs the input logical value 1 as-is to the request packet storage unit 420 as a read instruction in step S410*r*. In addition, the read pointer controller 409 outputs the read pointer value to the request packet storage unit 420 and increments the read pointer value by 1.

On the other hand, if a logical value 0 is input from the inter-packet arbiter 402, the read pointer controller 409 outputs the logical value 0 as-is to the request packet storage unit 420 and does not update the read pointer.

When the read pointer value is updated in step S410*r*, the read pointer controller 409 outputs the updated read pointer value to the comparator 404 in the inter-packet arbiter unit 401 in the following step S411*r*. Furthermore, in step S412*r*, the request packet storage unit 420 outputs the request packet stored at the address indicated by the read pointer value input in step S410*r* to the inter-packet selector 430 in accordance with the read instruction received in step S410*r*.

Note that steps S411*r* and S412*r* may be performed in parallel. When the read pointer value is not updated, the read instruction is not asserted, and therefore step S412*r* is not performed.

After steps S409*d* to S412*d* or steps S409*r* to S412*r* are performed as described above, the inter-packet selector 430 in step S413 operates as below. That is, the inter-packet selector 430 selects an output from the data packet storage unit 410 or that from the request packet storage unit 420 in accordance with the output packet type selection signal input in step S409*d* or S409*r*, and outputs the packet to the interport selector 206*a*.

In the above description, details of the XB 102 in the comparative example are explained.

Note that the data packet storage unit 410 in FIG. 7 may store a write-back data packet and a shared-type transfer data packet, both of which have the same data payload, in some cases such as the following. That is, the case is one in which the CPU 104*a* in FIG. 1 outputs a shared-type memory access request packet in order to request data stored in the main memory 105*a*, and the requested data is found to be cached in the CPU 104*c*.

In such a case, both the write-back data packet and the shared-type transfer data packet are output from the CPU 104*c* and they are individually routed to the CPU 104*a* and the SC 103*a*, which belong to the same node 101*a*. It is therefore probable that the data packet storage unit 410 in the output buffer controller 207*ca* in FIG. 7 stores two packets having the same data payload.

Next, details of the SC 103*c* in the comparative example are explained with reference to FIG. 10 and FIG. 11.

Figure 10:
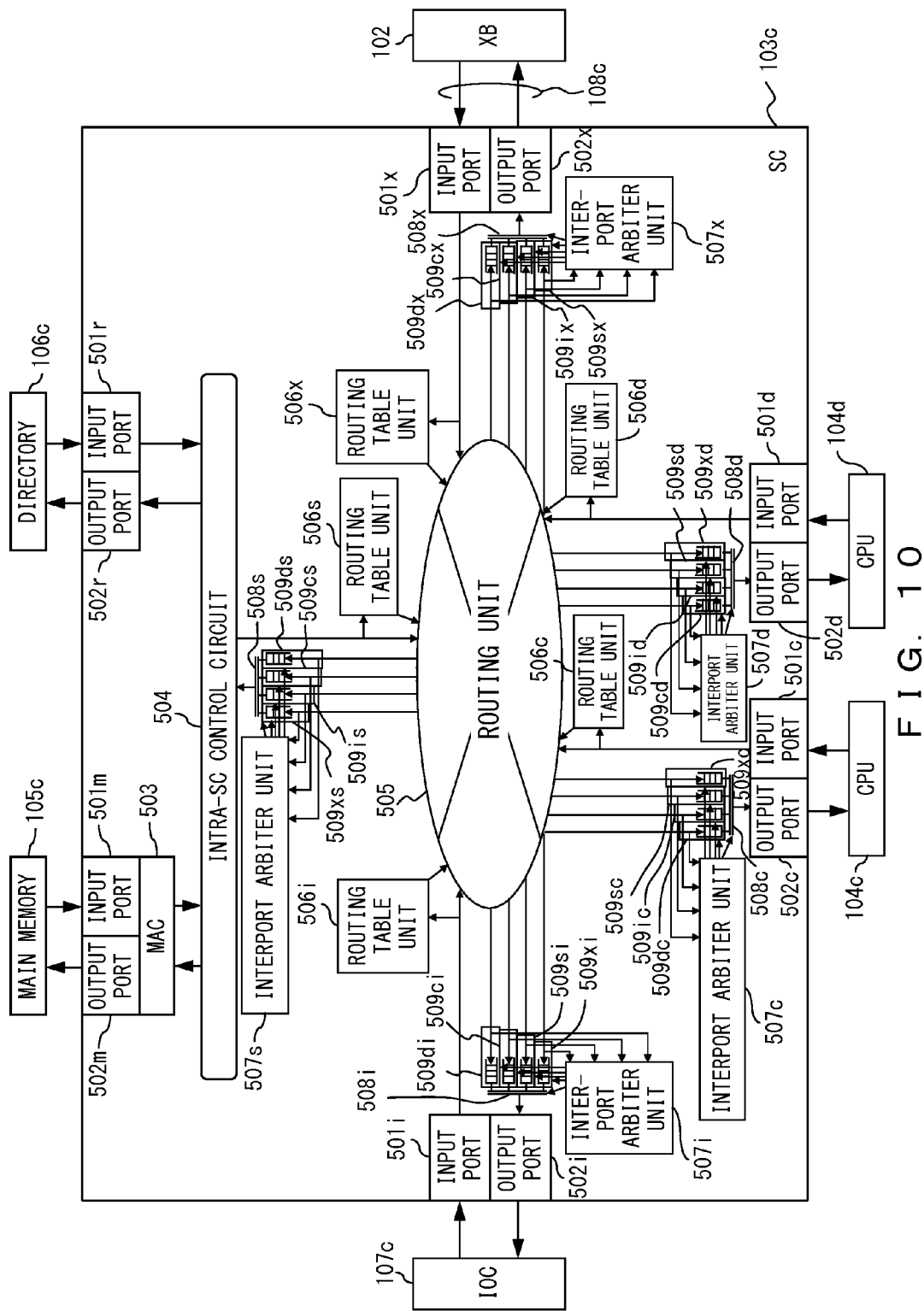
FIG. 10 is a configuration diagram of an SC in the comparative example.

FIG. 10 is a configuration diagram of the SC 103*c*, which is illustrated in FIG. 1, in the comparative example. Although the illustrations are omitted, the other SCs 103*a*, 103*e*, and 103*g* have the same configuration as the SC 103*c*.

As illustrated in FIG. 10, the SC 103*c* is connected to the XB 102 via the bus 108*c*. In addition, the SC 103*c* is also connected to the CPU 104*c*, the CPU 104*d*, the main memory 105*c*, the directory 106*c*, and the IOC 107*c* in the node 101*c* via the buses in the node 101*c*. The SC 103*c* controls data transmission in the packet format between the components in the node 101*c* and the other SCs 103*a*, 103*e*, and 103*g*.

The SC 103*c* includes input ports 501*x*, 501*c*, 501*d*, 501*m*, 501*r*, and 501*i* for receiving packets from the XB 102, the CPU 104*c*, the CPU 104*d*, the main memory 105*c*, the directory 106*c*, and the IOC 107*c*, respectively.

The SC 103*c* also includes output ports 502*x*, 502*c*, 502*d*, 502*m*, 502*r*, and 502*i* for outputting packets to the XB 102, the CPU 104*c*, the CPU 104*d*, the main memory 105*c*, the directory 106*c*, and the IOC 107*c*, respectively.

The above input ports 501*x* to 501*i* and output ports 502*x* to 502*i* implement frequency conversion processing to absorb differences in the operation frequencies of individual components, if necessary.

The SC 103*c* also includes a MAC (Memory Access Controller) 503 and an intra-SC control circuit 504, which are devices for controlling memory access and are connected to each other, and thereby controlling the access to the main memory 105*c*. The MAC 503 is further connected to the input port 501*m* and the output port 502*m*. The intra-SC control circuit 504 is connected to the input port 501*r* and the output port 502*r*.

The intra-SC control circuit 504 performs cache consistency control when a memory access request to the main memory 105*c* is received. The cache consistency control is performed according to a predetermined cache protocol such as the MESI protocol. The intra-SC control circuit 504 also controls referencing and updating of the directory 106*c* for cache consistency control.

Note that the intra-SC control circuit 504 sometimes receives a memory access request from the CPU 104*c*, the CPU 104*d*, or the IOC 107*c* within the same node 101*c*. The intra-SC control circuit 504 may also receive a memory access request from a component within another node 101*a*, 101*e*, or 101*g* via the XB 102.

FIG. 11 is a diagram illustrating an example of the directory 106*c* in the comparative example. The directory 106*c* is a data structure for managing the main memory 105*c* within the same node 101*c* and is used when the intra-SC control circuit 504 performs the cache consistency control of the main memory 105*c*.

FIG. 11 illustrates the directory 106c in a table format. Each entry of the directory 106c is a tuple of an address, an owner, and a state.

In FIG. 11, the "address" in the left column is an address in the main memory 105c.

The "owner" in the middle column in FIG. 11 is an ID of a CPU that holds, as a cache line in its cache memory, data of a block in the main memory 105c indicated by the address.

The "state" in the right column in FIG. 11 is a state of memory data that the "owner" holds. Depending on the cache protocol, any one of the various states exemplified in the above (b1) to (b5), for example, is used to indicate the "state".

Here, the explanation returns to the explanation of FIG. 10. The MAC 503 performs controls for actually writing data to the main memory 105c and reading data from the main memory 105c on the basis of memory access requests output from the intra-SC control circuit 504.

The SC 103c also includes a routing unit 505. Like the routing unit 203 in the XB 102 illustrated in FIG. 5 and FIG. 6, the routing unit 505 sorts packets. The routing unit 505 is connected to the input ports 501x, 501c, 501d, and 501i, and to the intra-SC control circuit 504.

The SC 103c also includes routing table units 506x, 506c, 506d, 506i and 506s connected to the input ports 501x, 501c, 501d, and 501i and the intra-SC control circuit 504, respectively. Each of the routing table units 506x, 506c, 506d, 506i and 506s is also connected to the routing unit 505. The details of each of the routing table units 506x, 506c, 506d, 506i, and 506s are similar to those of the routing table unit 204c in FIG. 6, and for that reason, the explanations in detail are omitted.

The SC 103c also includes five sets of circuits respectively corresponding to the output ports 502x, 502c, 502d, and 502i and the intra-SC control circuit 504. The five sets of circuits are provided in the respective preceding stages of these five components (i.e., the output ports 502x, 502c, 502d, and 502i and the intra-SC control circuit 504).

For example, a set of circuits provided in the preceding stage of the output port 502x includes an interport arbiter unit 507x, an interport selector 508x, and output buffer controllers 509cx, 509dx, 509ix, and 509sx. Circuits provided in the preceding stages of the other four components are similar to the above circuits provided in the preceding stage of the output port 502x.

The interport arbiter unit 507x is similar to the interport arbiter unit 205a provided in the XB 102 as in FIG. 5. In other words, the interport arbiter unit 507x is connected to the output buffer controllers 509cx, 509dx, 509ix, and 509sx, and arbitrates output requests from these output buffer controllers 509cx, 509dx, 509ix, and 509sx.

The interport selector 508x is similar to the interport selector 206a provided in the XB 102 as in FIG. 5. In other words, the interport selector 508x outputs a packet output from the selected output buffer controller 509cx, 509dx, 509ix, or 509sx to the output port 502x in accordance with the arbitration result reported by the interport arbiter unit 507x.

Note that packets received by the input port 501c from the CPU 104c are input to the output buffer controller 509cx via the routing unit 505. Similarly, packets received by the input port 501d from the CPU 104d are input to the output buffer controller 509dx via the routing unit 505.

In addition, packets received by the input port 501i from the IOC 107c are input to the output buffer controller 509ix via the routing unit 505. Packets arriving from the main memory 105c via the input port 501m, the MAC 503, the intra-SC control circuit 504, and the routing unit 505 are input to the output buffer controller 509sx.

Details of the above output buffer controllers 509cx, 509dx, 509ix, and 509sx are similar to those of the output buffer controller 207ca in the XB 102 illustrated in FIG. 7, and therefore their explanations are omitted. In the following description, the same reference sings as those of the components in the output buffer controller 207ca of FIG. 7 are used for the components in the output buffer controller 509cx for example.

In the above descriptions, the insides of the individual components in FIG. 1 are explained in detail with reference to FIG. 5 to FIG. 11.

Next, details of operations of the output buffer controller 509cx in the comparative example performed when the same cache protocol as that of FIG. 4 is employed and steps S304 and S305 of FIG. 4 are performed are explained with reference to each of FIGS. 12 and 13.

As described in the explanation of FIG. 4, let P be the maximum outstanding number of the data transfer request packets that the SC103c outputs to the CPUs 104c and 104d within the same node 101c. Consequently, a buffer with a capacity for storing at least 2P data packets is required in each of the output buffer controllers 509cx and 509dx.

In other words, in the output buffer controller 509cx configured similarly to FIG. 7, the data packet storage unit 410 includes at least 2P blocks which are D-byte long as explained in (g2) above. FIG. 12 and FIG. 13 explain that the data packet storage unit 410 needs to include at least 2P blocks.

Figure 12:
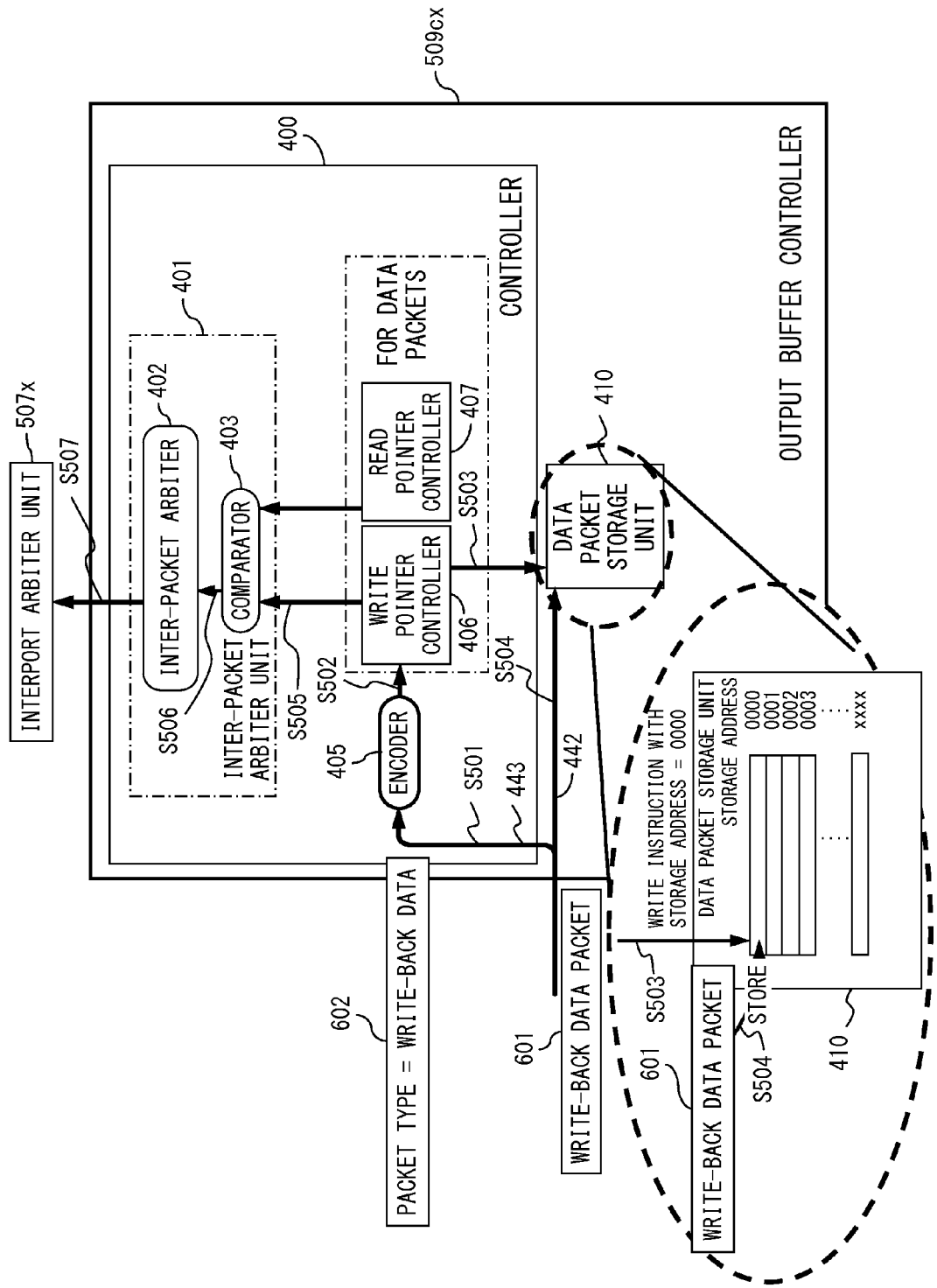
FIG. 12 is a diagram explaining the operations performed by an output buffer controller in an SC when a CPU outputs a write-back data packet to the SC in the comparative example.

FIG. 12 is a diagram explaining the operations performed by the output buffer controller 509cx in the SC 103c when the CPU 104c outputs a write-back data packet to the SC 103c in step S304 of FIG. 4 in this comparative example. FIG. 13 is a diagram explaining the operations performed by the output buffer controller 509cx in the SC 103c when the CPU 104c outputs a transfer data packet to the SC 103c in step S305 of FIG. 4 in this comparative example.

Note that as described above, the output buffer controller 509cx is configured similarly to the output buffer controller 207ca in FIG. 7. From among the components in the output buffer controller 509cx, only the components relevant to steps S304 and S305 are selectively illustrated in FIG. 12 and FIG. 13, and other components are omitted.

Steps S501 to S507 in FIG. 12 are similar to steps S401, S402d to S406d, and S407, respectively, which are explained in relation to the output buffer controller 207ca in FIG. 7.

In step S304 of FIG. 4, the CPU 104c outputs to the SC 103c a write-back data packet 601 addressed to the SC 103e. The SC 103c consequently receives the write-back data packet 601 at the input port 501c of FIG. 10.

The destination of the write-back data packet 601 is the SC 103e, and the SC 103e is located in the node 101e, which is different from that of the SC 103c. Therefore the routing table unit 506c in FIG. 10 notifies the routing unit 505 of the output port information indicating the output port 502x corresponding to the XB 102. In accordance with the notification, the routing unit 505 outputs the write-back data packet 601 to the output buffer controller 509cx in the preceding state of the output port 502x.

Then in step S501 of FIG. 12, a packet type field 602 of the write-back data packet 601 is output to the encoder 405 via the signal line 443.

Since the write-back data packet 601 is a kind of data packet, the encoder 405 outputs a VALID signal to the write pointer controller 406 for data packets in the following step S502.

In the following description, for convenience of explanation, it is assumed that at the point in time at which the write-back data packet 601 is output to the output buffer controller 509cx, the value of the write pointer held in the FFs 451 in the write pointer controller 406 is "0000". Similarly, for convenience of explanation, it is assumed that at the point in time at which the write-back data packet 601 is output to the output buffer controller 509cx, the value of the read pointer held in the FFs 452 in the read pointer controller 407 is also "0000".

In the next step S503, the write pointer controller 406, which received the VALID signal, outputs a write instruction and the write pointer value "0000" to the data packet storage unit 410, and updates the write pointer value to "0001".

Then in step S504, the data packet storage unit 410 stores the write-back data packet 601, which is input via the signal line 442, at the address "0000", which is input in step S503, in accordance with the write instruction.

Then in step S505, the write pointer controller 406 outputs the new write pointer value "0001", which results from the update in step S503, to the comparator 403 in the inter-packet arbiter unit 401. In addition, the above-assumed read pointer value of "0000" is also output to the comparator 403.

Then in step S506, the comparator 403 compares the write pointer value "0001" and the read pointer value "0000", which are for data packets. As a result of the comparison, the two values do not match, and therefore the comparator 403 outputs an output request to the inter-packet arbiter 402.

Then in step S507, the inter-packet arbiter 402 outputs an output request to the interport arbiter unit 507x. In the example of FIG. 12, it is assumed that an output permission is not issued immediately by the interport arbiter unit 507x and that the inter-packet arbiter 402 waits for a while for the output permission, maintaining the state in which the output request is output to the interport arbiter unit 507x.

Figure 13:
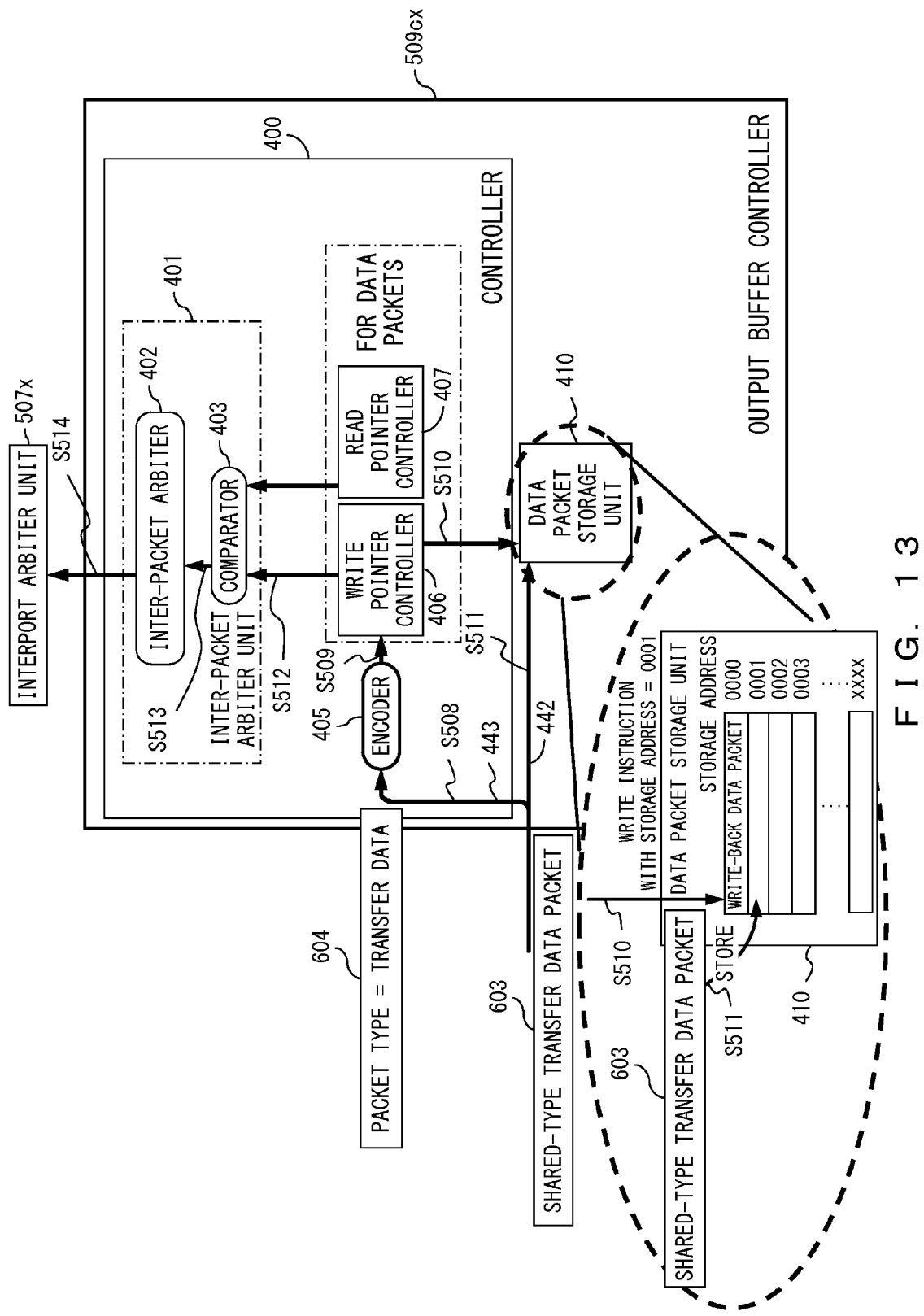
FIG. 13 is a diagram explaining the operations performed by the output buffer controller in the SC when the CPU subsequently outputs a transfer data packet to the SC in the comparative example.

Next, with reference to FIG. 13, operations performed by the output buffer controller 509cx in the SC 103c when the CPU 104c outputs a transfer data packet to the SC 103c in step S305 of FIG. 4 are explained. Note that steps S508 to S514 of FIG. 13 are also similar to step S401, S402d to S406d and S407 of FIG. 7, respectively.

In the example illustrated in FIG. 12 and FIG. 13, step S508 is performed after step S501, but is not always performed after steps S502 to S507. It is possible, for example, for step S508 to be performed in parallel with the encoder 405 performing step S502.

In step S305 of FIG. 4, the CPU 104c outputs to the SC 103c a shared-type transfer data packet 603 addressed to the CPU 104a. The SC 103c then receives the shared-type transfer data packet 603 at the input port 501c of FIG. 10.

The destination of the shared-type transfer data packet 603 is the CPU 104a, and the CPU 104a is located in the node 101a, which is different from that of the SC 103c. Accordingly, the routing table unit 506c of FIG. 10 notifies the routing unit 505 of the output port information indicating the output port 502x corresponding to the XB 102. In accordance with the notification, the routing unit 505 outputs the shared-type transfer data packet 603 to the output buffer controller 509cx in the preceding stage of the output port 502x.

As a result, in step S508 of FIG. 13, a packet type field 604 of the shared-type transfer data packet 603 is output to the encoder 405 via the signal line 443.

Since the shared-type transfer data packet 603 is a kind of data packet, the encoder 405 outputs a VALID signal to the write pointer controller 406 for data packets in the following step S509.

Assuming that the CPU 104c does not output other packets between the write-back data packet 601 and the shared-type transfer data packet 603, the write pointer value managed by the write pointer controller 406 is "0001" and the read pointer value managed by the read pointer controller 407 is "0000" at the time of step S509.

In the next step S510, the write pointer controller 406, which received the VALID signal, outputs a write instruction and the write pointer value "0001" to the data packet storage unit 410, and updates the write pointer value to "0002".

The data packet storage unit 410, then in step S511, stores the shared-type transfer data packet 603, which is input via the signal line 442, at the address "0001", which is input in step S510, in accordance with the write instruction.

Then in step S512, the write pointer controller 406 outputs the new write pointer value "0002", which results from the update in step S510, to the comparator 403.

In step S513, the comparator 403 compares the write pointer value "0002" and the read pointer value "0000", which are for data packets, and since the two values do not match, the comparator 403 therefore outputs a new output request to the inter-packet arbiter 402.

Assuming herein that the output permission to the output request of step S507 in FIG. 12 has not yet been issued, the inter-packet arbiter 402 remains in the state of outputting a signal of the output request to the interport arbiter unit 507x. Therefore, the inter-packet arbiter 402 maintains the state of asserting the output request also in step S514.

As explained with reference to FIG. 12 and FIG. 13 in the above, in the above comparative example, the data packet storage unit 410 may need to store both the write-back data packet 601 and the shared-type transfer data packet 603.

Here, the data payloads of the write-back data packet 601 and of the shared-type transfer data packet 603 are the same, as is apparent from the explanation in FIG. 4. In addition, the data payload is generally longer than the packet header. In other words, in the example of FIG. 12 and FIG. 13, two mostly redundant packets are stored at the address "0000" and the address "0001", which is an inefficient usage of the buffer.

More specifically, the need for redundant storage as described above arises if it takes a long time from when the inter-packet arbiter 402 in the output buffer controller 509cx outputs the output request to the interport arbiter unit 507x to when the interport arbiter unit 507x asserts the output permission. Since the time period until the output permission is obtained is dynamically determined, the designing of the output buffer controller 509cx needs to assume the worst possible case. In other words, the data packet storage unit 410 of the output buffer controller 509cx requires a capacity of at least [D bytes]×[2P blocks] as described above.

The CPU 104a requests the data stored in the main memory 105e in step S301 in FIG. 4; there may be also a case in which the CPU 104e requests the data stored in the main memory 105e. In such a case, the CPU 104c storing the data in its cache memory outputs both a write-back data packet addressed to the SC 103e and a shared-type transfer data packet addressed to the CPU 104e.

Here, both of the destinations of the two packets having a common data payload are components in the node 101e. Therefore both the write-back data packet and the shared-type transfer data packet take the same route from the CPU 104c to the SC 103e.

In this route, arbitrations are performed at the interport arbiter unit 507x in the preceding stage of the output port 502x connected to the XB 102 in the SC 103c and at the interport arbiter unit 205e in the preceding stage of the output port 202e connected to the SC 103e in the XB 102. The result of the arbitration may necessitate the XB 102 also buffering the write-back data packet and the shared-type transfer data packet at the same time.

In other words, the data packet storage unit 410 in the output buffer controller 207*ce* in the preceding stage of the output port 202*e* connected to the SC 103*e* may be necessitated to store both the write-back data packet and the shared-type transfer data packet.

That is, in this comparative example, the output buffer controllers provided in each of the SCs 103*a* to 103*g* and the XB 102 may be necessitated to redundantly store two packets having the same data payload.

Thus it would be possible to reduce the mount area and power consumption of the buffer (i.e. the data packet storage unit 410) if the above need to redundantly store the write-back data packet 601 and the shared-type transfer data packet 603 is eliminated. As a result, the performance of the whole server system 100 would be improved.

The following description explains, with reference to FIG. 14 to FIG. 29, the first embodiment in which a buffer capacity necessary in an output buffer controller provided in each of the SCs 103*a* to 103*g* and the XB 102 is reduced compared with the above comparative example.

The first embodiment is also explained by using the server system 100 in FIG. 1 as an example as in the above comparative example. Explanations of some points common with the above comparative example are omitted accordingly. In the following description, for the explanation of the first embodiment, an outline of operations are provided first with reference to FIG. 14 and in comparison with FIG. 4; and then an overview of the components different from those of the comparative example are explained with reference to FIG. 15 and FIG. 16. Afterwards, details of the first embodiment are explained with reference to FIG. 17 to FIG. 29.

Figure 14:
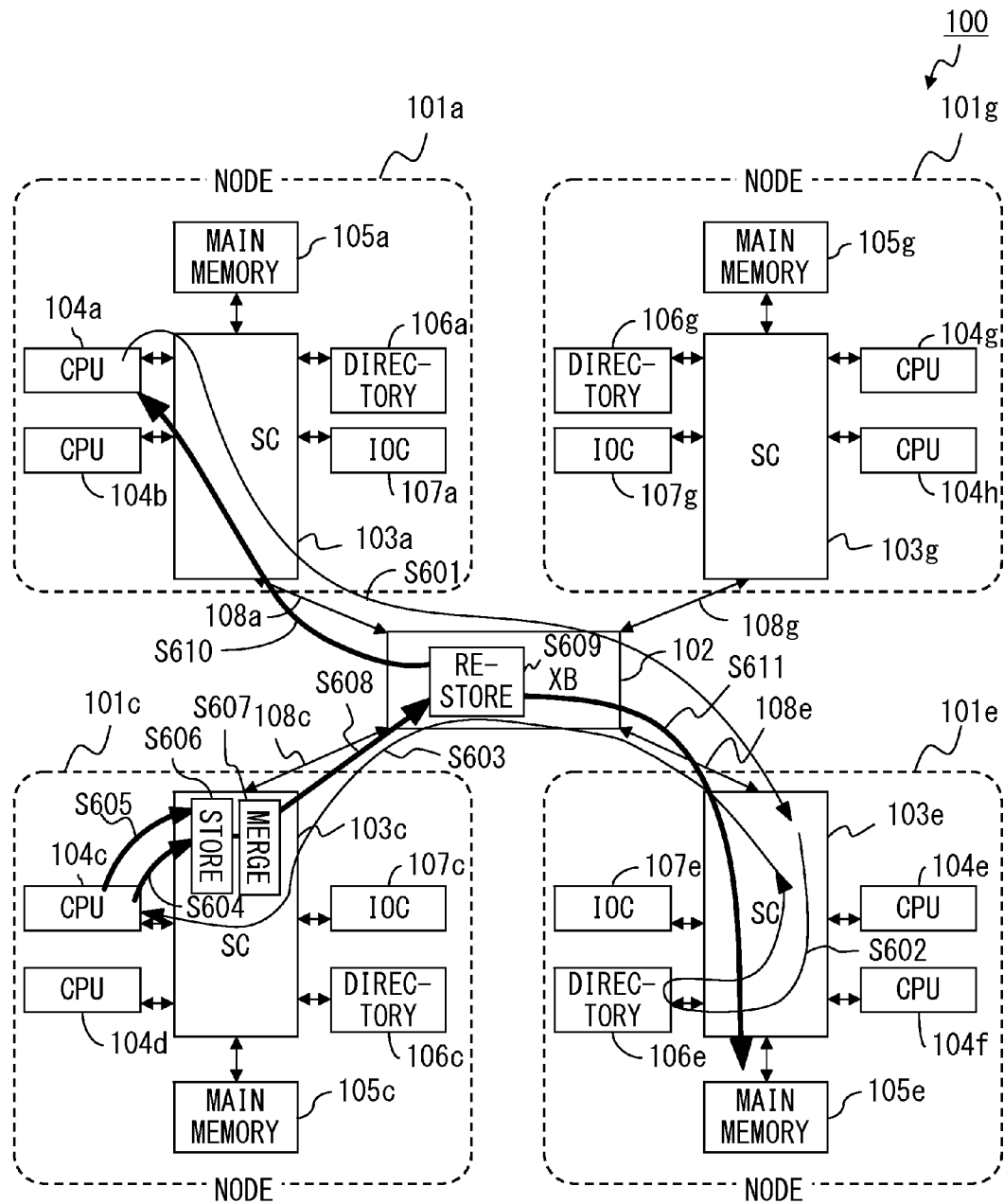
FIG. 14 is a diagram illustrating the outline of the operations of a server system according to the first embodiment.

FIG. 14 is a diagram illustrating the outline of the operations of the server system 100 according to the first embodiment. The server system 100 in FIG. 14 also operates in accordance with the same cache protocol as that of FIG. 4, and steps S601 to S603 of FIG. 14 are the same as steps S301 to S303 of FIG. 4.

More specifically, in step S601, the CPU 104*a* issues a shared-type memory access request packet addressed to the SC 103*e* in order to request data stored in the main memory 105*e*. The shared-type memory access request packet is then transmitted to the SC 103*e* via the SC 103*a* and the XB 102.

In the following step S602, the SC 103*e*, which received the shared-type memory access request packet, refers to the directory 106*e* and searches for a CPU that holds in its cache memory a cache line including the requested data. Assume that it is found, as a result, that the CPU 104*c* holds the requested data in the E state.

Then in step S603, the SC 103*e* outputs a shared-type data transfer request packet addressed to the CPU 104*c*. The shared-type data transfer request packet output from the SC 103*e* is transmitted to the CPU 104*c* via the XB 102 and the SC 103*c*.

The CPU 104*c*, then in step S604, outputs a write-back data packet addressed to the SC 103*e* in the same node 101*e* as the main memory 105*e*, in order to write the data in the cache line in the M state back to the main memory 105*e*. The CPU 104*c* also updates the state of the cache line including the requested data to the I or S state in accordance with the cache protocol.

The SC 103*c* in the first embodiment includes an output buffer controller 702*cx* (not illustrated in FIG. 14) similar to the output buffer controller 509*cx* illustrated in FIG. 10 of the comparative example; the details are given later by referring to FIG. 15 and FIG. 17 to FIG. 22. As illustrated in detail in FIG. 15, in the same manner as in the comparative example, the SC 103*c* in the first embodiment also includes an interport arbiter unit 507*x* and an interport selector 508*x* that are the same as those in FIG. 10.

Accordingly, the write-back data packet output in step S604 is stored in a buffer in the output buffer controller 702*cx* in the SC 103*c* and the output buffer controller 702*cx* issues an output request to the interport arbiter unit 507*x*.

Then in step S605, the CPU 104*c* outputs a shared-type transfer data packet addressed to the CPU 104*a*, which is a requestor that requested the data in step S601.

The execution order of steps S604 and S605 is determined by the specification of the CPU 104*c*, and the order may be reversed. However, in the following description, it is assumed that the execution of step S604 precedes the execution of step S605 for convenience of explanation. Note that FIG. 14 is a diagram illustrating a case in which the shared-type transfer data packet is output to the output buffer controller 702*cx* of the SC 103*c* in step S605 before the output of the write-back data packet to the XB 102 is permitted by the interport arbiter unit 507*x*.

In this case, in the first embodiment, the output buffer controller 702*cx* stores the write-back data packet, as is illustrated in the next step S606. In addition, as illustrated in step S607, the output buffer controller 702*cx* merges the two packets by storing information included in the header of the shared-type transfer data packet in association with the write-back data packet. In other words, the output buffer controller 702*cx* discards the shared-type transfer data packet, which is received later from among the two packets having the same data payload.

By merging the write-back data packet and the shared-type transfer data packet, which have the same data payload, into one packet in step S607, the output buffer controller 702*cx* can save memory capacity needed to store packets.

When an output permission is issued by the interport arbiter unit 507*x* after the shared-type data transfer request packet is merged with the write-back data packet in step S607, the output buffer controller 702*cx* outputs the merged packet to the XB 102 in step S608.

The merged packet originates from packets addressed to different destinations: the write-back data packet addressed to the SC 103*e* and the shared-type transfer data packet addressed to the CPU 104*a*. Accordingly, in the next step S609, the XB 102 restores the original write-back data packet and shared-type transfer data packet from the merged packet.

The XB 102 outputs the shared-type transfer data packet to the SC 103*a* in the same node 101*a* as the addressed CPU 104*a* in step S610, and outputs the write-back data packet to the addressed SC 103*e* in step S611. Steps S610 and S611 may be performed at the same time, which is explained later in detail with reference to FIG. 23 to FIG. 29. It is also possible for either step S610 or step S611 to be performed first.

In the server system 100 operating as illustrated in the above-described FIG. 14, a buffer capacity required in the output buffer controller 702*cx* in the SC 103*c* is reduced. As a matter of course, in addition to the output buffer controller 702*cx*, buffer capacities respectively required in the SCs 103*a* to 103*g* are reduced in the same manner. According to the first embodiment, it is therefore possible to reduce the manufacturing cost and the size of the mount area of semiconductor chips realizing the SCs 103*a* to 103*g* as well as to cut power consumption of the SCs 103*a* to 103*g*.

The total length of the write-back data packet and the shared-type transfer data packet is longer than the length of a single merged packet. Consequently, occupancy time of the bus 108*c* is shorter in the first embodiment compared with a case in which the SC 103*c* outputs the write-back data packet and the shared-type transfer data packet individually to the XB 102 via the bus 108*c* as illustrated in FIG. 4. As a result, in the first embodiment, in comparison with the comparative example, the time during which other packets wait for the output permission is reduced, and throughput of the packet output from the SC 103*c* to the XB 102 is practically improved. In other words, the performance of the whole server system 100 is improved.

Next, the configurations of components which are in the server system 100 and which enable operations in FIG. 14 are explained with reference to FIG. 15 and FIG. 16 by focusing on the difference from the comparative example.

Figure 15:
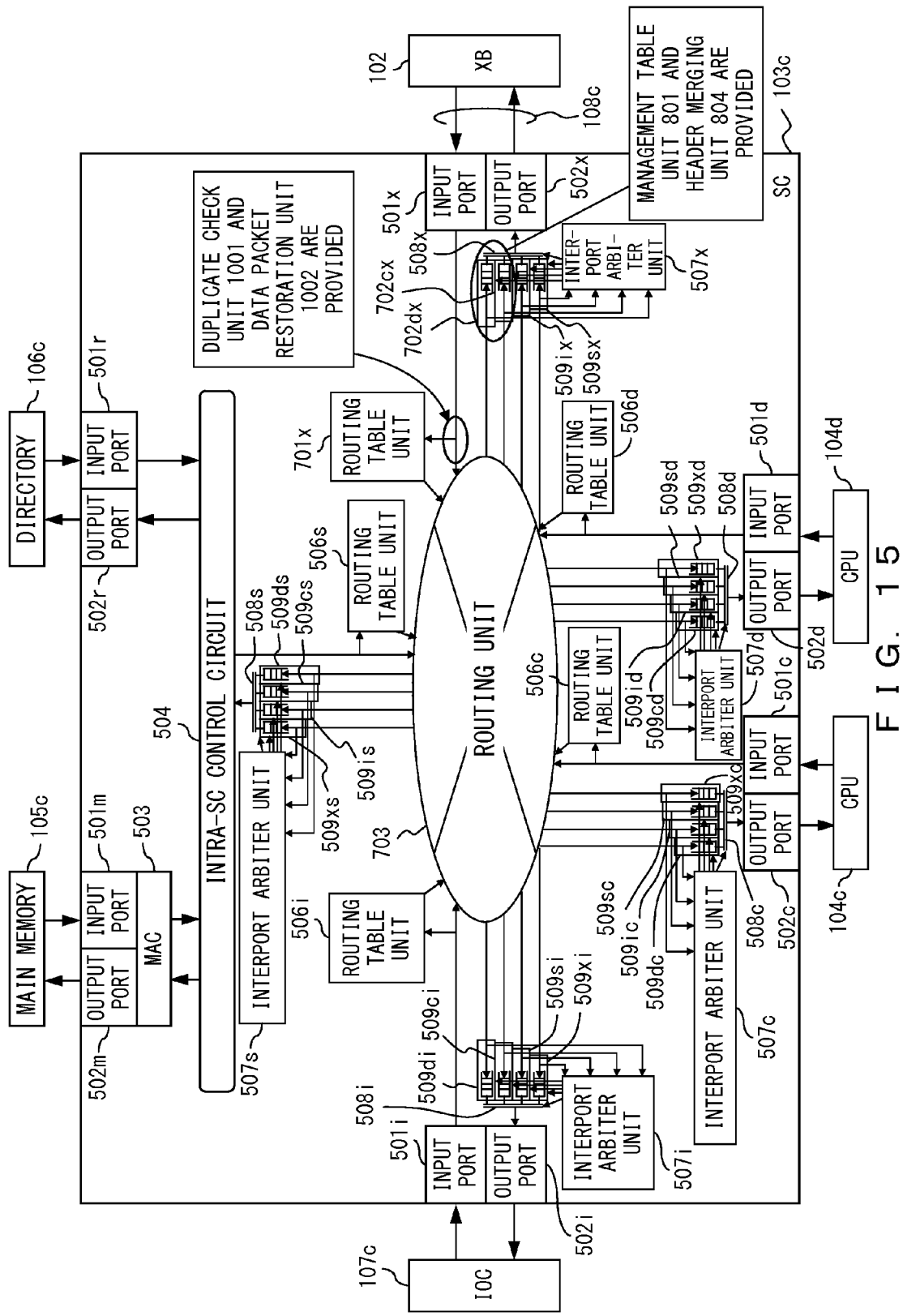
FIG. 15 is a configuration diagram of an SC in the first embodiment.

FIG. 15 is a configuration diagram of the SC 103*c* in the first embodiment. FIG. 15 appears to be similar to FIG. 10 illustrating the configuration of the SC 103*c* in the comparative example, but it is different from FIG. 10 in the following points (h1) to (h6).

(h1) A routing table unit 701*x* is provided instead of the routing table unit 506*x*. The configuration of the routing table unit 701*x* is explained later with reference to FIG. 25.

(h2) An output buffer controller 702*cx* having a function to merge packets, which is explained in FIG. 14, is provided instead of the output buffer controller 509*cx*. As described later, merging of packets is mainly performed by a management table unit 801 and a header merging unit 804 in the output buffer controller 702*cx*. The management table unit 801 and the header merging unit 804 are not illustrated in FIG. 15 due to limitations of space, but are explained in detail with reference to FIG. 17 to FIG. 22.

(h3) In the same manner as (h2), an output buffer controller 702*dx* is provided instead of the output buffer controller 509*dx*.

(h4) A routing unit 703 is provided instead of the routing unit 505. The differences between the routing unit 505 and the routing unit 703 are described after explaining FIG. 29.

(h5) A duplicate check unit 1001, which is not illustrated in the drawing, is provided on the route from the input port 501*x* to the routing unit 703 via the routing table unit 701*x*. Note that details of the duplicate check unit 1001 are described later with reference to FIG. 23, FIG. 24, and FIG. 26.

(h6) A data packet restoration unit 1002, which is not illustrated in the drawing, is provided on the route from the input port 501*x* to the routing unit 703. Note that details of the data packet restoration unit 1002 are described later with reference to FIG. 23, FIG. 24, and FIG. 26 to FIG. 29.

Figure 16:
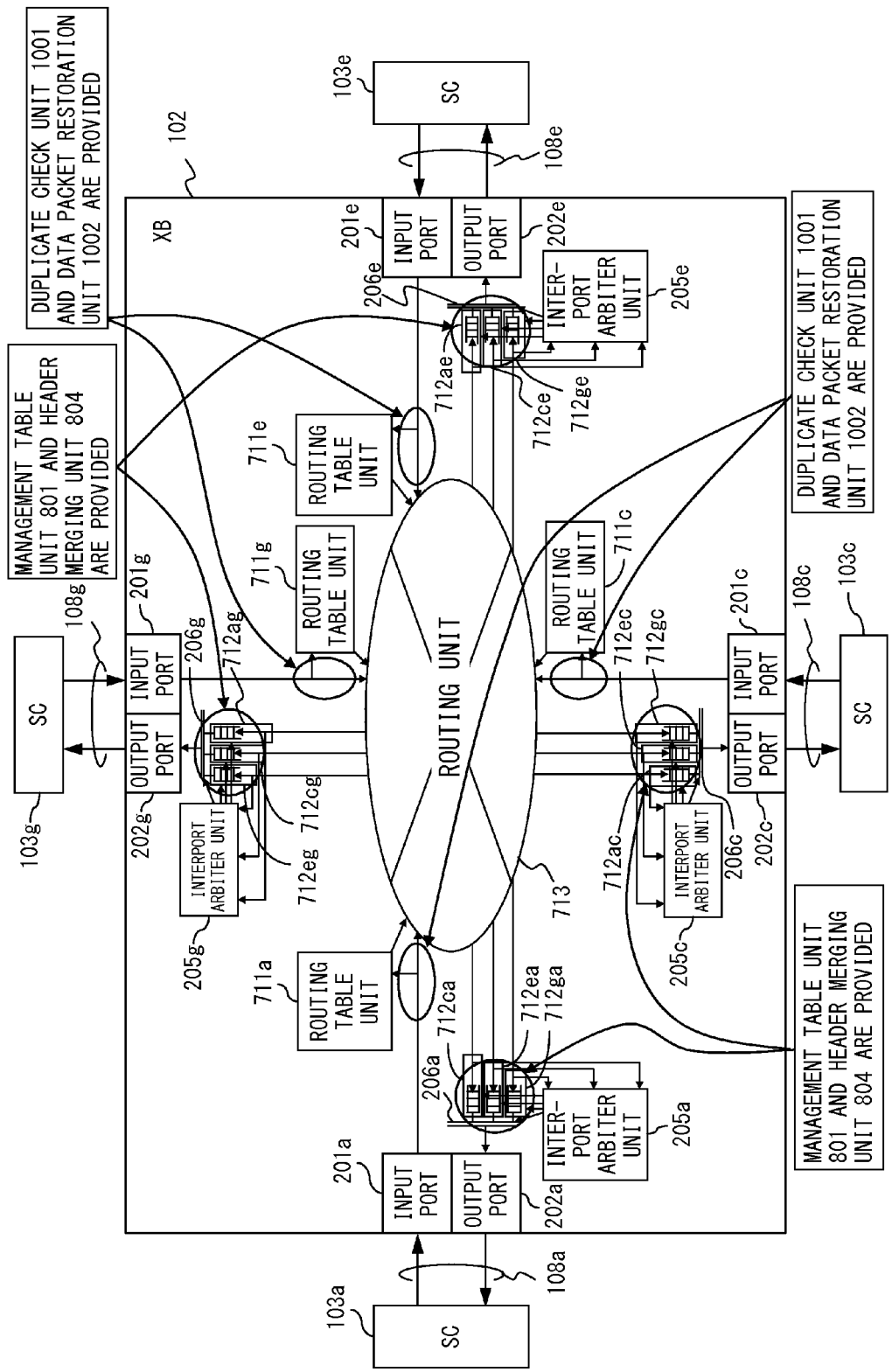
FIG. 16 is a configuration diagram of an XB in the first embodiment.

FIG. 16 is a configuration diagram of the XB 102 in the first embodiment. FIG. 16 appears similar to FIG. 5, which illustrates the configuration of the XB 102 in the comparative example, but it is different from FIG. 5 in the following points (i1) to (i9).

(i1) A routing table unit 711*c* is provided instead of the routing table unit 204*c*. The differences between the routing table unit 204*c* and the routing table unit 711*c* are described later with reference to FIG. 25.

(i2) In the same manner as (i1), routing table units 711*a*, 711*e*, and 711*g* are provided instead of the routing table units 204*a*, 204*e*, and 204*g*, respectively.

(i3) Output buffer controllers 712*ac*, 712*ec*, and 712*gc*, each of which has a function to merge packets, which is explained in FIG. 14, are provided in the preceding stage of the output port 202*c*, instead of the output buffer controllers 207*ac*, 207*ec*, and 207*gc*. In the same manner as the above-mentioned (h2), the merging of packets is mainly performed by a management table unit 801 and a header merging unit 804 in each of the output buffer controllers 712*ac*, 712*ec*, and 712*gc*. The management table unit 801 and the header merging unit 804 are not illustrated in FIG. 16 due to limitations of space.

(i4) In the same manner as (i3), three output buffer controllers provided in each of the preceding stages of the other output ports 202*a*, 202*e* and 202*g* are different from those of the comparative example in their configuration.

(i5) A routing unit 713 is provided instead of the routing unit 203. The differences between the routing unit 203 and the routing unit 713 are described later with reference to FIG. 23.

(i6) A duplicate check unit 1001, which is not illustrated in the drawing, is provided on the route from the input port 201*c* to the routing unit 713 via the routing table unit 711*c*.

(i7) Similarly, the duplicate check unit 1001, which is not illustrated in the drawing, is also provided on each route between the routing unit 713 and each of the other input ports 201*a*, 201*e* and 201*g*.

(i8) A data packet restoration unit 1002, which is not illustrated in the drawing, is provided on the route from the input port 201*c* to the routing unit 713.

(i9) Similarly, the data packet restoration unit 1002, which is not illustrated in the drawing, is also provided on each route between the routing unit 713 and each of the other input ports 201*a*, 201*e* and 201*g*.

As described above, an overview of components in the first embodiment that are different from those in the comparative example is given with reference to FIG. 15 and FIG. 16.

In the meantime, in the operation sequence in FIG. 14, packets are merged in the SC 103*c*, and the packets are restored in the XB 102. However, as illustrated in FIG. 15 and FIG. 16, the server system 100 is configured in the first embodiment so as to also be able to restore packets in the SCs 103*a* to 103*g* and to merge packets in the XB 102. This is because there may be a case as follows, which is different from that of FIG. 14.

By way of example, the CPU 104*e* issues a shared-type memory access request packet addressed to the SC 103*e* in order to request data stored in the main memory 105*e* in the same node 101*e*.

Then the SC 103*e* then refers to the directory 106*e* and searches for a CPU that holds in its cache memory a cache line including the requested data. Assume that it is found, as a result, that the CPU 104*c* holds the requested data in the E state.

In this case, according to the cache protocol explained in relation to FIG. 4 and FIG. 14, the CPU 104*c* outputs a shared-type transfer data packet addressed to the CPU 104*e* and a write-back data packet addressed to the SC 103*e*. Here, for convenience of explanation, a case in which the shared-type transfer data packet is output first is explained as an example.

If the write-back data packet is input to the output buffer controller 702*cx* before the shared-type transfer data packet is output from the output buffer controller 702*cx* in the SC 103*c* to the interport selector 508*x*, the two packets are merged as in FIG. 14.

However if the write-back data packet is input to the output buffer controller 702*cx* after the shared-type transfer data packet is output from the output buffer controller 702*cx* in the SC 103*c*, the two packets are not merged. The following description focuses on a case in which the two packets are not merged.

Here, the shared-type transfer data packet addressed to the CPU 104*e* is a packet that is output to the output port 202*e*, which is connected to the SC 103*e*, in the XB 102. Similarly, the write-back data packet addressed to the SC 103*e* is a packet that is output to the output port 202*e* in the XB 102.

Therefore both the shared-type transfer data packet and the write-back data packet, which are output from the SC 103c to the XB 102 separately without being merged, pass through the output buffer controller 712ce, which is provided in the preceding stage of the output port 202e in the XB 102.

Consequently, in some cases, the write-back data packet may be input to the output buffer controller 712ce in a situation where the shared-type transfer data packet is temporarily stored in the output buffer controller 712ce. For example, when many packets addressed to the components in the node 101e are concentrated, the write-back data packet may be input to the output buffer controller 712ce before the shared-type transfer data packet is output from the output buffer controller 712ce.

In this case, the output buffer controller 712ce in the XB 102 merges the two packets into one, stores it, and outputs it to the SC 103e, and the SC 103e restores the packets. Consequently, the capacity for a portion redundant between the shared-type transfer data packet and the write-back data packet becomes unnecessary, and therefore the buffer capacity required in the XB 102 is reduced. As a result, the occupancy time of the bus 108e is also reduced, practically improving the throughput in the server system 100.

For that reason, in the first embodiment, each of the output buffer controllers in the XB 102 includes the management table unit 801 and the header merging unit 804 as illustrated in FIG. 16, so as to be able to merge packets. In addition, in each of the SCs 103a to 103g, the duplicate check unit 1001 and the data packet restoration unit 1002 are provided, as illustrated in FIG. 15, between the input port 501x connected to the XB 102 and the routing unit 703 so as to be able to restore packets.

Next, along the operation sequence in FIG. 14, the configuration and operations of each of the components in the first embodiment are explained in detail.

First, with reference to FIG. 17 and FIG. 18, a detailed configuration of the output buffer controller 702cx in FIG. 15 is explained. Note that in the following description, although the output buffer controller 702cx is explained as an example, the output buffer controller 702dx in FIG. 15 and the twelve output buffer controllers (712ce etc.) in the XB 102 illustrated in FIG. 16 also have the same configuration.

FIG. 17 is a configuration diagram of the output buffer controller 702cx in the SC 103c in the first embodiment. As illustrated in FIG. 15, the output buffer controller 702cx is connected with the routing unit 703, the interport arbiter unit 507x, and the interport selector 508x.

In the XB 102, the output buffer controller 712ce, for example, also has the same configuration as that of FIG. 17. The output buffer controller 712ce is different from the output buffer controller 702cx in that the output buffer controller 712ce is connected with the routing unit 713, the interport arbiter unit 205e, and the interport selector 206e as illustrated in FIG. 16. However, the internal configuration of the output buffer controller 712ce is the same as that of the output buffer controller 702cx of FIG. 17.

The output buffer controller 702cx in the SC 103c illustrated in FIG. 17 has a configuration similar to that of the output buffer controller 207ca in the XB 102 of the comparative example illustrated in FIG. 7. Therefore, explanations of common points are appropriately omitted in the following description.

The output buffer controller 702cx includes a controller 400, a data packet storage unit 410, a request packet storage unit 420, and an inter-packet selector 430, in a similar manner to the output buffer controller 207ca in the comparative example. However, in the output buffer controller 702cx, the internal configuration of the controller 400 and the capacity of the data packet storage unit 410 are different from those of the comparative example.

The controller 400 includes an inter-packet arbiter unit 401. The inter-packet arbiter unit 401 includes an inter-packet arbiter 402, a comparator 403, and a comparator 404 in the same manner as the comparative example. The controller 400 also includes an encoder 405, which is the same as that of the comparative example. Furthermore, as in the comparative example, the controller 400 includes a read pointer controller 407 for data packets, and also includes a write pointer controller 408 and a read pointer controller 409, which are for request packets.

The differences between the controller 400 in the first embodiment and that in the comparative example are that the controller 400 in the first embodiment includes a management table unit 801, a comparator unit 802, and a write pointer controller 803 instead of the write pointer controller 406 in the comparative example. In the first embodiment, in addition, the output buffer controller 702cx further includes a header merging unit 804 and a selector 805.

The management table unit 801 and the comparator unit 802 operate together to discern a pair of two packets having the same data payload. In order to do so, the management table unit 801 manages header information included in a header of a packet stored in the data packet storage unit 410.

The comparator unit 802 notifies the write pointer controller 803 of whether a packet having the same data payload as a packet newly input to the output buffer controller 702cx is stored in the data packet storage unit 410 or not.

Based on the result of the notification from the comparator unit 802, the write pointer controller 803 controls storage of the newly input packet into the data packet storage unit 410 or controls discarding of the newly input packet. For that control, the write pointer controller 803 not only outputs a write instruction and a write pointer value in the same manner as the comparative example, but also outputs a "duplicate write instruction". The details are explained later, but the duplicate write instruction is for instructing the management table unit 801 to record the header information of a packet having the same data payload as that of a data packet that has been already stored in the data packet storage unit 410.

The header merging unit 804 generates a packet which is made by merging two packets having the same data payload. The selector 805 selects either the packet that results from the merging in the header merging unit 804 or a data packet stored in the data packet storage unit 410.

The relations among the above-outlined individual components in the output buffer controller 702cx are provided below.

First, a packet is output from the routing unit 703 to the output buffer controller 702cx via the signal line 441. The signal line 441 branches into the signal line 442 for outputting the packet and a signal line 811 for outputting the header information included in the packet header. As explained in the comparative example with specific implementation examples (e1) to (e3), also in the first embodiment, a branching illustrated by angled branching lines indicates that the output data are different for each branch.

As in the comparative example, what is output to the data packet storage unit 410 via the signal line 442 is a packet. The header information output to the signal line 811 includes, more specifically, a packet type, a destination ID, a requestor ID, a ReqID, and a data state.

The packet type indicates any of types (d1) to (d4) described above, for example, and is input to the encoder 405 also in the comparative example. The destination ID, the requestor ID, and the ReqID are the same as those explained in the above (a1) to (a3).

At least a portion, which depends on a cache protocol, of the above (b1) to (b5) is available to be designated for the data state. In the following description, at least a case in which the value of the data state is a "shared-type", which is the S state in (b3), and a case in which the data state is not designated are explained as examples.

The signal line 811 further branches into the signal line 443 and a signal line 812, and the signal line 812 branches into a signal line 813 and a signal line 814.

The signal line 443 is connected to the encoder 405 as in the comparative example, and the packet type in the header information is input to the encoder 405 via the signal line 443. The signal line 813 is connected to the comparator unit 802, and the requestor ID and the ReqID in the header information are input to the comparator unit 802 via the signal line 813. The signal line 814 is connected to the management table unit 801, and all of the packet type, the destination ID, the requestor ID, the ReqID, and the data state are input to the management table unit 801 via the signal line 814.

The management table unit 801 further receives inputs from the write pointer controller 803 and the read pointer controller 407 and outputs "duplicate information", which is explained later, to the signal line 815.

When a packet having the same data payload as that of a newly input packet is stored in the data packet storage unit 410, the management table unit 801 stores the header information of the new packet according to the input from the write pointer controller 803. In addition, based on the input from the read pointer controller 407, the management table unit 801 searches for the header information to be merged with the packet stored in a block indicated by the read pointer value.

The duplicate information indicates whether or not there is header information to be merged with the packet that is about to be output. The duplicate information, when there is header information to be merged with the packet that is about to be output, also includes the header information.

A signal line 815 branches into a signal line 816 and a signal line 817, and the signal line 816 is connected to the header merging unit 804 and the signal line 817 is connected to the selector 805. The duplicate information output to the signal line 815 is output to the header merging unit 804 via the signal line 816. In addition, of the duplicate information, only a "duplicate data VALID" field indicating whether or not there is header information to be merged with the packet that is about to be output is output to the selector 805 via the signal line 817.

Furthermore, the management table unit 801 is also connected to the comparator unit 802. Data input/output between the management table unit 801 and the comparator unit 802 is described later with reference to FIG. 18A and FIG. 18B.

The comparator unit 802 compares the requestor ID and the ReqID input via the signal line 813 with the information input from the management table unit 801, and notifies the write pointer controller 803 of the comparison result. This comparison is conducted to determine whether a packet having the same data payload as that of the newly input packet is stored in the data packet storage unit 410 or not.

The write pointer controller 803 for data packets is connected to the comparator 403 and the data packet storage unit 410 as in the write pointer controller 406 in the comparative example. The write pointer controller 803 is further connected to the comparator unit 802, as described above, and is also connected to the management table unit 801.

In the above description, the configuration of the output buffer controller 702cx is explained with reference to FIG. 17.

Next, the management table unit 801, the comparator unit 802, and the write pointer controller 803 in the output buffer controller 702cx are explained in detail with reference to FIG. 18A and FIG. 18B.

Figure 18A:
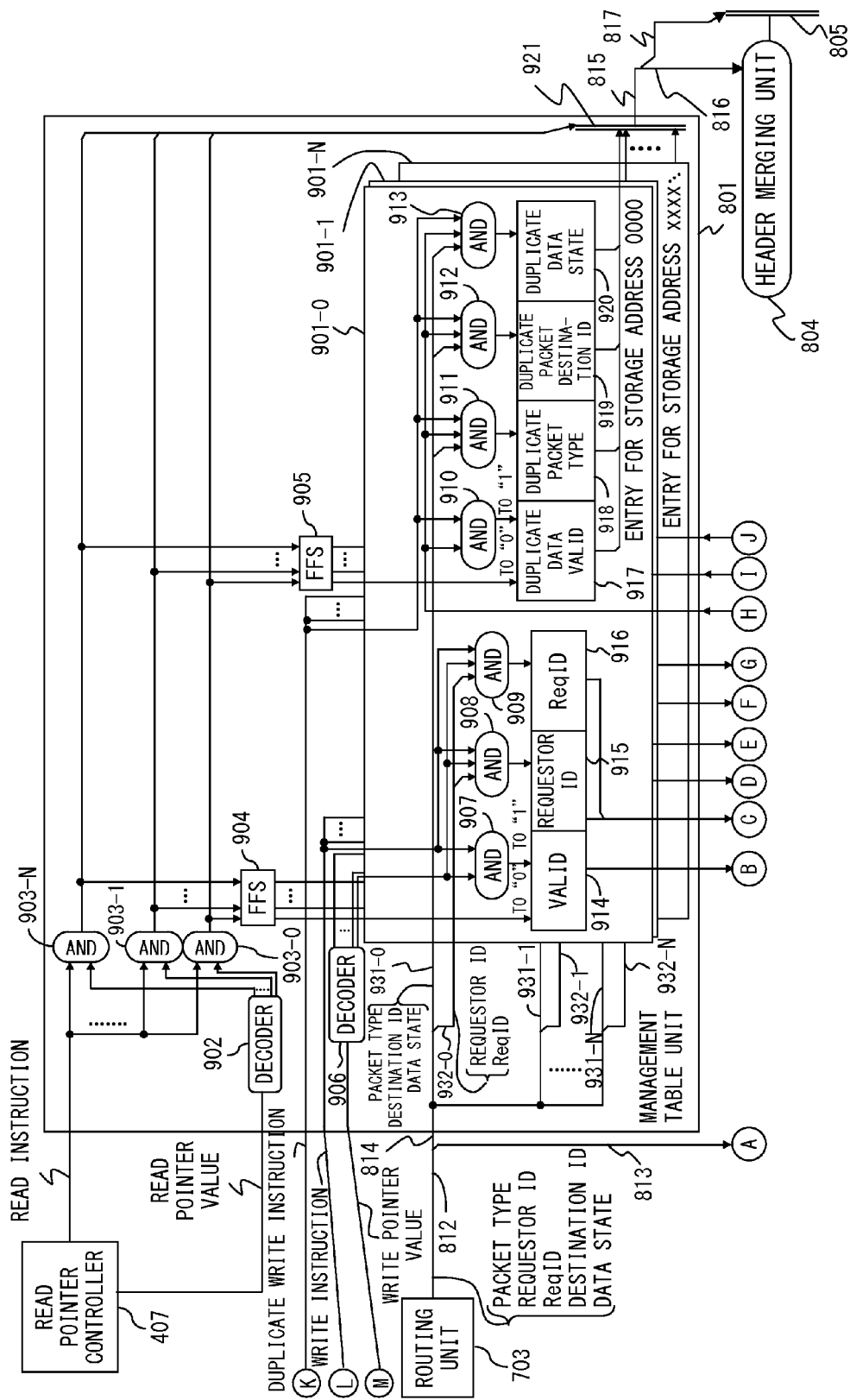
FIG. 18A is a configuration diagram of a management table unit in the first embodiment.

FIG. 18A is a configuration diagram of the management table unit 801 in the first embodiment, and FIG. 18B is a configuration diagram of the comparator unit 802 and the write pointer controller 803 in the first embodiment. Due to space constraints, FIG. 18A and FIG. 18B are separated into two pages. However, the management table unit 801 in FIG. 18A is connected to the comparator unit 802 and the write pointer controller 803 in FIG. 18B, as illustrated with reference signs "A" to "M".

In FIG. 18A, the management table unit 801 has (N+1) entries 901-1 to 901-N respectively corresponding to the (N+1) storage addresses 0000 to xxxx in the data packet storage unit 410. For example, if N=63, "xxxx"="0063" holds.

In addition, the management table unit 801 has a decoder 902 that decodes a read pointer value, which is represented by plural bits and is output from the read pointer controller 407, to (N+1) outputs, each of which is 1-bit long. The management table unit 801 also has (N+1) AND circuits 903-0 to 903-N. For each j where a read instruction output from the read pointer controller 407 and the (j+1)-th output of the decoder 902 are input to the AND circuit 903-j.

For example, when a read pointer value "1" and a read instruction is output from the read pointer controller 407, only the second output corresponding to the storage address 0001 among the outputs of the decoder 902 has a logical value 1, but the other N outputs each have a logical value 0. Therefore only the output of the AND circuit 903-1, among the (N+1) AND circuits 903-0 to 903-N, has the logical value 1.

In addition, the management table unit 801 has FFs 904 and FFs 905. The FFs 904 hold the outputs from the (N+1) AND circuits 903- to 903-N, each of which outputs 1 bit, namely, hold an (N+1)-bit output. The FFs 905 are similar to the FFs 904, and the FFs 904 and the FFs 905 hold the same data. An embodiment is also feasible in which a single set of FFs 904 is used instead of using the two sets of FFs 904 and 905, and signal lines are branched properly so as to supply the outputs of the FFs 904 to the output destinations of the FFs 905 in FIG. 18A.

In addition, the management table unit 801 has a decoder 906 that decodes a write pointer value, which is represented by plural bits and is output from the write pointer controller 803 for data packets, to (N+1) outputs, each of which is 1-bit long.

The (N+1)-bit data held in the FFs 904 is input bit by bit to each of the entries 901-0 to 901-N. The (N+1)-bit data held in the FFs 905 is also input bit by bit to each of the entries 901-0 to 901-N. The (N+1)-bit output of the decoder 906 is also input bit by bit to each of the entries 901-0 to 901-N. Moreover, each of the entries 901-0 to 901-N receives inputs of a write instruction and a duplicate write instruction from the write pointer controller 803.

The entries 901-0 to 901-N are the same in their structure and operation, and therefore FIG. 18A illustrates details only with respect to the entry 901-0 for the storage address 0000. Specifically, the entry 901-0 has seven AND circuits 907 to 913 and the following seven fields respectively corresponding to the AND circuits 907 to 913.

a VALID field 914
a requestor ID field 915
a ReqID field 916 a duplicate data VALID field 917 a duplicate packet type field 918 a duplicate packet destination ID field 919 a duplicate data state field 920

Each of the above seven fields is realized by using a memory element such as an FF. Details of each field and its input/output are explained after details of the comparator unit 802 and the write pointer controller 803 are explained. Note that the entries 901-0 to 901-N each having the above fields, as a whole, correspond to a single management table.

Additionally, as explained in connection with FIG. 17, the data in every field of the packet type, the requestor ID, the ReqID, the destination ID, and the data state in the header of a packet is input to the management table unit 801 from the routing unit 703 via the signal line 814. The signal line 814, which is branched from the signal line 812 as illustrated in FIG. 17 and FIG. 18A, further branches in the following manner and is connected to each of the entries 901-0 to 901-N as illustrated in FIG. 18A.

A signal line 931-0 for inputting the packet type, the destination ID, and the data state to the entry 901-0 for the storage address 0000

A signal line 932-0 for inputting the requestor ID and the ReqID to the entry 901-0 for the storage address 0000

. . . .

A signal line 931-N for inputting the packet type, the destination ID, and the data state to the entry 901-N for the storage address xxxx A signal line 932-N for inputting the requestor ID and the ReqID to the entry 901-N for the storage address xxxx The other branch from the signal line 812 is the signal line 813, and it is input to the comparator unit 802 in FIG. 18B. The requestor ID and the ReqID included in the header of a packet are input to the comparator unit 802 from the routing unit 703 via the signal line 813.

As illustrated in FIG. 18B, the comparator unit 802 includes (N+1) comparators 941-0 to 941-N respectively corresponding to the (N+1) storage addresses 0000 to xxxx. The configurations of the comparators 941-0 to 941-N are the same as one another and each of the outputs of the comparators 941-0 to 941-N is input to an OR circuit 951 provided in the write pointer controller 803.

For example, the requestor ID and the ReqID included in the header of a packet, which is input to the output buffer controller 702cx in FIG. 17, are input to the comparator 941-0, which corresponds to the storage address 0000, from the routing unit 703 via a signal line 813. In addition, the requestor ID and the ReqID from the requestor ID field 915 and the ReqID field 916 in the entry 901-0 for the storage address 0000 are input to the comparator 941-0. In other words, the comparator 941-0 receives inputs of two pairs of the requestor ID and the ReqID.

Moreover, the comparator 941-0 receives, as a control signal, an input of a value of the VALID field 914 in the entry 901-0 for the storage address 0000, namely, a value indicating whether the block at the storage address 0000 in the data packet storage unit 410 is valid or not.

When the value of the VALID field 914 input as the control signal is a logical value 0, the comparator 941-0 outputs the logical value 0 to the OR circuit 951 and the AND circuit 910 in the entry 901-0 for the storage address 0000.

When the value of the VALID field 914 input as the control signal is a logical value 1, the comparator 941-0 compares the input pairs of the requestor ID and the ReqID with one another. When the two input pairs of the requestor ID and the ReqID match one another, the comparator 941-0 outputs a logical value 1 to the OR circuit 951 and the AND circuit 910 in the entry 901-0. In contrast, when the two input pairs of the requestor ID and the ReqID do not match one another, the comparator 941-0 outputs a logical value 0 to the OR circuit 951 and the AND circuit 910 in the entry 901-0.

Note that the logical value 0 output from the comparator 941-0 indicates that the data packet storage unit 410 does not store at the storage address 0000 a packet having the same data payload as that of a newly input data packet. The logical value 1 output from the comparator 941-0 indicates that the data packet storage unit 410 stores at the storage address 0000 a packet having the same data payload as that of a newly input data packet.

In other words, the first embodiment utilizes the fact that data payloads are equal to one another when the requestor IDs match and the ReqIDs match. This depends on the specification of the packets, and various embodiments are possible in accordance with the packet specifications. Whatever the case might be, each of the comparators 941-0 to 941-N is able to determine the match or mismatch between the data payloads by comparing appropriate pieces of header information with one another in accordance with the packet specification.

The write pointer controller 803 for data packets includes a NOT circuit 952, an AND circuit 953, an AND circuit 954, and FFs 955 in addition to the above OR circuit 951.

The OR circuit 951 is an (N+1)-input OR circuit; it outputs a logical value 0 only when all of the inputs from the comparators 941-0 to 941-N are the logical value 0 and outputs a logical value 1 otherwise. In other words, the OR circuit 951 outputs a logical value 1 only when another data packet having the same data payload as that of a data packet newly input to the output buffer controller 702cx is stored in any of the blocks in the data packet storage unit 410.

The output of the OR circuit 951 is input to the NOT circuit 952 and the AND circuit 953, and the output of the NOT circuit 952 is input to the AND circuit 954.

Here, the encoder 405 outputs a VALID signal indicating whether the input packet is a data packet or not, as in the comparative example. The VALID signal output from the encoder 405 is input to the AND circuits 953 and 954.

Accordingly, the AND circuit 953 outputs a logical value 1 only if a data packet is input to the output buffer controller 702cx and if another packet having the same data payload as that of the input data packet is stored in the data packet storage unit 410. The output from the AND circuit 953 is input as a duplicate write instruction to each of the entries 901-0 to 901-N in FIG. 18A.

On the other hand, the AND circuit 954 outputs a logical value 1 only if a data packet is input to the output buffer controller 702cx and if no other packet having the same data payload as that of the input data packet is stored in the data packet storage unit 410. The output from the AND circuit 954 is input as a write instruction to each of the entries 901-0 to 901-N in FIG. 18A.

In addition, the write pointer controller 803 includes the FFs 955 in a manner similar to that in which the write pointer controller 406 in the comparative example includes the FFs 451 as illustrated in FIG. 8. The FFs 955 hold a write pointer value as in the FFs 451. In addition, the output of the AND circuit 954 is input to the FFs 955 as a count enable signal. The write pointer value, which is the output of the FFs 955, is not only input to the data packet storage unit 410 and the comparator 403, as in the comparative example, but is also input to the decoder 906 in FIG. 18A.

In the above description, details of the comparator unit 802 and the write pointer controller 803 are explained with reference to FIG. 18B. Here the description returns to an explanation of the management table unit 801 in FIG. 18A, which receives inputs from the write pointer controller 803. The configurations and the operations of the components in the entry 901-0 for the storage address 0000, for example, are described below.

The VALID field 914 is a 1-bit field indicating whether the block at the storage address 0000 in the data packet storage unit 410 is valid or not. A logical value 1 indicates "being valid" and a logical value 0 indicates "being invalid".

The value of the VALID field 914 becomes a logical value 1 when a new packet is stored at the storage address 0000. On the other hand, the value of the VALID field 914 becomes a logical value 0 when a packet stored at the storage address 0000 is output to the selector 805 via the header merging unit 804 or without involving the header merging unit 804, and is further output to the inter-packet selector 430. More specifically, the VALID field 914 is configured as in the following description.

The VALID field 914 may be realized by an RS (Reset-Set)-type FF as an example. In such a case, the output of the AND circuit 907 is provided to an S (Set) terminal of the RS-type FF, and the bit 0, which is the first bit, of the FFs 904 holding (N+1) bits is provided to an R (Reset) terminal of the RS-type FF.

Here, the inputs of the AND circuit 907 are the bit 0, which is the first bit, of the output from the decoder 906 (i.e. a bit corresponding to the storage address 0000 among the (N+1)-bit output), and a write instruction, which is output from the write pointer controller 803. Accordingly, only when the write pointer controller 803 designates the storage address 0000 and asserts the write instruction does the output of the AND circuit 907 become a logical value 1, and the value of the VALID field 914 is set to the logical value 1.

In addition, only when the read pointer controller 407 outputs a read pointer value indicating the storage address 0000 and asserts a read instruction does the bit 0, which is the first bit (i.e. a bit corresponding to the storage address 0000 among the (N+1) bits), in the FFs 904 become a logical value 1. When the bit 0 of the FFs 904 becomes the logical value 1, the value of the VALID field 914 is reset to a logical value 0.

When both the output of the AND circuit 907 and the bit 0 of the FFs 904 are logical values 0, the value of the VALID field 914 does not change.

In addition, as described above, the value of the VALID field 914 is output to the comparator 941-0 corresponding to the storage address 0000.

Next, the requestor ID field 915 is explained. The requestor ID field 915 stores the requestor ID of the data packet stored at the storage address 0000 of the data packet storage unit 410. The setting of the value to the requestor ID field 915 is conducted by the AND circuit 908. In the following description, explanation is provided under the assumption that the requestor ID is represented by $M_1$ bits, as an example.

The inputs to the AND circuit 908 are a write instruction, which is output from the write pointer controller 803, the bit 0, which corresponds to the storage address 0000, in the output of the decoder 906, and the $M_1$-bit requestor ID, which is input via a signal line branched from the signal line 932-0. The AND circuit 908 overwrites the requestor ID field 915 with the input value of the $M_1$-bit requestor ID only when both of the write instruction and the output of the bit 0 of the decoder 906 have a logical value 1. When at least one of the write instruction and the bit 0 of the output from the decoder 906 has a logical value 0, the AND circuit 908 does not overwrite the requestor ID field 915, and the requestor ID field 915 holds the current value.

There are various methods for specifically implementing the AND circuits 908 and the requestor ID field 915, which are operating as above.

For example, the AND circuit 908 may be configured to include an AND circuit that obtains the logical conjunction of the write instruction and the bit 0 of the output from the decoder 906, and also configured to allow the input $M_1$-bit requestor ID to pass through to the requestor ID field 915. In addition, the requestor ID field 915 has $M_1$ sets of memory elements for storing $M_1$ bits, for example, and the output of the above AND circuit is provided to a control terminal of each of the memory elements as a write-enable control signal. As a result, when the output of the above AND circuit is a logical value 0, the requestor ID field 915 holds the current value, and when the output of the above AND circuit is a logical value 1, the requestor ID, which passed through the AND circuit 908, is written into the requestor ID field 915.

For example, the requestor ID field 915 may include $M_1$ of RS-type FFs. Here, for convenience of explanation, let "X" be the output of the above AND circuit within the AND circuit 908 (i.e. be the logical conjunction of the write instruction and the bit 0 of the output from the decoder 906), and let "$Y_j$" be the bit j of the requestor ID having passed through the AND circuit 908 ($0 \leq j \leq M_1-1$). The requestor ID field 915 includes two AND circuits and one NOT circuit for every bit, and is configured so that $X \wedge Y_j$ is input to the S terminal of the RS-type FF corresponding to the bit j, and $X \wedge \neg Y_j$ is input to the R terminal thereof.

When X is a logical value 0, each of the RS-type FFs holds the current value, and when X is a logical value 1, the value of each of the RS-type FFs becomes $Y_j$ (i.e. a value of the bit j in the requestor ID). Consequently, the above operations of the AND circuit 908 and the requestor ID field 915 is realized.

It is a matter of course that the specific configurations of the AND circuit 908 and the requestor ID field 915 may be different from the above example.

In addition, as described above, the value of the requestor ID field 915 is output to the comparator 941-0 corresponding to the storage address 0000 as illustrated in FIG. 18B.

Next, the ReqID field 916 is explained. The ReqID field 916 stores the ReqID of the data packet stored at the storage address 0000 in the data packet storage unit 410. The setting of the value to the ReqID field 916 is conducted by the AND circuit 909.

The inputs of the AND circuit 909 are a write instruction, which is output from the write pointer controller 803, the bit 0, which corresponds to the storage address 0000, in the output from the decoder 906, and the ReqID, which is input via a signal line branched from the signal line 932-0. Similarly to the explanation of the AND circuit 908 and the requestor ID field 915, there are various specific implementations of the AND circuit 909 and the ReqID field 916.

No matter what specific implementation is selected, the AND circuit 909 and the ReqID field 916 operate as below. More specifically, the AND circuit 909 overwrites the ReqID field 916 with the input value of the ReqID only when both the write instruction and the bit 0 of the output from the decoder 906 have a logical value 1. On the other hand, when at least one of the write instruction and the bit 0 of the output from the decoder 906 has a logical value 0, the AND circuit 909 does not overwrite the ReqID field 916, and the ReqID field 916 holds the current value.

In addition, as described above, the value of the ReqID field 916 is output to the comparator 941-0 corresponding to the storage address 0000.

Next, the duplicate data VALID field 917 is explained. The duplicate data VALID field 917 is a 1-bit field indicating whether the duplicate packet type field 918, the duplicate packet destination ID field 919, and the duplicate data state field 920 are valid or not. A logical value 1 indicates "being valid" and a logical value 0 indicates "being invalid".

The value of the duplicate data VALID field 917 becomes a logical value 1 when, in a state in which a first packet is stored at the storage address 0000, a second packet having the same data payload as that of the first packet is input to the output buffer controller 702cx. At that time, the packet type, the destination ID, and the data state, which are included in the header of the second packet, are stored in the duplicate packet type field 918, the duplicate packet destination ID field 919, and the duplicate data state field 920, respectively.

On the other hand, the value of the duplicate data VALID field 917 becomes a logical value 0 when the first packet stored at the storage address 0000 is output to the inter-packet selector 430 via the header merging unit 804 and the selector 805 in FIG. 17.

More specifically, the duplicate data VALID field 917 may be realized by an RS-type FF, for example. In such a case, the output of the AND circuit 910 is provided to the S terminal, and the bit 0, which is the first bit, of the FFs 905 holding (N+1) bits is provided to the R terminal.

Here, the inputs of the AND circuit 910 are the output of the comparator 941-0, which is provided in the comparator unit 802 in FIG. 18B correspondingly to the storage address 0000, and a duplicate write instruction, which is output from the write pointer controller 803. Consequently, only when a first packet, which includes the same data payload as that of a newly input second packet, has already been stored at the storage address 0000, do two inputs of the AND circuit 910 become a logical value 1, and the value of the duplicate data VALID field 917 is set to the logical value 1.

In addition, only when the read pointer controller 407 outputs a read pointer value indicating the storage address 0000 and asserts a read instruction does the bit 0 of the FFs 905 become a logical value 1, and the value of the duplicate data VALID field 917 is reset to a logical value 0.

When both the output of the AND circuit 910 and the bit 0 of the FFs 905 are logical values 0, the value of the duplicate data VALID field 917 does not change.

Next, the duplicate packet type field 918 is explained. It is assumed herein that a first packet, which includes the same data payload as that of a second packet newly input to the output buffer controller 702cx in FIG. 17, has already been stored at the storage address 0000 of the data packet storage unit 410. In this case, the duplicate packet type field 918 stores the packet type included in the header of the second packet. Additionally, the setting of the value of the duplicate packet type field 918 is conducted by the AND circuit 911.

The inputs to the AND circuit 911 are an output of the comparator 941-0 in FIG. 18B, a duplicate write instruction, which is output from the write pointer controller 803, and the packet type, which is input via a signal line branched from the signal line 931-0. Similarly to the explanation of the AND circuit 908 and the requestor ID field 915, there are various specific implementations of the AND circuit 911 and the duplicate packet type field 918.

No matter what specific implementation is selected, the AND circuit 911 and the duplicate packet type field 918 operate as below. More specifically, the AND circuit 911 overwrites the duplicate packet type field 918 with the input value of the packet type only when both the output of the comparator 941-0 and the duplicate write instruction have a logical value 1. On the other hand, when at least one of the output of the comparator 941-0 and the duplicate write instruction has a logical value 0, the AND circuit 911 does not overwrite the duplicate packet type field 918, and the duplicate packet type field 918 holds the current value.

Next, the duplicate packet destination ID field 919 is explained. The duplicate packet destination ID field 919 stores a destination ID included in the header of the above second packet. The setting of the value to the duplicate packet destination ID field 919 is conducted by the AND circuit 912.

The inputs to the AND circuit 912 are the output of the comparator 941-0 in FIG. 18B, a duplicate write instruction, which is output from the write pointer controller 803, and a destination ID, which is input via a signal line branched from the signal line 931-0. Likewise the requestor ID, the destination ID is represented by $M_1$ bits, for example. Similarly to the explanation of the AND circuit 908 and the requestor ID field 915, there are various specific implementations of the AND circuit 912 and the duplicate packet destination ID field 919.

No matter what specific implementation is selected, the AND circuit 912 and the duplicate packet destination ID field 919 operate as below. More specifically, the AND circuit 912 overwrites the duplicate packet destination ID field 919 with the input value of the destination ID only when both the output of the comparator 941-0 and the duplicate write instruction have a logical value 1. On the other hand, when at least one of the output of the comparator 941-0 and the duplicate write instruction has a logical value 0, the AND circuit 912 does not overwrite the duplicate packet destination ID field 919, and the duplicate packet destination ID field 919 holds the current value.

Next, the duplicate data state field 920 is explained. The duplicate data state field 920 stores the data state included in the header of the above second packet. The setting of a value to the duplicate data state field 920 is conducted by the AND circuit 913.

The inputs to the AND circuit 913 are the output of the comparator 941-0 in FIG. 18B, a duplicate write instruction, which is output from the write pointer controller 803, and a data state, which is input via a signal line branched from the signal line 931-0. Similarly to the explanation of the AND circuit 908 and the requestor ID field 915, there are various specific implementations of the AND circuit 913 and the duplicate data state field 920.

No matter what specific implementation is selected, the AND circuit 913 and the duplicate data state field 920 operate as below. More specifically, the AND circuit 913 overwrites the duplicate data state field 920 with the input value of the data state only when both the output of the comparator 941-0 and the duplicate write instruction have a logical value 1. On the other hand, when at least one of the output of the comparator 941-0 and the duplicate write instruction has a logical value 0, the AND circuit 913 does not overwrite the duplicate data state field 920, and the duplicate data state field 920 holds the current value.

The values of the duplicate data VALID field 917, the duplicate packet type field 918, the duplicate packet destination ID field 919, and the duplicate data state field 920, which are explained above, are output to a selector 921 in the management table unit 801. In a similar manner, respective sets of four values are output to the selector 921 from the other entries 901-1 to 901-N.

In addition, the outputs from the AND circuits 903-0 to 903-N are input to the selector 921 as a selection signal. Since each of the outputs from the AND circuits 903-0 to 903-N is 1-bit long, the selection signal of the selector 921 is (N+1)-bit long. It is obvious that at most one bit in the (N+1) bits in the selection signal has a logical value 1.

When all bits in the selection signal have a logical value 0, the selector 921 negates its output (i.e. does not output valid data). When the bit j in the selection signal (0≦j≦N) has a logical value 1, the selector 921 selects a set of four values output from the entry 901-*j* and outputs the set to the signal line 815. For example, when a read pointer value "0" and a read instruction are output from the read pointer controller 407, the output of the AND circuit 903-0 becomes a logical value 1, and the selector 921 selects the output from the entry 901-0 for the storage address 0000.

The signal line 815 branches into the signal line 816 connected to the header merging unit 804 and the signal line 817 connected to the selector 805. The value of the duplicate data VALID field 917 output from the selector 921 is then output to the header merging unit 804 and the selector 805 via the signal line 815 and then via the signal lines 816 and 817, respectively. The values of the duplicate packet type field 918, the duplicate packet destination ID field 919, and the duplicate data state field 920 output from the selector 921 are output to the header merging unit 804 via the signal line 815 and the signal line 816.

The header merging unit 804 merges the values of the fields, which are input from the entry (any one of 901-0 to 901-N) corresponding to the read pointer value via the selector 921, with a packet, which is output from the data packet storage unit 410 in response to the read instruction. The header merging unit 804 then outputs the packet obtained as a result of the merging to the selector 805.

For example, the content of the header of the second packet having the same payload as that of the first packet stored in the data packet storage unit 410 is stored in the j-th entry 901-*j*, and a read instruction for designating the storage address of the first packet is issued. Then, the header merging unit 804 merges the content input from the entry 901-*j* via the selector 921 (i.e. merges information corresponding to the header of the second packet) with the first packet output from the data packet storage unit 410.

In the above description, the configuration of the output buffer controller 702*cx* is explained with reference to FIG. 18A and FIG. 18B. Next, operations of the output buffer controller 702*cx* are explained.

Figure 19:
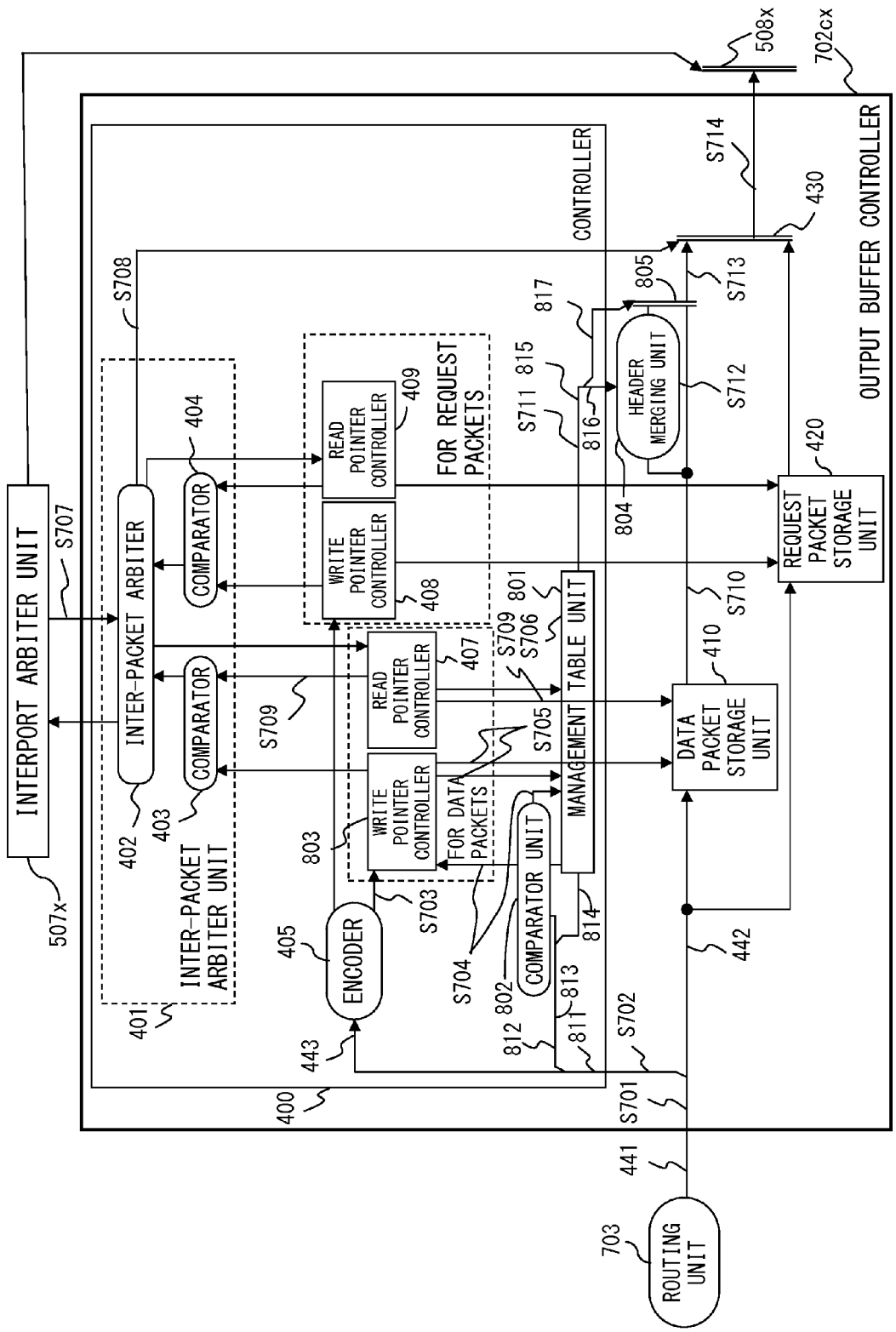
FIG. 19 is a diagram explaining the operations of an output buffer controller in the first embodiment.

FIG. 19 is a diagram explaining the operations of the output buffer controller 702*cx* in the first embodiment. Note that in a case in which a request packet is input, the output buffer controller 702*cx* operates in the same manner as the output buffer controller 207*ca* in the comparative example illustrated in FIG. 7, and for that reason, the explanation is omitted. In the following description, a case in which a data packet is input to the output buffer controller 702*cx* is explained.

In step S701, the data packet output from the CPU 104*c* is routed by the routing unit 703, and is input to the output buffer controller 702*cx*.

Then in step S702, the packet type in the header of the data packet is output to the encoder 405 and the management table unit 801. In addition, the requestor ID and the ReqID in the header are output to the management table unit 801 and the comparator unit 802. Furthermore, the destination ID and the data state in the header are output to the management table unit 801.

In the next step S703, the encoder 405 determines, according to the value of the packet type, that the packet input from the routing unit 703 is a data packet. As a result, the encoder 405 outputs a VALID signal to the write pointer controller 803 for data packets.

Then in step S704, the comparator unit 802 compares a pair of the requestor ID and the ReqID received in step S702 with each pair of the requestor ID and the ReqID output from each of the entries 901-0 to 901-N in the management table unit 801. As a result of the comparison, the comparator unit 802 outputs (N+1) outputs to each of the entries 901-0 to 901-N in the management table unit 801 and the OR circuit 951 in the write pointer controller 803, as explained in connection with FIG. 18B. Step S704 may be executed in parallel with step S703.

Note that the value of the VALID field 914 is output to the comparator unit 802 from each of the entries 901-0 to 901-N in the management table unit 801 as explained in relation to FIG. 18A. Therefore, in step S704, a pair (s) of the requestor ID and the ReqID in an entry (entries) whose value of the VALID field 914 is a logical value 1, which indicates "being valid", is (are) compared with the pair of the requestor ID and the ReqID of the data packet input in step S701.

In step S705, the write pointer controller 803 for data packets obtains the logical disjunction of the (N+1) outputs, which are output from the comparator unit 802 in step S704, by using the OR circuit 951. The write pointer controller 803 then operates as below according to the VALID signal output from the encoder 405 in step S703 and the obtained logical disjunction.

When a VALID signal is output (asserted) from the encoder 405, and when the logical disjunction output from the OR circuit 951 is a logical value 0, no packet having the same data payload as that of the data packet which is input in step S701 is stored. Therefore, the data packet input in step S701 is not to be discarded.

Therefore, in this case, the write pointer controller 803 performs processing to store the data packet, which is input in step S701, into a currently unused block in the data packet storage unit 410. In other words, the write pointer controller 803 outputs a write pointer value held in the FFs 955 in FIG. 18B, and updates the write pointer value. The output destinations of the write pointer value are the management table unit 801, the data packet storage unit 410, and the comparator 403. The write pointer controller 803 also outputs a write instruction to the management table unit 801 and the data packet storage unit 410.

After the write pointer value and the write instruction are thus output, the data packet storage unit 410 stores the packet, and the inter-packet arbiter 402 outputs an output request to the interport arbiter unit 507*x* as a result of arbitration. The details are the same as the operations explained as steps S404*d* to 5407 in the comparative example in FIG. 7.

On the other hand, in step S705, when a VALID signal is output from the encoder 405, and when the logical disjunction output from the OR circuit 951 is a logical value 1, a packet having the same data payload as that of the data packet which is input in step S701 is stored.

Therefore, in this case, the write pointer controller 803 performs processing to store into the management table unit 801 only the header information, which is to be used for the later restoration, of the data packet input in step S701, and to discard the data packet itself. In other words, the write pointer controller 803 outputs a duplicate write instruction to the management table unit 801.

Then in step S706, the management table unit 801 stores the information input in step S702 in a proper entry. The operation of the table management unit 801 in step S706 is based on the write instruction, the duplicate write instruction, and the write pointer value, which are output from the write pointer controller 803, and also based on the (N+1) comparison results, which are output from the comparator unit 802.

More specifically, there are two possible cases in the operation of the management table unit 801 in step S706, depending on whether the write instruction or the duplicate write instruction is output (asserted) in step S705. As is apparent from the explanation of FIG. 18B, the write instruction and the duplicate write instruction are mutually exclusive, and therefore there is no case in which they have a logical value 1 at the same time.

When the write instruction is output in step S705, the management table unit 801 stores the values of the requestor ID and the ReqID, which are input in step S702, in the requestor ID field 915 and the ReqID field 916 in an entry for the address indicated by the write pointer value. The management table unit 801 also sets the value of the VALID field 914 in the entry corresponding to the address indicated by the write pointer value to a logical value 1, and validates the entry corresponding to the address indicated by the write pointer value.

A case in which the duplicate write instruction is output in step S705 is a case in which any one of the comparators 941-0 to 941-N outputs a logical value 1 indicating the match as a result of the comparison in step S704. In other words, when the comparator unit 802 detects the address at which a packet having the same data payload as that of the data packet input in step S701 is stored, a duplicate write instruction is output.

In this case, the management table unit 801 stores the respective values input in step S702 into the duplicate packet type field 918, the duplicate packet destination ID field 919, and the duplicate data state field 920 in the entry for the discerned storage address. When the duplicate write instruction is output, the management table unit 801 also sets the duplicate data VALID field 917 in the entry discerned by the comparator unit 802 to a logical value 1.

As described above, when the duplicate write instruction is output, the packet itself, which is input in step S701, is not stored in the data packet storage unit 410 but is discarded. When the duplicate write instruction is output, the write pointer value is not updated as illustrated in FIG. 18B. Consequently, no arbitration is performed anew in the inter-packet arbiter unit 401, and no new output request to the interport arbiter unit 507x is output from the inter-packet arbiter 402. A series of processing triggered by the input of a packet in step S701 is thus terminated in step S706 if the duplicate write instruction is output in step S705.

On the other hand, when the write instruction is output in step S705, the same operations as those in steps S404d to 5407 in FIG. 7 are performed as mentioned above, and thereafter an output permission for the data packet is output from the interport arbiter unit 507x in step S707.

Then in step S708, in the same manner as in step S409d in FIG. 7, the inter-packet arbiter 402 outputs a selection signal to the inter-packet selector 430 for allowing the data packet to be output and also outputs a read pointer update instruction to the read pointer controller 407 for data packets.

Then in step S709, the read pointer controller 407 outputs the read instruction and the read pointer value to the management table unit 801 and the data packet storage unit 410, and updates the read pointer value. The read pointer controller 407 also outputs the updated read pointer value to the comparator 403.

Then in step S710, the data packet storage unit 410 outputs the packet stored at the address indicated by the read pointer value to the header merging unit 804 and the selector 805 in accordance with the read instruction.

In addition, as indicated as step S711, the management table unit 801 outputs the data in the entry corresponding to the address indicated by the read pointer value to the header merging unit 804 and the selector 805 in accordance with the read instruction.

More specifically, the management table unit 801 outputs the values of the duplicate data VALID field 917, the duplicate packet type field 918, the duplicate packet destination ID field 919, and the duplicate data state field 920 to the header merging unit 804. The management table unit 801 also outputs the value of the duplicate data VALID field 917 to the selector 805 as a selection signal.

If the output value of the duplicate data VALID field 917 is a logical value 0, it indicates that the selector 805 selects the packet itself which is read from the storage address in the data packet storage unit 410 indicated by the read pointer value. In contrast, if the output value of the duplicate data VALID field 917 is a logical value 1, it indicates that the selector 805 selects a packet which is generated in the header merging unit 804 and which includes duplicate information.

In step S711, moreover, the management table unit 801 resets, by using the FFs 904 and the FFs 905 in FIG. 18A, the values of the VALID field 914 and the duplicate data VALID field 917 in the entry for the storage address indicated by the read pointer value to a logical value 0.

Note that step S710 and step S711 may be performed in parallel.

Then in step S712, the header merging unit 804 generates a packet in which information of the four fields input in step S711 is added to the header of the data packet input in step S710, and outputs it to the selector 805. The specific examples are described later, but the header merging unit 804 generates the packet, for example, by inserting the information of the four fields into a predetermined position in the header of the data packet which is input in step S710.

Then in step S713, the selector 805 selects either the packet input from the data packet storage unit 410 or the packet input from the header merging unit 804 in accordance with the selection signal output from the management table unit 801 in step S711. The selector 805 then outputs the selected packet to the inter-packet selector 430.

Here, a selection signal indicating whether to select the request packet or the data packet is input from the inter-packet arbiter 402 to the inter-packet selector 430, as explained in relation to step S409r and S409d in FIG. 7. When the selection signal becomes a value indicating the selection of the data packet, the inter-packet selector 430 selects the packet output from the selector 805 and outputs the packet to the interport selector 508x as indicated as step S714.

In the above description, the operations of the output buffer controller 702cx are explained with reference to FIG. 19. Note that the data packet in the explanation of FIG. 19 may be, for example, a write-back data packet or a shared-type transfer data packet.

The output buffer controller 712ce and others in the XB 102 illustrated in FIG. 16 are configured similarly to the output buffer controller 702cx explained with reference to FIG. 17 to FIG. 19. For example, FIG. 19 is changed into a diagram illustrating the output buffer controller 712ce when the routing unit 703, the interport arbiter unit 507x, and the interport selector 508x are replaced with the routing unit 713, the interport arbiter unit 205e, and the interport selector 206e, respectively. Note that although the explanation about the following drawings mainly refers to the output buffer controller 702cx as in the above, the same explanation is applicable to other output buffer controllers.

Next, as a further specific example, operations performed by the output buffer controller 702cx in the SC 103c when steps S604 and S605 are performed in FIG. 14 are explained with reference to FIG. 20 to FIG. 22.

FIG. 20 is a diagram explaining a specific example of operations performed by the output buffer controller 702cx when the write-back data packet is input first in the first embodiment.

FIG. 20 extracts and illustrates components relevant to steps explained below from among the components in the output buffer controller 702cx. In addition, FIG. 20 illustrates details of the data packet storage unit 410. Furthermore, FIG. 20 illustrates each of the entries 901-0 to 901-N in the management table unit 801 in a table format.

For convenience of explanation, in the following description, it is assumed that at a time point at which the operations of FIG. 20 are started, both the initial values of the write pointer value in the write pointer controller 803 and the read pointer value of the read pointer controller 407 are "0000". It is additionally assumed that at a point in time when the operations of FIG. 20 are started, the initial value of the VALID field 914 is a logical value 0 denoting "being invalid" in all of the entries 901-0 to 901-N in the management table unit 801.

In step S801, the write-back data packet 601, which is output from the CPU 104c, is routed by the routing unit 703 in the SC 103c in FIG. 15, and is input to the output buffer controller 702cx in the preceding stage of the output port 502x connected to the XB 102.

Then in step S802, the packet header information 605 of the write-back data packet 601 is output to the encoder 405, the management table unit 801, and the comparator unit 802.

As explained in connection with FIG. 17, more specifically, the header of the write-back data packet 601 has fields of at least the packet type, requestor ID, ReqID, destination ID, and data state.

In the example of FIG. 20, the value of the packet type is a value which denotes being a write-back data packet.

FIG. 20, similarly to FIG. 14, also illustrates an example in which, upon the CPU 104a requesting data in the main memory 105e, the CPU 104c, which is caching the requested data, outputs the write-back data packet 601. Therefore, the value of the requestor ID of the write-back data packet 601 is the ID of the CPU 104a. The value of the destination ID is the ID of the SC 103e, which is in the same node 101e as the main memory 105e and which manages the main memory 105e.

Note that the value of the ReqID is assumed to be "5" for convenience of explanation. Since no data state is designated in the write-back data packet 601, the value of the data state is a value denoting "none".

In step S802, the packet type is output to the encoder 405 and the management table unit 801, the requestor ID and the ReqID are output to the management table unit 801 and the comparator unit 802, and the destination ID and the data state are output to the management table unit 801.

Then in step S803, the encoder 405 judges that "the write-back data packet 601 is a data packet" based on the received packet type, and then outputs a VALID signal to the write pointer controller 803 for data packets.

On the other hand, in step S804, the comparator unit 802 compares the values of the received requestor ID and ReqID with the values output from the requestor ID field 915 and the ReqID field 916, for each of the entries 901-0 to 901-N in the management table unit 801. Actually, only an entry (entries) in which the value of the VALID field 914 is a logical value 1 denoting "being valid" is/are a target (s) for comparison as explained in connection with FIG. 18A to FIG. 19.

Accordingly, in a case in which "the value of the VALID field 914 is a logical value 0 in all of the entries 901-0 to 901-N" as described above, each of the (N+1) outputs from the comparator unit 802 has a logical value 0 denoting a "mismatch". As illustrated in FIG. 18B, the comparator unit 802 outputs the comparison results to the management table unit 801 and the write pointer controller 803.

Consequently, in step S805, the write pointer controller 803 for data packets obtains the logical disjunction of the (N+1) outputs from the comparator unit 802. The obtained logical disjunction indicates that no valid entry that stores the requestor ID and the ReqID matching the requestor ID and the ReqID of the write-back data packet 601 is present in the management table unit 801. In addition, as descried above with respect to step S803, the VALID signal is output from the encoder 405.

Therefore, in step S805, the write pointer controller 803 outputs a write instruction and a write pointer value "0000" to the management table unit 801 and the data packet storage unit 410 and afterwards updates the write pointer value to "0001".

Then in step S806, in accordance with the write instruction, the management table unit 801 sets the values of three fields in the entry 901-0 for the address "0000" indicated by the input write pointer value.

More specifically, the management table unit 801 sets the VALID field 914 of the entry 901-0 to a logical value 1 denoting "being valid". The management table unit 801, in addition, stores the ID of the CPU 104a, which is input in step S802, to the requestor ID field 915 of the entry 901-0. Furthermore, the management table unit 801 stores the value "5" of the ReqID, which is input in step S802, in the ReqID field 916 of the entry 901-0.

In addition, in step S807, in accordance with the write instruction, the data packet storage unit 410 stores the write-back data packet 601 at the address "0000" indicated by the input write pointer value. The order of performing steps S806 and S807 is arbitrary, and steps S806 and S807 may be performed in parallel.

In step S808, the comparator 403 of the inter-packet arbiter unit 401 compares the write pointer value for data packets and the read pointer value for data packets. The write pointer value is the updated value "0001", which is received from the write pointer controller 803, and the read pointer value is the value "0000", which is received from the read pointer controller 407. Consequently, the comparison result is "mismatch", and the comparator 403 outputs an output request to the inter-packet arbiter 402.

The inter-packet arbiter 402 then performs, if needed, arbitration between the output request received in step S808 and an output request relating to a request packet, and afterwards outputs the output request to the interport arbiter unit 507x in step S809.

Next explained is a case in which a shared-type transfer data packet is further input to the output buffer controller 702cx before the output permission to the output request of step S809 is obtained.

Figure 21:
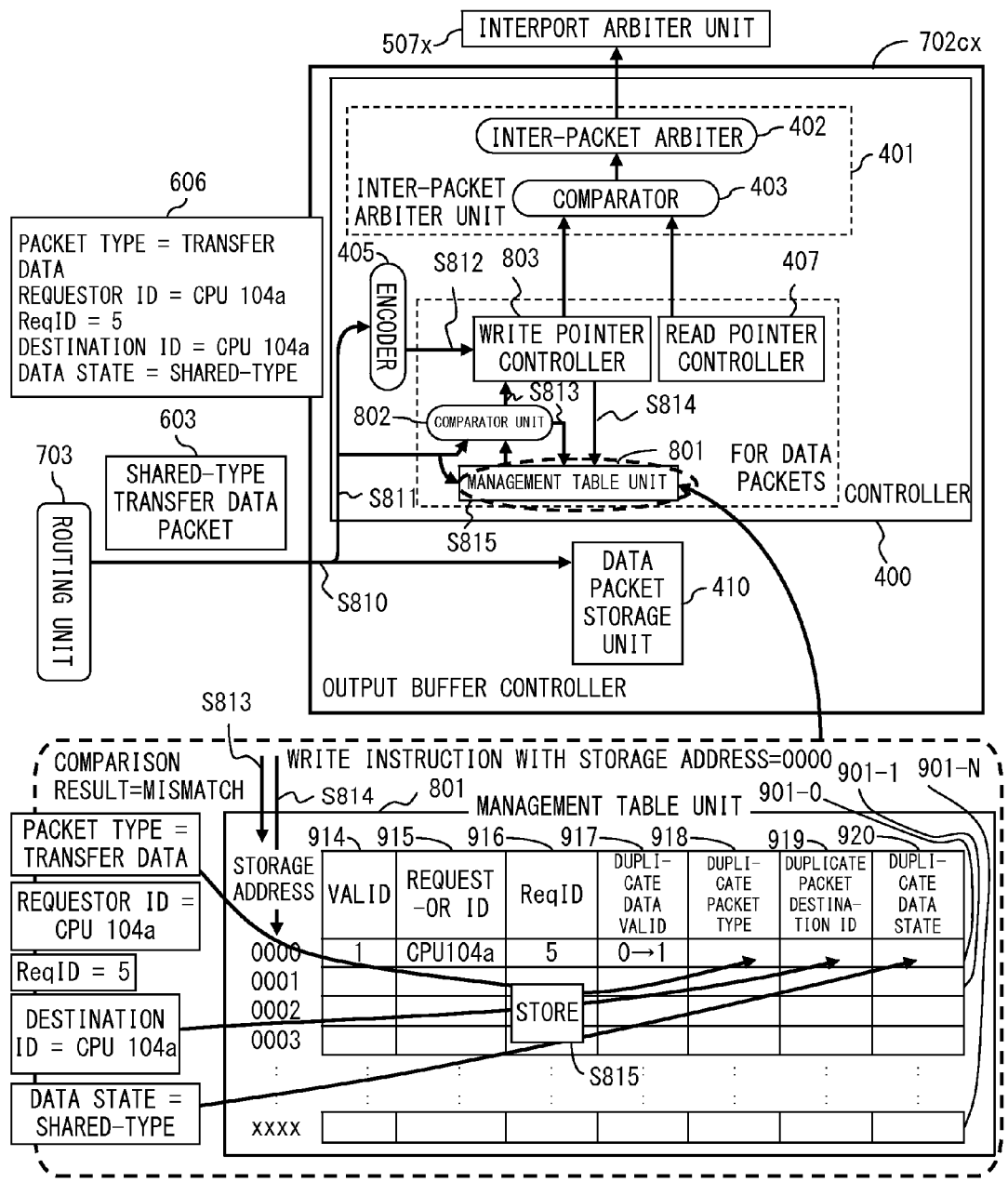
FIG. 21 is a diagram explaining a specific example of the operations performed by an output buffer controller when a shared-type transfer data packet is input after the write-back data packet is input in the first embodiment.

FIG. 21 is a diagram explaining a specific example of operations performed by the management table unit 801 in the output buffer controller 702cx when the shared-type transfer data packet is input after the write-back data packet is input in the first embodiment. Note that FIG. 21 extracts and illustrates components relevant to steps explained below from among the components in the output buffer controller 702cx. In addition, FIG. 21 illustrates each of the entries 901-0 to 901-N in the management table unit 801 in a table format.

In step S810, the shared-type transfer data packet 603, which is output from the CPU 104c in FIG. 15, is routed by the routing unit 703 in the SC 103c, and is input to the output buffer controller 702cx in the preceding stage of the output port 502x connected to the XB 102.

Then in step S811, the packet header information 606 of the shared-type transfer data packet 603 is output to the encoder 405, the management table unit 801, and the comparator unit 802.

The shared-type transfer data packet 603 is a packet that is output, upon the CPU 104a requesting data in the main memory 105e, by the CPU 104c which is caching the requested data. Therefore, in the packet header information 606, the value of the packet type is a value which denotes being a transfer data packet, each of the values of the requestor ID and the destination ID is the ID of the CPU 104a, and the value of the ReqID is "5", as assumed in FIG. 20. In the packet header information 606, the value of the data state is assumed to be a value denoting the "shared-type" in accordance with the cache protocol.

In step S811, the packet type is output to the encoder 405 and the management table unit 801, the requestor ID and the ReqID are output to the management table unit 801 and the comparator unit 802, and the destination ID and the data state are output to the management table unit 801.

Next, in step S812, the encoder 405 judges that "the shared-type transfer data packet 603 is a data packet" based on the received packet type, and then outputs a VALID signal to the write pointer controller 803 for data packets.

On the other hand, in step S813, the comparator unit 802 compares the values of the received requestor ID and ReqID with the values output from the requestor ID field 915 and the ReqID field 916, for each of the entries 901-0 to 901-N in the management table unit 801. Actually, according to the assumption in FIG. 20 and the operations in FIG. 20, only the entry 901-0, in which the value of the VALID field 914 is a logical value 1, is a target for comparison.

As a result of step S806 in FIG. 20, in the entry 901-0, the ID of the CPU 104a is stored in the requestor ID field 915, and the value "5" is stored in the ReqID field 916. Therefore, in step S813, the comparator unit 802 outputs a logical value 1 denoting a "match" from the comparator 941-0 corresponding to the entry 901-0, and outputs a logical value 0 denoting a "mismatch" from the other comparators 941-1 to 941-N corresponding to the other entries 901-1 to 901-N. The output destinations of these (N+1) comparison results are the management table unit 801 and the write pointer controller 803.

Then in step S814, the write pointer controller 803 for data packets obtains the logical disjunction of the (N+1) outputs from the comparator unit 802. The obtained logical disjunction indicates that a valid entry that stores the requestor ID and the ReqID matching the requestor ID and the ReqID of the shared-type transfer data packet 603 is present in the management table unit 801. In addition, as described above with respect to step S812, the VALID signal is output from the encoder 405.

Therefore, in step S814, the write pointer controller 803 outputs a duplicate write instruction to the management table unit 801. In other words, in step S814, a write instruction is negated, and the write instruction is not output to the data packet storage unit 410. Therefore the shared-type transfer data packet 603 itself is not stored in the data packet storage unit 410 but is discarded.

Then in step S815, the management table unit 801 sets values of four fields in the entry 901-0, for which a match is detected, according to the duplicate write instruction output from the write pointer controller 803 and the (N+1) outputs from the comparator unit 802.

More specifically, the management table unit 801 sets the duplicate data VALID field 917 of the entry 901-0 to a logical value 1 denoting "being valid". In addition, the management table unit 801 stores the value, which is input in step S811 and which denotes being a transfer data packet, in the duplicate packet type field 918 of the entry 901-0.

In addition, the management table unit 801 stores the ID of the CPU 104a, which is input in step S811, in the duplicate packet destination ID field 919 of the entry 901-0. The management table unit 801 also stores the value, which is input in step S811 and which denotes the "shared-type", in the duplicate data state field 920 of the entry 901-0.

As explained above with reference to FIG. 20 and FIG. 21, according to the first embodiment, when a second data packet is input before an output permission for a first data packet is obtained, only one block in the data packet storage unit 410 is used. Compared with the comparative example in which two blocks in the data packet storage unit 410 are used in order to store two packets having the same data payload as in FIG. 13, the storage capacity required in the data packet storage unit 410 is reduced by half in the first embodiment.

In other words, when the maximum outstanding number of the shared-type data transfer request packets which are output by the SC 103c to the CPUs 104c and 104d in the same node 101c is P, the data packet storage unit 410 would need a 2P-block capacity in the comparative example. On the other hand, the required capacity of the data packet storage unit 410 is P-block in the first embodiment.

Note that the management table unit 801, which is not present in the comparative example, is provided in the first embodiment, and the management table unit 801 includes entries 901-0 to 901-N realized by memory elements such as FFs. However, in general, the header of a packet is sufficiently shorter than the data payload. Therefore, the storage capacity required for the output buffer controller in the first embodiment is significantly smaller than that in the comparative example even if the storage capacity additionally required for the management table unit 801 is taken into consideration. Accordingly, the first embodiment requires approximately half of the capacity required in the comparative example even if the comparison is made with respect to the storage capacity required for not only the data packet storage unit 410 but the entire output buffer controller.

Next, a specific example of the operations performed when an output permission is issued from the interport arbiter unit 507x after step S814 in FIG. 21, namely, a specific example of steps S707 to S714 in FIG. 19, is explained.

FIG. 22 is a diagram explaining a specific example of the operations performed by the header merging unit 804 of the output buffer controller 702cx when the output permission is issued from the interport arbiter unit 507x after the shared-type transfer data packet is discarded by the processing in FIG. 21 in the first embodiment. FIG. 22 extracts and illustrates components relevant to the steps explained below from among the components in the output buffer controller 702cx. In addition, FIG. 22 includes a schematic view illustrating the operations of the header merging unit 804.

In step S901, an output permission is output from the interport arbiter unit 507x to the inter-packet arbiter 402.

Then in step S902, the inter-packet arbiter 402 outputs a selection signal to the inter-packet selector 430 for giving an instruction to output a data packet and also outputs a read pointer update instruction to the read pointer controller 407 for data packets.

Next, in step S903, in accordance with the read pointer update instruction, the read pointer controller 407 first outputs a read instruction and the read pointer value "0000" to the management table unit 801 and the data packet storage unit 410, and then updates the read pointer value. The read pointer controller 407 then outputs the updated read pointer value "0001" to the comparator 403.

Here, since the write pointer value is updated to "0001" in step S805 in FIG. 20, execution of step S903 causes the read pointer value and the write pointer value to match each other. Therefore, the updating of the read pointer value causes the comparator 403 to negate an output request to the inter-packet arbiter 402. In other words, the output request is caused not to be output from the comparator 403 to the inter-packet arbiter 402.

Accordingly, if the comparator 404 does not output an output request to the inter-packet arbiter 402 in relation to a request packet, an output request from the inter-packet arbiter 402 to the interport arbiter unit 507x is also caused not to be output.

In addition, in step S904, the data packet storage unit 410 outputs the packet stored at the address "0000" indicated by the read pointer value to the header merging unit 804 and the selector 805 in accordance with the read instruction and the read pointer, which are input in step S903. Note that as explained in connection with FIG. 20, the write-back data packet 601 is stored at the address "0000".

In step S905, the management table unit 801 outputs the values of four fields stored in the entry 901-0 for the address "0000" indicated by the read pointer value to the header merging unit 804 in accordance with the read instruction, which is input in step S903.

More specifically, the management table unit 801 outputs the values of the duplicate data VALID field 917, the duplicate packet type field 918, the duplicate packet destination ID field 919, and the duplicate data state field 920 in the entry 901-0 to the header merging unit 804. The values of these fields are a logical value 1 denoting "being valid", a value indicating a transfer data packet, the ID of the CPU 104a, and a value denoting the "shared-type", respectively, as explained in connection with FIG. 21. The values of the above four fields may be collectively referred to as duplicate information 607.

In step S905, the management table unit 801 further outputs a logical value 1, which is a value of the duplicate data VALID field 917 in the entry 901-0 for the address "0000" indicated by the read pointer value, to the selector 805. As illustrated in FIG. 18A, the management table unit 801 then resets the duplicate data VALID field 917 in the entry 901-0 to a logical value 0 indicating "being invalid" by using the output of the FFs 905 as a reset signal.

Note that the order of performing steps S904 and S905 is arbitrary and steps S904 and S905 may be performed in parallel.

Next, in step S906, the header merging unit 804 adds the duplicate information 607, which is output from the management table unit 801 in step S905, to the header of the write-back data packet 601, which is output from the data packet storage unit 410 in step S904.

The header merging unit 804 creates a write-back data packet 608 with duplicate information by adding the duplicate information 607, and outputs the packet to the selector 805.

The header of the write-back data packet 601 includes, for example, fields of a packet type, a destination ID, a requestor ID, a ReqID, a data state, an address, and others. One or more reserved fields may be provided at the end of the header. Note that the address field in the header indicates an address of the main memory in which data included in the data payload is to be stored.

The header merging unit 804 inserts the duplicate information 607 at a predetermined position in the header of the write-back data packet 601. In the example of FIG. 22, for example, the "predetermined position" is a position immediately before the reserved field(s) at the end of the header. However, the "predetermined position" may be arbitrarily defined in accordance with the embodiments.

In the header of the write-back data packet 608 with duplicate information, as illustrated in FIG. 22, the fields of the packet type, the destination ID, the requestor ID, the ReqID, and the data state, the address and other(s), which were originally included in the write-back data packet 601, are followed by the four fields corresponding to the duplicate information 607. The reserved field(s), which was/were originally included in the write-back data packet 601, is/are provided at the end. The data payload of the write-back data packet 608 with duplicate information is the data payload itself of the write-back data packet 601.

In other words, the write-back data packet 608 with duplicate information includes the information in the header of the write-back data packet 601 and the information in the header of the shared-type transfer data packet 603. In addition, the write-back data packet 608 with duplicate information includes a data payload that is common to the write-back data packet 601 and the shared-type transfer data packet 603.

Here, the selector 805 receives an input of the write-back data packet 601 from the data packet storage unit 410 and an input of the write-back data packet 608 with duplicate information from the header merging unit 804. In step S907, the selector 805 selects the write-back data packet 608 with duplicate information in accordance with the value in the duplicate data VALID field 917 as a selection signal output from the management table unit 801 in step S905, and outputs the write-back data packet 608 with duplicate information to the inter-packet selector 430.

Then in step S908, the inter-packet selector 430 selects a data packet according to the selection signal, which is input in step S902. In other words, the inter-packet selector 430 selects the write-back data packet 608 with duplicate information input from the selector 805, and outputs it to the interport selector 508x.

Note that when outputting the output permission to the output buffer controller 702cx in step S901, the interport arbiter unit 507x outputs, to the interport selector 508x, a selection signal for giving an instruction to select the output buffer controller 702cx. Therefore, the write-back data packet 608 with duplicate information output to the interport selector 508x from the inter-packet selector 430 in step S908 is selected in the interport selector 508x, and is output to the output port 502x in FIG. 15. The write-back data packet 608 with duplicate information is then output to the input port 201c of the XB 102 illustrated in FIG. 16 from the output port 502x via the bus 108c.

Note that in the comparative example, as illustrated in FIG. 12 and FIG. 13, the write-back data packet 601 and the shared-type transfer data packet 603, which are individually stored in the data packet storage unit 410, are individually output from the SC 103c to the XB 102 via the bus 108c. On the other hand, in the first embodiment, as described above, a single write-back data packet 608 with duplicate information is output from the SC 103c to the XB 102 via the bus 108c. Therefore, the first embodiment enables the occupancy time of the bus 108c due to the output of data packets to be reduced approximately by half that of the comparative example.

Note that the write-back data packet 608 with duplicate information has a longer packet length than the write-back data packet 601 and also than the shared-type transfer data packet 603 for its added duplicate information 607. However, in general, a packet format in which the header length is substantially shorter than the length of a data payload is adopted in many cases. Accordingly, the length of the write-back data packet 608 with duplicate information is approximately half the sum of the length of the write-back data packet 601 and the length of the shared-type transfer data packet 603.

When the occupancy time of the bus 108c is reduced, a waiting time from an output of an output request from each of the output buffer controllers 702cx, 702dx, 509ix, and 509sx to the interport arbiter unit 507x to the issue of an output permission is reduced in the SC 103c in FIG. 15. As a result, according to the first embodiment, compared with the comparative example, the latency and throughput of the whole server system 100 is improved. In other words, according to the first embodiment, the performance of the server system 100 is improved.

Next, restoration in the XB 102 from the write-back data packet 608 with duplicate information output to the XB 102 as illustrated in FIG. 22 is explained with the details of components in the XB 102 with reference to FIG. 23 to FIG. 29.

Figure 23:
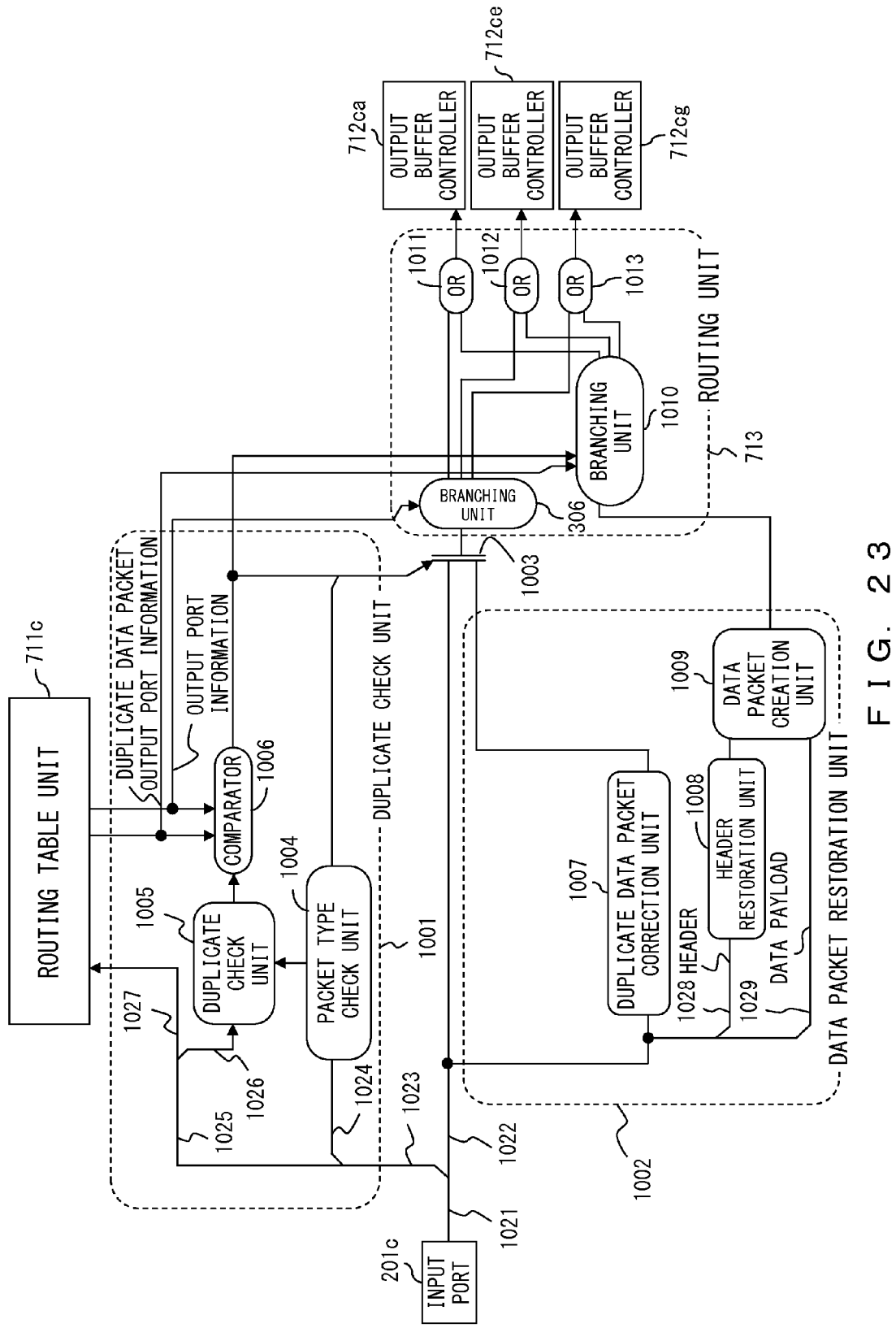
FIG. 23 is a diagram illustrating the configurations of a duplicate check unit, a data packet restoration unit, a selector, and a routing unit in the first embodiment.

FIG. 23 is a diagram illustrating the configurations of a duplicate check unit 1001, a data packet restoration unit 1002, a selector 1003, and the routing unit 713 in the first embodiment. FIG. 23 is a diagram extracting and illustrating a portion which is in the XB 102 illustrated in FIG. 16 and which corresponds to the SC 103c.

In other words, FIG. 23 illustrates the duplicate check unit 1001, the data packet restoration unit 1002, and the selector 1003 provided on the route from the input port 201c connected to the SC 103c to the routing unit 713 in FIG. 16. In addition, FIG. 23 extracts and illustrates a portion of the routing unit 713 (more specifically, a portion relating to the routing of a packet received by the input port 201c).

Note that duplicate check units 1001, data packet restoration units 1002, and selectors 1003, each being similar to that in FIG. 23, are also provided correspondingly to the other SCs 103a, 103e, and 103g in FIG. 16. The routing unit 713 is configured symmetrically with respect to the four SCs 103a to 103g.

Furthermore, a duplicate check unit 1001, a data packet restoration unit 1002, and a selector 1003 as in FIG. 23 are provided on a route from the input port 501x to the routing unit 703 in FIG. 15. Although illustration of the details of the routing unit 703 in the SC 103c is omitted, the configuration of the routing unit 703 is described later with the configuration of the routing unit 713.

In FIG. 23, the duplicate check unit 1001, the data packet restoration unit 1002, and the selector 1003 are provided on the route from the input port 201c connected with the SC 103c to the routing unit 713. In addition, the duplicate check unit 1001 is connected with the routing table unit 711c. The details of the routing table unit 711c are described later using FIG. 25.

The duplicate check unit 1001 includes a packet type check unit 1004, a duplicate check unit 1005, and a comparator 1006. The data packet restoration unit 1002 includes a duplicate data packet correction unit 1007, a header restoration unit 1008, and a data packet creation unit 1009.

The routing unit 713 includes a branching unit 306 as in the routing unit 203 in FIG. 6 in the comparative example, and further includes a branching unit 1010, an OR circuit 1011, an OR circuit 1012, and an OR circuit 1013. Note that the branching unit 306 is connected with the OR circuits 1011, 1012, and 1013 although the branching unit 306 in FIG. 6 is connected with the output buffer controllers 207ca, 207ce, and 207cg. The OR circuits 1011, 1012, and 1013 are connected to the corresponding output buffer controllers 712ca, 712ce, and 712cg, respectively.

All or part of a packet input from the input port 201c is input to the individual units as described below.

A packet that the input port 201c receives from the SC 103c is output to a signal line 1021 connected with the input port 201c. The signal line 1021 branches into a signal line 1022 and a signal line 1023. The signal line 1022 branches and is connected to the selector 1003 and the duplicate data packet correction unit 1007, and the packet is output to the selector 1003 and the duplicate data packet correction unit 1007 via the signal line 1022.

The header information included in the packet is output to the duplicate check unit 1001 via the signal line 1023 branched from the signal line 1021. The signal line 1023 further branches into a signal line 1024 and a signal line 1025, and the signal line 1025 branches into a signal line 1026 and a signal line 1027. The value of the packet type field in the header information is output to the packet type check unit 1004 via the signal line 1024.

The value of the duplicate data VALID field in the header information is output to the duplicate check unit 1005 via the signal line 1026, and the values of the destination ID field and the duplicate destination field of the header information are output to the routing table unit 711c via the signal line 1027.

Note that the packet received by the input port 201c does not have the duplicate data VALID field or the duplicate packet destination ID field when the packet is a request packet, for example. In such a case, a logical value 0 is output to the duplicate check unit 1005 as a dummy value via the signal line 1026. In addition, a dummy value that does not appear as an existing destination ID, for example, may be output to the routing table unit 711c via the signal line 1027. For example, if it is defined in advance that a value whose all bits have a logical value 0 is not used as a destination ID, the value whose all bits have a logical value 0 may be used as the dummy value.

The output of such a dummy value may be appropriately realized in accordance with the specification defining the packet format.

For example, packets in a format in which an option area that is allowed to be used for any purpose is included in the header may be used in the server system 100. In addition, each of the fields of the duplicate data VALID, the duplicate packet type, the duplicate packet destination ID, and the duplicate data state, all of which are illustrated in FIG. 22, may use the option area. As an example, the specification may define that the option area is padded with "0"s when it is not used.

In this case, if a point at which the signal line 1023 branches from the signal line 1021 is realized as in the above (e2), for example, it is realized to output a dummy value according to need as described above.

Alternatively, packets in a format including a field indicating a header length may be used, and a circuit element, which is not illustrated in the drawings, may be provided at a point at which the signal line 1023 branches from the signal line 1021, as explained in the above (e3), for example. This circuit element may determine whether or not a packet output from the input port 201c contains the duplicate data VALID field and the duplicate packet destination ID field in accordance with the value of the field indicating the header length, and may output dummy data if needed.

Meanwhile, the branched signal line 1022 not only connects to the duplicate data packet correction unit 1007 as described above but also further branches into a signal line 1028 and a signal line 1029, which connect to the header restoration unit 1008 and the data packet creation unit 1009, respectively.

In a packet output via the signal line 1022, the header is output to the header restoration unit 1008 via the signal line 1028, and the data payload is output to the data packet creation unit 1009.

In the above description, the overview of the configurations of the duplicate check unit 1001, the data packet restoration unit 1002, the selector 1003, and the routing unit 713 are explained, and inputs to each of the components directly connected to the input port 201c in FIG. 23 are also explained. Next, operations of each of the components illustrated in FIG. 23 are explained in detail with reference to FIG. 24.

Figure 24:
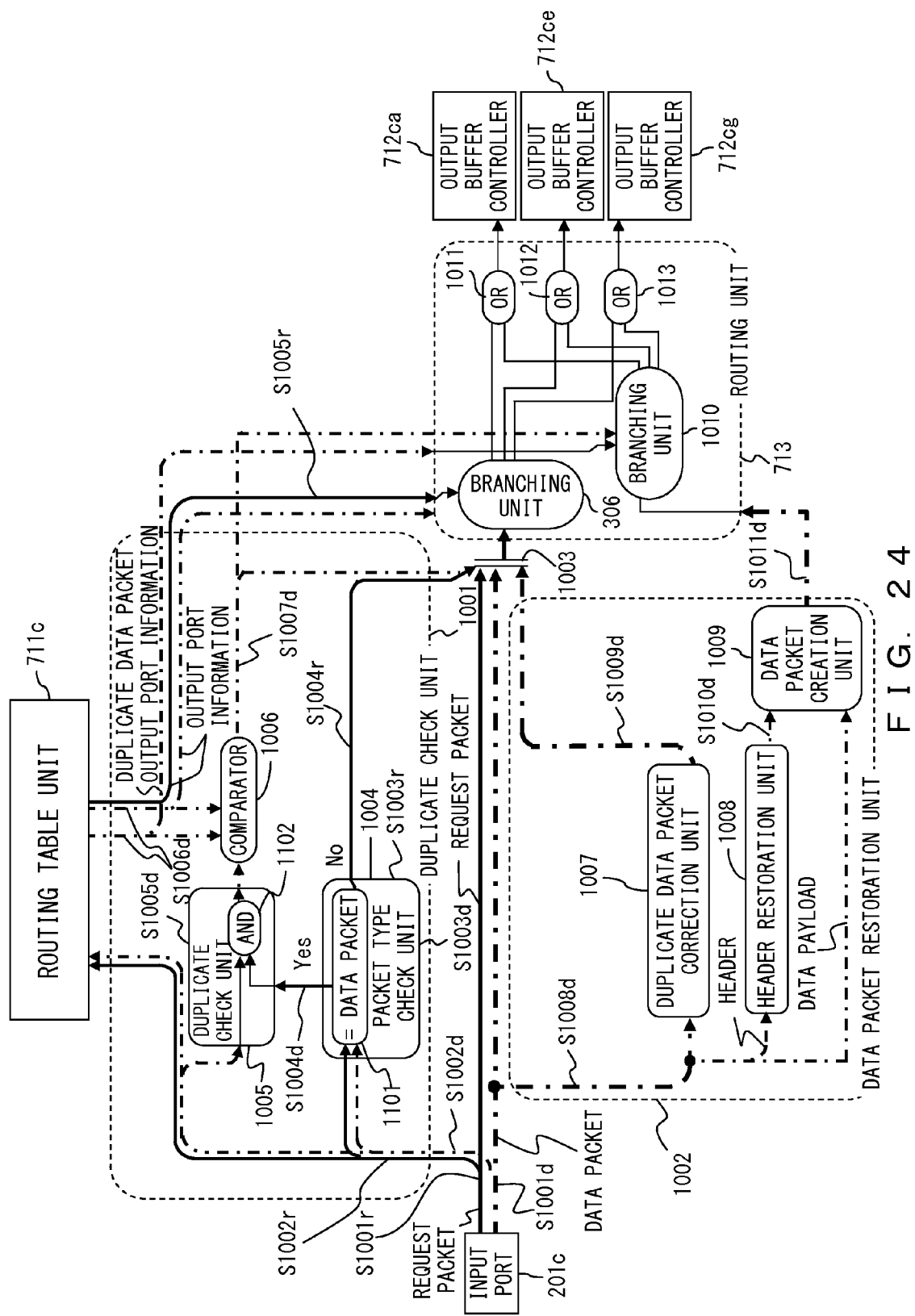
FIG. 24 is a diagram explaining the operations of the duplicate check unit, the data packet restoration unit, and the selector in the first embodiment.

FIG. 24 is a diagram explaining the operations of the duplicate check unit, the data packet restoration unit, and the selector in the first embodiment.

First, operations in a case in which a request packet such as a memory access request packet and a data transfer request packet (i.e. a packet that does not have a data payload) is input to the input port 201c are explained. The operation flow for processing the request packet is denoted by a solid arrow in FIG. 24.

In step S1001r, the input port 201c outputs a request packet.

Then in step S1002r, the destination ID field in the header of the request packet is output to the routing table unit 711c, and the packet type field in the header is output to the packet type check unit 1004. In addition, dummy values for the duplicate data VALID field and the duplicate packet destination ID field may be output as described above.

Here, the packet type check unit 1004 includes, as illustrated in the drawing, a determination unit 1101 for determining whether the input value of the packet type is a value denoting a data packet or not. In step S1003r, the determination unit 1101 determines that the input packet is a request packet by encoding the input value of the packet type.

Then in step S1004r, the determination unit 1101 outputs, to the selector 1003, a selection signal for giving an instruction to output, not an input from the duplicate data packet correction unit 1007, but a packet as is that is input from the input port 201c via the signal line 1022 in FIG. 23. In accordance with the selection signal, the selector 1003 outputs the packet input from the input port 201c to the branching unit 306 of the routing unit 713.

In addition, since the input value of the packet type denotes a request packet, the determination unit 1101 also negates a VALID signal to be output to the duplicate check unit 1005 in step S1004r.

Meanwhile, in step S1005r, the routing table unit 711c determines the routing destination of the input packet according to the destination ID input via the signal line 1027 in FIG. 23, and outputs the output port information to the branching unit 306 of the routing unit 713. Step S1005r may be performed in parallel with steps S1003r and S1004r.

Then the branching unit 306 outputs the input request packet to the OR circuit 1011, 1012 or 1013 according to the output port information.

Although details of the routing of a packet via the OR circuit 1011, 1012, or 1013 are described later with FIG. 26, the outline is provided below. For example, a request packet whose output destination is the output port 202a in FIG. 16 is output to the OR circuit 1011 connected to the output buffer controller 712ca in the preceding stage of the output port 202a in accordance with the output port information determined in step S1005r. At that time, data padded with logical values 0 is output from the branching unit 1010 to the OR circuit 1011 as described later. Consequently, the request packet that the branching unit 306 outputs is output to the output buffer controller 712ca via the OR circuit 1011.

In addition, the configuration of the inside of the routing table unit 711c for obtaining output port information from a destination ID is similar to that of the routing table unit 204c in FIG. 6. The details of the configuration of the routing table unit 711c are described later in FIG. 25.

As described above, when a request packet is output from the input port 201c, routing is performed without using the data packet restoration unit 1002.

Next, operations in a case in which a data packet such as a write-back data packet and a transfer data packet (i.e. a packet that has a data payload) is input to the input port 201c are explained. The operation flow for processing a data packet is denoted by an arrow with a dashed-dotted line in FIG. 24.

In step S1001d, the input port 201c outputs a data packet.

Then in step S1002d, the destination ID field and the duplicate packet destination ID field in the header of the data packet are output to the routing table unit 711c. In addition, the packet type field in the header is output to the packet type check unit 1004. Furthermore, the duplicate data VALID field is output to the duplicate check unit 1005. Note that when the input data packet does not have the duplicate data VALID field or the duplicate packet destination ID field, dummy values may be used as described above.

Then in step S1003d, the determination unit 1101 in the packet type check unit 1004 determines that the input packet is a data packet.

Then in step S1004d, the determination unit 1101 outputs (asserts) to the duplicate check unit 1005 a VALID signal indicating that the input packet is a data packet. In the first embodiment, since the VALID signal is a signal in positive logic, a logical value 1 is output to the duplicate check unit 1005 in step S1004d. Note that in step S1004d for a case in which a data packet is input, the determination unit 1101 sets a selection signal to the selector 1003 to be an invalid value. By doing this, the determination unit 1101 instructs the selector 1003 to operate only in accordance with a selection signal from the comparator 1006 described later.

Then in step S1005d, the duplicate check unit 1005 determines "whether the comparator 1006 needs to perform a comparison to determine the necessity of restoration from the input data packet or not". Here, in order to explain the determination in step S1005d, a case in which a data packet is input is divided into the following cases of (j1) to (j3).

(j1) A case in which the input packet is a packet that does not have valid duplicate information: For example, assume that an output permission is output from the interport arbiter unit 507x after the processing illustrated in FIG. 20 in the output buffer controller 702cx in the SC103c and before the input thereto of the shared-type transfer data packet 603 similar to that of FIG. 21. Consequently, the addition of the duplicate information 607 as in FIG. 22 is not performed, and thus, the data packet input to the input port 201c in the XB 102 does not have valid duplicate information.

(j2) A case in which the input packet has valid duplicate information and an output port corresponding to the destination ID field and an output port corresponding to the duplicate destination ID field are the same: For example, a data packet that has duplicate information may be created from a shared-type transfer data packet addressed to the CPU 104e and a write-back data packet addressed to the SC 103e by processing similar to that of FIG. 20 to FIG. 22. When the thus created packet is input to the input port 201c, both the output port corresponding to the destination ID field and the output port corresponding to the duplicate destination ID field are the output port 202e in FIG. 16, and are the same.

(j3) A case in which the input packet has valid duplicate information and an output port corresponding to the destination ID field and an output port corresponding to the duplicate destination field are different: For example, (j3) includes a case in which the write-back data packet 608 with duplicate information in FIG. 22 created by the processing in FIG. 20 to FIG. 22 is input to the input port 201c.

In the first embodiment, the routing unit 713 routes the input packet itself in the cases of above (j1) and (j2). This is because in the case of (j1), restoration is inherently unnecessary. With respect to the case of (j2), the reason is that restoration performed at a later point in time enables further reduction in the occupancy time of internal buses of the XB 102 and a bus between the XB 102 and an SC (the bus 108e between the XB 102 and the SC 103e in the above example).

In contrast, in the case of (j3), the data packet restoration unit 1002 restores two packets from the input packet, and the routing unit 713 routes the two restored packets. In other words, the restoration is needed only in the case of (j3).

Here, a case in which the value of the duplicate VALID field in the input packet denotes "being invalid" corresponds to the above (j1) and is inherently irrelevant to the packet restoration. Therefore, it is immediately found that the restoration is unnecessary, without comparison by the comparator 1006.

However, in a case in which the value of the duplicate VALID field in the input packet denotes "being valid", whether the restoration is needed or not varies depending on whether the above (j2) or (j3) holds. In order to discriminate the above (j2) and (j3), the output port corresponding to the destination ID field and the output port corresponding to the duplicate destination ID field need to be compared with one another. In other words, comparison by the comparator 1006 is needed in order to determine whether the restoration from the input packet is needed or not.

In order to determine whether the comparison by the comparator 1006 is needed or not, the duplicate check unit 1005 includes an AND circuit 1102 as illustrated in FIG. 24. The inputs to the AND circuit 1102 are the value of the duplicate VALID field input via the signal line 1026 in FIG. 23, and the VALID signal output from the determination unit 1101 of the packet type check unit 1004. Note that, as a matter of course, when a request packet is input, the comparison by the comparator 1006 is not needed.

In step S1005d, the output of the AND circuit 1102 becomes a logical value 0 in the case of the above (j1), and becomes a logical value 1 in the case of the above (j2) or (j3). The output of the AND circuit 1102 is input to the comparator 1006.

In other words, when a comparison by the comparator 1006 is needed, the AND circuit 1102 of the duplicate check unit 1005 outputs a VALID signal in positive logic to the comparator 1006.

Meanwhile, as in step S1006d, the routing table unit 711c outputs output port information and duplicate data packet output port information according to the values of the destination ID field and the duplicate destination ID field, which are input in step S1002d.

Note that the "output port information" is information identifying an output port corresponding to a destination designated in the destination ID field as described in the comparative example. In addition, the "duplicate data packet output port information" is information identifying an output port corresponding to a destination designated in the duplicate packet destination ID field.

Here, the operations of the routing table unit 711c in step S1006d are explained with reference to FIG. 25, illustrating the detailed configuration of the routing table unit 711c.

FIG. 25 is a configuration diagram of the routing table unit 711c in the first embodiment. The routing table unit 711c is a component for managing the routing from the SC 103c to other SCs as illustrated in FIG. 16 and FIG. 23.

The routing table unit 711c includes FFs 307a to 307l, comparators 308a to 308l, OR circuits 309a to 309c, a selector 310, and FFs 311a to 311c, all of which are the same as the routing table unit 204c in the comparative example illustrated in FIG. 6. Similarly to the comparative example, the FFs 307a to 307l respectively store IDs of components such as the CPU 104a, which are possible packet destinations, and the FFs 311a to 311c store information identifying the output port 202a, 202e, and 202g.

Accordingly, the routing table unit 711c outputs the output port information from the selector 310 in the same manner as the routing table unit 204c of the comparative example in accordance with the input value of the destination ID field.

The routing table unit 711c further includes twelve comparators 1201a to 1201l, three OR circuits 1202a to 1202c, and a selector 1203.

The values held in the twelve sets of FFs 307a to 307l are input to the twelve comparators 1201a to 1201l, respectively. In addition, a value of the duplicate destination ID field is input to each of the twelve comparators 1201a to 1201l. Each of the comparators 1201a to 1201l compares the two inputs and outputs a logical value 1 when the two inputs match one another, or outputs a logical value 0 when the two inputs do not match.

The OR circuit 1202a outputs the logical disjunction of the outputs from the comparators 1201a to 1201d to the selector 1203. The OR circuit 1202b outputs the logical disjunction of the outputs from the comparators 1201e to 1201h to the selector 1203. The OR circuit 1202c outputs the logical disjunction of the outputs from the comparators 1201i to 1201l to the selector 1203.

Accordingly, a control signal of 3 bits in total in which at most 1 bit becomes a logical value 1 is input to the selector 1203. The selector 1203 selects any of the pieces of output port information held in the FFs 311a to 311c in accordance with the bit position of a logical value 1, and outputs the selected information as duplicate data packet output port information.

In other words, the selector 1203 selects a value held in the FFs 311a when the output of the OR circuit 1202a is a logical value 1. On the other hand, the selector 1203 selects a value held in the FFs 311b when the output of the OR circuit 1202b is a logical value 1, and selects a value held in the FFs 311c when the output of the OR circuit 1202c is a logical value 1.

As described above, the routing table unit 711c in FIG. 25 includes a circuit for obtaining the output port information from the destination ID in the same manner as the comparative example and a circuit for obtaining the duplicate data packet output port information from the duplicate destination ID, and the configuration of the latter is the same as that of the former. The former and the latter circuits share storage elements such as the FFs 307a for holding information identifying a destination component and storage elements such as the FFs 311a for holding information identifying a port. The routing table unit 701x in FIG. 15 is configured in a manner similar to that of FIG. 25.

Here, the description returns to the explanation of FIG. 24. In step S1006d, the routing table unit 711c outputs the output port information to the comparator 1006 and the branching unit 306 and also outputs the duplicate data packet output port information to the comparator 1006 and the branching unit 1010. Note that step S1006d may be performed in parallel with steps S1004d to S1005d.

Next, in step S1007d, the comparator 1006 performs a comparison operation according to the VALID signal from the duplicate check unit 1005 and the output port information and the duplicate data packet output port information from the routing table unit 711c. The comparator 1006 outputs the comparison result to the selector 1003 and the branching unit 1010 as a selection signal.

In other words, when the VALID signal is asserted from the duplicate check unit 1005 and the output port information and the duplicate data packet output port information do not match one another, the comparator 1006 outputs a selection signal for giving an instruction to select the output from the data packet restoration unit 1002. Otherwise, the comparator 1006 outputs a selection signal for giving an instruction not to select the output from the data packet restoration unit 1002.

In other words, in the case of the above (j3), the comparator 1006 outputs a selection signal for giving an instruction to select the output from the data packet restoration unit 1002. On the other hand, in the case of the above (j1) or (j2), the comparator 1006 outputs a selection signal for giving an instruction not to select the output from the data packet restoration unit 1002.

Note that when a data packet is input, the output from the packet type check unit 1004 to the selector 1003 is an invalid value as described above, and therefore is ignored in the selector 1003. Therefore, the selector 1003 selects a packet input from the input port 201c via the signal line 1022 in FIG. 23 or a packet input from the duplicate data packet correction unit 1007 in the data packet restoration unit 1002 only in accordance with the selection signal from the comparator 1006. The selector 1003 then outputs the selected packet to the branching unit 306.

Meanwhile, the branching unit 1010 outputs data with all bits being logical values 0 when instructed not to select the output from the data packet restoration unit 1002.

Next, steps S1008d to S1010d performed in the data packet restoration unit 1002 in parallel with the above steps S1002d to S1007d are explained. Note that steps S1008d to S1010d explained below are operations in the case of the above (j3). In cases other than the above (j3), the operations of the data packet restoration unit 1002 do not affect the operations of the selector 1003 and the routing unit 713 in the subsequent stages for the following reasons.

When a request packet is input or the above (j1) holds, the output from the data packet restoration unit 1002 is not selected by the selector 1003. In addition, the comparator 1006 outputs to the branching unit 1010 a selection signal forgiving an instruction not to select the output from the data packet restoration unit 1002.

Additionally, in the case of the above (j2), restoration is performed in the data packet restoration unit 1002 in the same manner as below. However, the output from the data packet restoration unit 1002 is not transmitted to the OR circuit 1011, 1012 or 1014 via the branching unit 1010 since each bit in the output of the branching unit 1010 is a logical value 0 as described above.

Thus in the following description, operations of the data packet restoration unit 1002 are explained, focusing on the case of (j3).

In the case of the above (j3), what is output from the input port 201c in step S1001d is a data packet with duplicate information. In step S1008d, then, the data packet output from the input port 201c is output to the duplicate data packet correction unit 1007. In addition, the header of the data packet output from the input port 201c is output to the header restoration unit 1008. Furthermore, the data payload of the data packet output from the input port 201c is output to the data packet creation unit 1009.

Consequently, in step S1009d, the duplicate data packet correction unit 1007 creates a packet in which the duplicate information is deleted from the header of the input packet, and outputs the packet to the selector 1003. In other words, of the two original packets before being merged by the header merging unit 804 in FIG. 17, the duplicate data packet correction unit 1007 restores the packet first stored in the data packet storage unit 410 of the output buffer controller (e.g. 702cx).

In addition, in step S1010d, the header restoration unit 1008 creates and restores, from the input header, the header of the original data packet to be restored. In other words, of the two original packets, the header restoration unit 1008 restores the header of the packet which is input to the output buffer controller (e.g. 702cx) later and then is discarded. The header restoration unit 1008 outputs the restored header to the data packet creation unit 1009. Note that steps S1009d and S1010s may be performed in parallel.

Then in step S1011d, the data packet creation unit 1009 merges (i.e. concatenates) the header input from the header restoration unit 1008 and the data payload input via the signal line 1029 in FIG. 23, thereby creating a packet. In other words, the data packet creation unit 1009 restores, of the two original packets, the packet which is input to the output buffer controller (e.g. 702cx) later and then is discarded. The data packet creation unit 1009 outputs the restored packet to the branching unit 1010 of the routing unit 713.

As described above, in the case of the above (j3), the output from the duplicate data packet correction unit 1007 is routed via the selector 1003 and the branching unit 306, and the output from the data packet creation unit 1009 is routed via the branching unit 1010.

Moreover, in the case of the above (j3), the routing destination in the branching unit 306 and the routing destination in the branching unit 1010 are different. For that reason, there is no case in which both of the two restored packets are input to the same single OR circuit (any one of 1011 to 1013). Therefore, it is possible in the first embodiment to configure the routing unit 713 by using not selectors but OR circuits, which have a simpler configuration than selectors.

Figure 26:
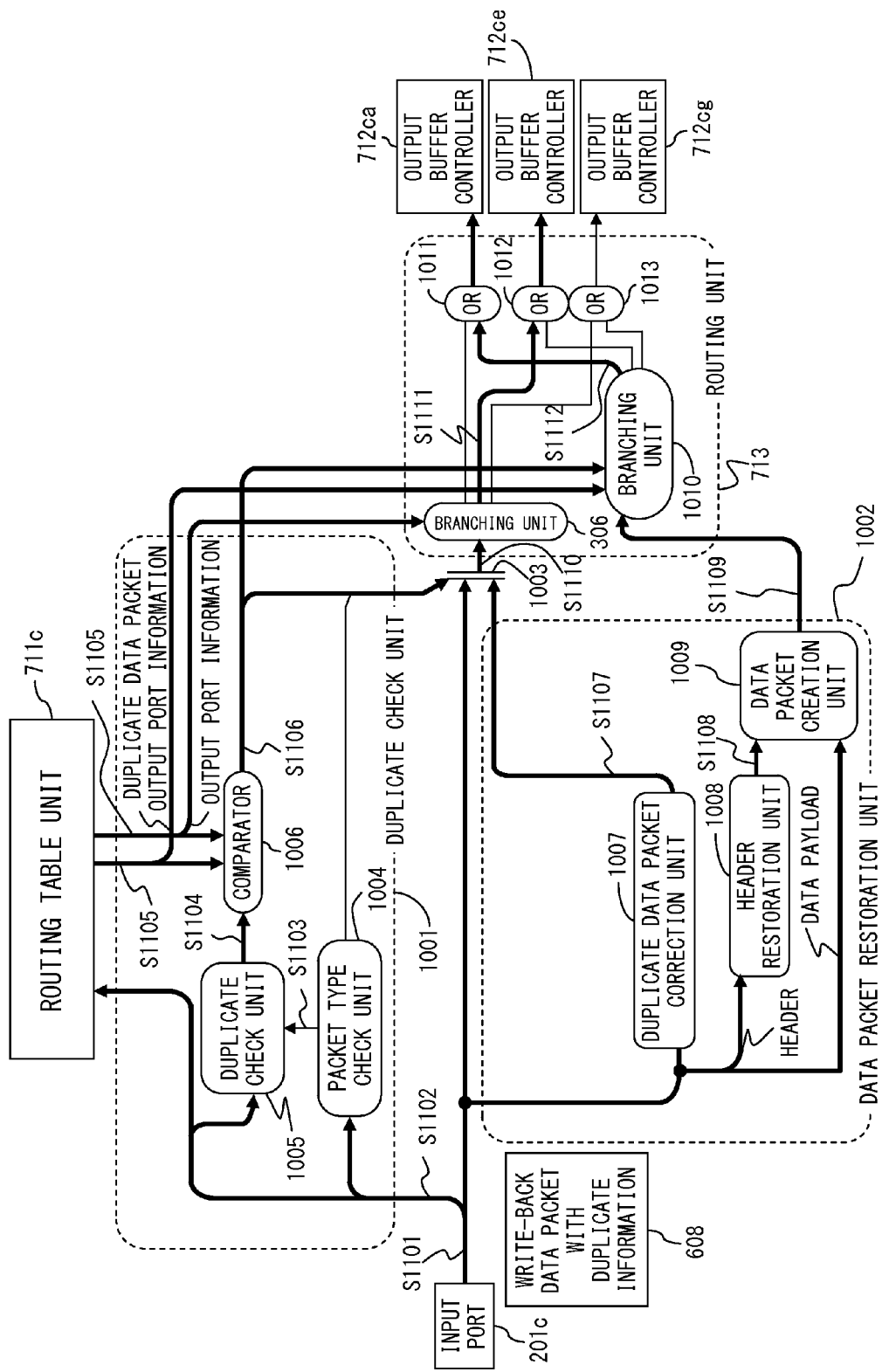
FIG. 26 is a diagram explaining a specific example of operations in which two original packets are restored from a write-back data packet including duplicate information and the two packets are routed in the first embodiment.

Next explained with reference to FIG. 26 is a specific example in which the write-back data packet 608 with duplicate information output from the output buffer controller 702cx in the SC 103c as a result of the processing in FIG. 20 to FIG. 22 is input to the input port 201c of the XB 102.

FIG. 26 is a diagram explaining the specific example of operations in which two original packets are restored from the write-back data packet 608 with duplicate information and the two packets are routed according to the first embodiment.

The write-back data packet 608 with duplicate information created by the processing in FIG. 22 is output from the input port 201c of the XB 102 in step S1101.

Then the entirety of the write-back data packet 608 with duplicate information is output to the duplicate data packet correction unit 1007. In addition, only the header of the write-back data packet 608 with duplicate information is output to the header restoration unit 1008. Furthermore, the data payload of the write-back data packet 608 with duplicate information is output to the data packet creation unit 1009.

Meanwhile, in step S1102, the values of some fields in the header of the write-back data packet 608 with duplicate information are output as below.

The value of the destination ID field and the value of the duplicate packet destination ID field are output to the routing table unit 711*c*. As illustrated in FIG. 22, the destination ID field indicates the ID of the SC 103*e*, and the duplicate packet destination ID field indicates the ID of the CPU 104*a*.

The value of the packet type field is output to the packet type check unit 1004. As illustrated in FIG. 22, the packet type field indicates being a write-back data packet.

The value of the duplicate data VALID field is output to the duplicate check unit 1005. As illustrated in FIG. 22, the value of the duplicate data VALID field is a logical value 1 denoting "being valid".

Then in step S1103, the packet type check unit 1004 encodes the input packet type, and as a result determines that the write-back data packet 608 with duplicate information input in step S1101 is a data packet. Accordingly, the packet type check unit 1004 outputs a VALID signal to the duplicate check unit 1005.

Then in step S1104, the duplicate check unit 1005 obtains the logical conjunction of the VALID signal input from the packet type check unit 1004 and the duplicate data VALID input in step S1102, and outputs it to the comparator 1006. In other words, since the value of the obtained logical conjunction is a logical value 1 in this example, the duplicate check unit 1005 outputs (asserts) a VALID signal to the comparator 1006.

In addition, as illustrated in step S1105, the routing table unit 711*c* obtains information identifying the output port 202*e* from the input destination ID (i.e., the ID of the SC 103*e*) as output port information, and outputs the output port information to the branching unit 306. In addition, the routing table unit 711*c* obtains information identifying the output port 202*a* from the input duplicate packet destination ID (i.e., the ID of the CPU 104*a*) as duplicate data packet output port information, and outputs it to the branching unit 1010.

Then in step S1106, the comparator 1006 compares the output port information and the duplicate data packet output port information, which are output from the routing table unit 711*c*. As a result, the output port information and the duplicate data packet output port information do not match, and therefore the comparator 1006 outputs a selection signal to the selector 1003 and the branching unit 1010 so that they select a packet that is output from the data packet restoration unit 1002.

Meanwhile in step S1107, the duplicate data packet correction unit 1007 restores the write-back data packet 601 in FIG. 20 by deleting the added duplicate information 607 from the header of the write-back data packet 608 with the duplicate information in FIG. 22. In the following description, in order to distinguish the original packet from the restored packet, let "609" be the reference sign of the restored write-back data packet.

The duplicate data packet correction unit 1007 outputs the restored write-back data packet 609 to the selector 1003.

The details of step S1107 are illustrated in FIG. 27. In other words, FIG. 27 is a diagram explaining a specific example of the operations of the duplicate data packet correction unit 1007 in the first embodiment.

As illustrated in FIG. 22, the duplicate information 607 is included at a predetermined position in the header (more specifically, at a position immediately before the reserved field(s) at the end of the header) of the write-back data packet 608 with duplicate information. Specifically, the duplicate information 607 includes four fields of a duplicate data VALID, a duplicate packet type, a duplicate packet destination ID, and the duplicate data state. In step S1107, the duplicate data packet correction unit 1007 creates the write-back data packet 609 by deleting the duplicate information 607 in the header of the write-back data packet 608 with duplicate information.

Here, the description returns to the explanation of FIG. 26. In step S1108, the header restoration unit 1008 creates the header of the original shared-type transfer data packet 603 illustrated in FIG. 21 from the input header, and outputs the created header to the data packet creation unit 1009.

Figure 28:
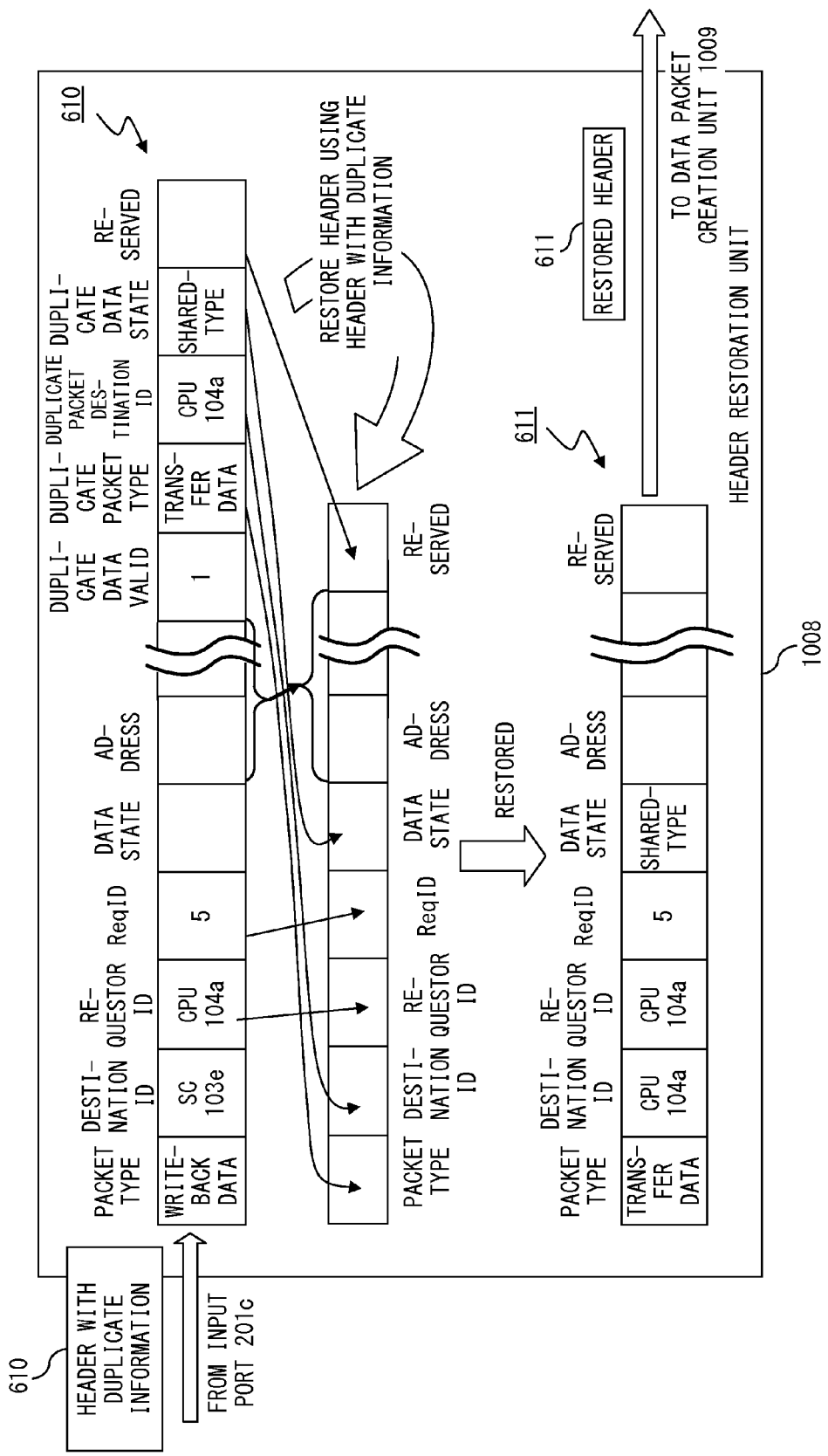
FIG. 28 is a diagram explaining a specific example of the operations of a header restoration unit in the first embodiment.

The details of step S1108 are illustrated in FIG. 28. FIG. 28 is a diagram explaining a specific example of the operations of the header restoration unit 1008 in the first embodiment.

As illustrated FIG. 28, the header restoration unit 1008 restores the header of the original shared-type transfer data packet 603 in FIG. 21 by extracting some fields in the header of the write-back data packet 608 with duplicate information and by properly rearranging the fields.

More specifically, the header restoration unit 1008 extracts each of the following fields from the header of the write-back data packet 608 with duplicate information, and arranges the fields in the order of the following list, thereby creating and restoring the header of the original shared-type transfer data packet 603. Note that the value is indicated in parentheses in the following list.

the duplicate packet type (a value that indicates being a transfer data packet)
the duplicate packet destination ID (the ID of the CPU 104*a*)
the requestor ID (the ID of the CPU 104*a*)
the ReqID (5)
the duplicate data state (a value denoting the "shared-type")
the address and other field(s) not illustrated in the drawings
the reserved field(s) at the end Here, the duplicate packet type, the duplicate packet destination ID, and the duplicate data state of the write-back data packet 608 with duplicate information are duplicates of the packet type, the destination ID, and the data state of the original shared-type transfer data packet 603.

In addition, as illustrated in FIG. 20 to FIG. 22, the original write-back data packet 601 and the original shared-type transfer data packet 603 are output from the CPU 104*c* due to the same single transfer data request packet. Therefore, the values of the three fields of the requestor ID, the ReqID, and the address are inevitably equal between the two packets. In addition, it is assumed in the first embodiment that the values of the other fields such as the reserved field(s) and those not particularly illustrated in the drawings, are also shared by the write-back data packet 601 and the shared-type transfer data packet 603.

Accordingly, the header restoration unit 1008 is able to restore the header of the shared-type transfer data packet 603 by extracting some fields in the header of the write-back data packet 608 with the duplicate information and by rearranging the fields as appropriate, as described above. The header restoration unit 1008 outputs the restored header 611 to the data packet creation unit 1009.

Here, the description returns to the explanation of FIG. 26. In step S1109, the data packet creation unit 1009 merges the restored header 611, which is output from the header restoration unit 1008, and the data payload output from the input port 201*c*. By doing this, the data packet creation unit 1009 restores the original shared-type transfer data packet 603. In the following description, in order to distinguish the original packet from the restored packet, let "613" be the reference sign of the restored shared-type transfer data packet.

Figure 29:
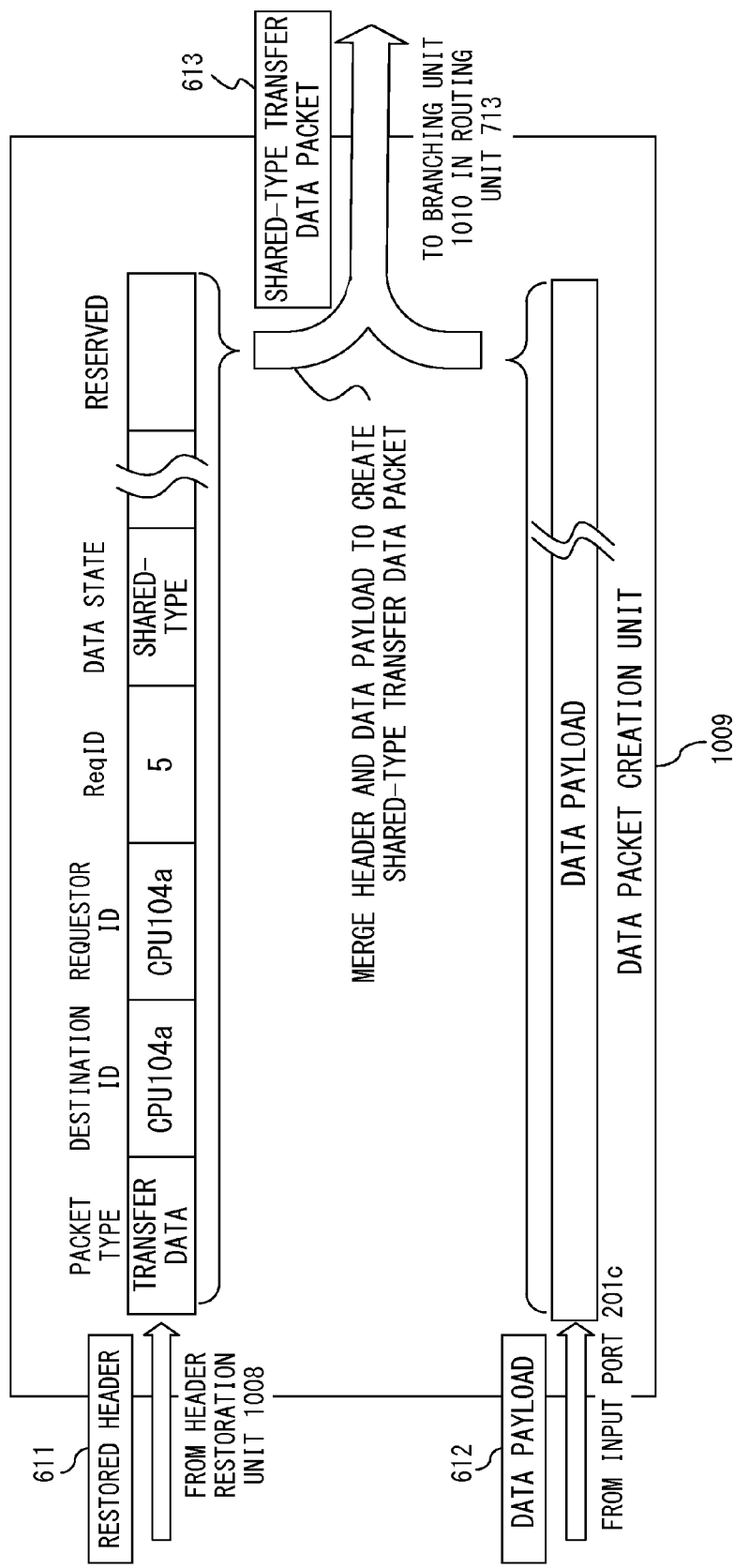
FIG. 29 is a diagram explaining a specific example of the operations of a data packet creation unit in the first embodiment.

The details of step S1109 are illustrated in FIG. 29. FIG. 29 is a diagram explaining a specific example of the operations of the data packet creation unit 1009 in the first embodiment.

As illustrated in FIG. 29, the restored header 611 and the data payload 612 are input to the data packet creation unit 1009. The data packet creation unit 1009 creates a shared-type transfer data packet 613 by appending the data payload 612 to the restored header 611, and outputs the shared-type transfer data packet 613 to the branching unit 1010.

Here, the description returns to the explanation of FIG. 26. In step S1110, the selector 1003 selects the write-back data packet 609, which is input from the duplicate data packet correction unit 1007 of the data packet restoration unit 1002 in step S1107, in accordance with the selection signal input in step S1006. The selector 1003 outputs the selected write-back data packet 609 to the branching unit 306 of the routing unit 713.

Then in step S1111, the branching unit 306 outputs the input write-back data packet 609 to the OR circuit 1012 in accordance with the output port information, which is input in step S1105.

As described above, the output port information obtained from the ID of the SC 103e, which is the destination ID of the write-back data packet 608 with duplicate information, is information identifying the output port 202e connected to the SC 103e. Therefore, the branching unit 306 outputs the input write-back data packet 609 to the OR circuit 1012 connected to the output buffer controller 712ce provided in the preceding stage of the output port 202e.

Note that the branching unit 306 outputs as many logical values 0 as the number of bits of the packet to the OR circuits which are not selected in accordance with the output port information provided from the routing table unit 711c. Meanwhile, when instructed by the comparator 1006 to select the output from the data packet restoration unit 1002, the branching unit 1010 outputs as many logical values 0 as the number of bits of the packet to the OR circuits which are not selected in accordance with the duplicate data packet output port information. In addition, as described above, the output port information and the duplicate data packet output port information are mutually exclusive in the case of the above (j3).

Accordingly, the OR circuit 1012 practically routes the write-back data packet 609 to the output buffer controller 712ce by obtaining, for each bit of the write-back data packet 609 output from the branching unit 306, the logical disjunction of the bit and a logical value 0.

As a result, the restored write-back data packet 609 is further routed to the output port 202e via the output buffer controller 712ce and then is output to the SC 103e.

Meanwhile in step S1112, the branching unit 1010 outputs the input shared-type transfer data packet 613 to the OR circuit 1011 in accordance with the duplicate data packet output port information which is input in step S1105.

As described above, the duplicate packet destination ID of the write back data packet 608 with duplicate information is the ID of the CPU 104a. Therefore, the duplicate data packet output port information obtained from the ID of the CPU 104a is information identifying the output port 202a connected to the SC 103a, which is in the same node 101a as the CPU 104a.

Accordingly, the branching unit 1010 outputs the input shared-type transfer data packet 613 to the OR circuit 1011 connected to the output buffer controller 712ca provided in the preceding stage of the output port 202a.

Here, the branching unit 306 outputs the data padded with logical values 0 to the unselected OR circuit 1011 as described above. The OR circuit 1011 therefore practically routes the shared-type transfer data packet 613 to the output buffer controller 712ca by obtaining, for each bit of the shared-type transfer data packet 613 output from the branching unit 1010, the logical disjunction of the bit and a logical value 0.

As a result, the restored shared-type transfer data packet 613 is further routed to the output port 202a via the output buffer controller 712ca and is then output to the SC 103a.

In the above description, processing of restoring the write-back data packet 609 and the shared-type transfer data packet 613 from the write-back data packet 608 with duplicate information and respectively routing them is explained with reference to FIG. 26 to FIG. 29.

Note that in FIG. 26, processing of some steps may be performed in parallel. For example, the processing in the duplicate check unit 1001 and the processing in the routing table unit 711c may be performed in parallel with the processing in the data packet restoration unit 1002. In addition, the routings in step S1111 and S1112 may be performed in parallel.

Meanwhile, as illustrated in FIG. 15, the duplicate check unit 1001, the data packet restoration unit 1002, and the selector 1003, which are similar to the above, are provided on the route from the input port 501x connected to the XB 102 to the routing unit 703 in each of the SCs 103a to 103g. In addition, compared with the comparative example, the routing unit 703 of SC 103c in FIG. 15 is different in a portion corresponding to the input port 501x.

More specifically, similarly to FIG. 23, an OR circuit is provided in the routing unit 703 between the branching unit 306, which is similar to that of the comparative example, and each of the output buffer controllers 509xc, 509xd, 509xi and 509xs, which are similar to those of the comparative example. In other words, compared with the comparative example, four OR circuits are newly added.

The routing unit 703 also includes a new branching unit similar to the branching unit 1010 of FIG. 23. This new branching unit receives a restored packet from the data packet restoration unit 1002 provided correspondingly to the input port 501x and also receives control signals from the duplicate check unit 1001 and the routing table unit 701x. This new branching unit is in addition connected to each of the above four OR circuits in a manner similar to that in FIG. 23.

However, in the routing unit 703, the portions corresponding to the input ports 501c, 501d, and 501i and to the intra-SC control circuit 504 are the same as those of the comparative example.

In the above description, the first embodiment is explained with reference to FIG. 14 to FIG. 29.

The first embodiment is summarized below, focusing on a controller such as the SC 103c that controls the transfer of data (e.g. data in a packet format) between a processor such as the CPU 104c and a data transfer device such as the XB 102.

In other words, the above controller includes storage means such as the data packet storage unit 410 for storing a first packet output from the processor. In the first embodiment, the capacity required for the data packet storage unit 410 serving as the storage means is approximately half of the comparative example as described above.

In addition, the above controller includes for example the management table unit 801, the comparator unit 802, and the write pointer controller 803 illustrated in FIG. 17 to FIG. 18B as components for realizing first determination means. The first determination means compares the header of the first packet with the header of a second packet received from the processor after the first packet. The packet is a specific example of data and the header is a specific example of control information of the data. According to the above comparison, the first determination means determines whether a first case in which the first packet and the second packet include the same data payload holds or not. The data payload is a specific example of the data body.

The management table unit 801, the comparator unit 802, and the write pointer controller 803 also cooperatively function as the following management means. That is, in the first case, the management means stores a portion of the header of the second packet as duplicate information in association with the first packet. In addition, the management means may discard the second packet in the first case. On the other hand, the management means causes the data packet storage unit 410 serving as the storage means to store the second packet in a second case other than the first case.

In the first embodiment, for example the following components cooperate as control means for controlling the output of a packet stored in the storage means to the data transfer device (e.g. the XB 102). That is, at least the interport arbiter unit 507x, the interport selector 508x, the controller 400, and the inter-packet selector 430 in FIG. 17 cooperate as the control means for controlling the output of a packet to the XB 102. In addition, in the first embodiment, the selector 805 also functions as a part of the control means. The output of data (e.g., a packet) to the XB 102 serving as the data transfer device may be controlled in accordance with an output permission for permitting output of the data to the data transfer device.

Note that in the first embodiment, the header merging unit 804 also functions as creation means for creating in the first case a third packet such as the write-back data packet 608 with duplicate information in FIG. 22.

In addition, in the first case, the management table unit 801 and the selector 805 in the controller 400 that functions as the above control means perform a control to output the third packet created by the header merging unit 804 serving as the creation means to the data transfer device. On the other hand, in the second case, the management table unit 801 and the selector 805 serving as the above control means perform a control to output both the first packet and the second packet stored in the data packet storage unit 410 serving as the storage means to the data transfer device.

In addition, in the first embodiment, the management table unit 801, the comparator unit 802, and the write pointer controller 803 serving as the first determination means perform determination according to a requestor ID and a ReqID. The requestor ID is an example of requestor identification information for identifying a requestor device that outputs a request that causes the output of a packet(s). The ReqID is an example of request identification information for identifying plural requests in the single requestor device identified by the requestor identification information.

In addition, the management table unit 801 that functions as a part of the above management means includes a management memory unit realized by, for example, entries 901-0 to 901-N in FIG. 18A. In the first case, the management table unit 801 serving as the management means associates the duplicate information with the first packet by storing the duplicate information in an entry in the management memory unit associated with an address of the data packet storage unit 410 where the above first packet is stored.

In addition, the controller such as the SC 103c may further include the duplicate check unit 1001 serving as second determination means and the data packet restoration unit 1002 serving as restoration means as illustrated in FIG. 15.

The first embodiment is also summarized as below, focusing on a data transfer device such as the XB 102.

In other words, the data transfer device such as the XB 102 is coupled to plural devices such as the SCs 103a to 103g, for example, and transfers data among those plural devices.

The data transfer device includes a routing unit 713 illustrated in FIG. 16 and FIG. 23 as transmission means for transmitting (i.e. routing) a packet output from one of the plural devices toward another one of the plural devices.

Each of the output buffer controllers in the XB 102 illustrated in FIG. 16 includes respective components which function as the storage means, the determination means, the management means, and the control means in the same sense as in the above explanation from a perspective focusing on the SC. In addition, in the first embodiment, the header merging unit 804 serving as the creation means is also included in each of the output buffer controllers in the XB 102.

Moreover, as illustrated in FIG. 16 and FIG. 23, the XB 102 includes the duplicate check unit 1001 serving as the determination means for determining whether or not the input packet is a duplicate data packet created from two packets including the same data payload. The XB 102 also includes the data packet restoration unit 1002 serving as the restoration means. The routing unit 713 serving as the transmission means transmits data (specifically, routes a packet) according to the determination of the duplicate check unit 1001.

More specifically, in the first embodiment, the duplicate check unit 1001 serving as the determination means determines whether the two original packets are to be transmitted to the same device or not, in addition to determining whether or not the input packet is a duplicate data packet.

When the duplicate check unit 1001 determines that the two original packets are to be transmitted (i.e. routed) to the same device, the routing unit 713 serving as the transmission means transmits the input duplicate data packet itself. On the other hand, when the duplicate check unit 1001 determines that the two original packets are not to be transmitted to the same device, the routing unit 713 serving as the transmission means transmits the two restored original packets toward the respective destinations.

In the above description, the first embodiment is summarized from a perspective focusing on the SC 103a to 103g serving as controllers and from a perspective focusing on the XB 102 serving as the data transfer device.

Next, the second embodiment is explained with reference to FIG. 30. Similarly to the first embodiment, the second embodiment is also applied to the server system 100 configured as in FIG. 1, for example.

FIG. 30 is a configuration diagram of the CPU 104c in the second embodiment. In order to simplify the explanation, it is assumed in the second embodiment that the other CPUs 104a, 104b and 104d to 104h are also configured in a manner similar to that in FIG. 30.

The CPU 104c in the second embodiment is a multi-core CPU, or more specifically is a dual-core CPU. In other words, the CPU 104c, which is a processor, includes CPU cores 1301a and 1301b, which are processing units. Each of the CPU cores 1301a and 1301b includes an instruction fetch control unit, a branch prediction unit, an instruction decoding unit, an instruction execution unit such as an ALU (Arithmetic Logic Unit), and registers, etc., none of which are illustrated in the drawings. Depending on the architectures, the CPU cores 1301a and 1301b may further include a reservation station for out-of-order execution.

Each of the CPU cores 1301a and 1301b includes a cache memory, which is not illustrated in the drawings. The cache memory may be hierarchized. For example, an L1 (level 1) cache is individually provided to each of the CPU cores 1301a and 1301b, and an L2 (level 2) cache may be shared by both of the CPU cores 1301a and 1301b. A configuration in which the L2 cache is individually provided to each of the CPU cores 1301a and 1301b is also possible. Note that a data cache and an instruction cache may be separated.

The CPU 104c includes an input port 1302 and an output port 1303 as interfaces with the SC 103c, which is in the same node 101c. The input port 1302 and the output port 1302 may perform, for example, frequency conversion called "frequency switching" in accordance with the difference in the operation frequency between the CPU 104c and the SC 103c.

In the first embodiment, the ID of the CPU 104c is used as a destination ID and a requestor ID of packets. However, in the second embodiment, the ID of the CPU core 1301a or the CPU core 1301b, rather than the ID of the CPU 104c, is used as the destination ID and the requestor ID. Accordingly, the CPU 104c has a circuit to sort a packet input from the SC 103c via the input port 1302 into the CPU core 1301a or 1301b in accordance with the destination ID.

Meanwhile, in the first embodiment, a pair of data packets having the same data payload is assumed to be a write-back data packet addressed to one of the SCs and a shared-type transfer data packet addressed to one of the CPUs. The first embodiment is also applicable to a case in which there is a pair of data packets which have the same data payload and whose combination is other than the above according to the specification of the server system 100. In a similar manner, the second embodiment is also applicable to a case in which there is a pair of data packets which are addressed to two different CPU cores and which have the same data payload.

This is because in the second embodiment, the above-mentioned circuit to sort a packet includes the following components.

The duplicate check unit 1001, the data packet restoration unit 1002, and the selector 1003, which are similar to those in FIG. 23

A routing table unit 1304 which has a configuration similar to that of the routing table unit 711c in FIG. 25, and which obtains, for each of the destination ID and the duplicate destination ID, information for designating a CPU core (1301a or 1301b) at an output destination instead of designating an output port A branching unit 1305a similar to the branching unit 1010 in FIG. 23

A branching unit 1305b similar to the branching unit 306 in FIG. 23

OR circuits 1306a to 1306b similar to the OR circuits 1011 to 1013 in FIG. 23

Accordingly, if a packet input from the input port 1302 does not have duplicate information, the packet is output to the CPU core 1301a or 1301b in accordance with its destination ID. On the other hand, if a packet input from the input port 1302 has duplicate information, the two original packets are restored, and one is output to the CPU core 1301a while another is output to the CPU core 1301b.

The CPU 104c also includes an output buffer controller 1307a for the CPU core 1301a, an output buffer controller 1307b for the CPU core 1301b, an arbiter unit 1308, and an inter-core selector 1309 in the preceding stage of the output port 1303.

The output buffer controller 1307a includes a buffer for temporarily storing a packet(s) output from the CPU core 1301a, and more specifically has a configuration similar to that of the output buffer controller 702cx in FIG. 17 in the first embodiment. This also holds with respect to the output buffer controller 1307b, similarly.

The arbiter unit 1308 performs arbitration between the output buffer controller 1307a and 1307b. The arbiter unit 1308 is similar to for example the interport arbiter unit 507x in FIG. 15 and the interport arbiter unit 205e in FIG. 16 of the first embodiment.

The inter-core selector 1309 selects one of the outputs from the output buffer controller 1307a and 1307b in accordance with the arbitration result of the arbiter unit 1308, and outputs the selected one to the output port 1303. The inter-core selector 1309 is similar to for example the interport selector 508x in FIG. 15 and the interport selector 206e in FIG. 16 in the first embodiment.

In addition, the XB 102 in the second embodiment is configured in the same manner as the XB 102 in FIG. 16 in the first embodiment.

The SC 103c in the second embodiment is different from that in the first embodiment in the following points. More specifically, the SC 103c connected to the CPU 104c in FIG. 30 includes the duplicate check unit 1001, the data packet restoration unit 1002, and the selector 1003, which are similar to those in FIG. 23, between the input port 501c and the routing unit 703 in FIG. 15. In addition, the routing table unit 506c corresponding to the CPU 104c is replaced with another whose configuration is similar to that of the routing table unit 701x.

Note that CPUs other than the CPU 104c may be configured in the same manner as in FIG. 30, and the components in each SC may be properly modified accordingly.

The above second embodiment also achieves the advantages that the buffer capacity for temporarily storing packets used for transmitting and receiving data within the server system 100 is reduced and occupancy time of the buses within the server system 100 is shortened.

Note that the present invention is not limited to the above embodiments, but various modifications may be implemented as provided below, for example.

The first and second embodiments are examples of application to the server system 100 whose configuration is illustrated in FIG. 1. However, the number of nodes included in the server system 100 and the number of CPUs in each node are arbitrary.

Although the server system 100 is also an example of a ccNUMA (Cache Coherent Non-Uniform Memory Access) system, the configurations that are similar to those in the first and second embodiments may be applied to an SMP (Symmetric Multiple Processor) system (i.e., a UMA (Uniform Memory Access) system).

Moreover, in the first embodiment, the information in the header of the data packet that is received first is stored in the requestor ID field 915 and the ReqID field 916 in any of the entries 901-0 to 901-N in FIG. 18A. However, an embodiment is also possible in which the requestor ID field 915 and the ReqID field 916 are omitted, and instead the comparator unit 802 in FIG. 18B reads out the requestor ID and the ReqID from the data packet storage unit 410. Note that, in a case in which the data packet storage unit 410 is realized by using RAM, however, it is more preferable in terms of processing speed to provide the requestor ID field 915 and the ReqID field 916 by using FFs in each of the entries 901-0 to 901-N in the management table unit 801.

Meanwhile, if a bus occupancy time equivalent to that of the comparative example is not problematic, the output buffer controller 702cx in FIG. 17, for example, may be modified as below. That is, when an output permission from the interport arbiter unit 507x is obtained, the output buffer controller 702cx may output the two original packets sequentially instead of creating a data packet with duplicate information in the header merging unit 804 in FIG. 17 and outputting it.

For example, the output buffer controller 702cx first outputs the first packet stored at an address designated by the read pointer value in the data packet storage unit 410. In addition, the output buffer controller 702cx reads out the duplicate information from an entry in the management table unit 801 corresponding to the address of the first packet. The output buffer controller 702cx then restores the second packet, which was discarded because it included the same data payload as that of the first packet, from the read duplicate information and the first packet, and outputs the second packet.

Realizing the restoration of the second packet is enabled by providing for example a new component similar to the data packet creation unit 1009 in FIG. 23 instead of the header merging unit 804. In addition, the management table unit 801 in FIG. 17 instructs the selector 805 to output the first packet from the data packet storage unit 410, and after a necessary period of time, switches the instruction so as to output the second packet from the above-mentioned new component.

The above modification is not limited to the output buffer controller 702cx in the SC 103c, but may be made in the output buffer controllers in the XB 102.

Furthermore, in a case in which a packet is restored when being output from the output buffer controller as described above, it is unnecessary to provide the duplicate check unit 1001, the data packet restoration unit 1002, and the selector 1003 in FIG. 15 and FIG. 16. In addition, the routing unit 505 in FIG. 10 in the comparative example may be used instead of the routing unit 703 in FIG. 15, and the routing unit 203 in FIG. 5 in the comparative example may be used instead of the routing unit 713 in FIG. 16.

Also in the modification in which a packet is restored as described above when being output from the output buffer controller, the storage capacity required in the output buffer controller is approximately half of that of the comparative example, and for that reason, an advantage of reduction in the power consumption and the mount area on the semiconductor chips is achieved.

Furthermore, although an example of a dual-core CPU is exemplified in the second embodiment in FIG. 30, an embodiment in which the second embodiment is modified in accordance with a multi-core CPU with three or more cores is also possible, and an embodiment in which a single-core CPU includes an output buffer controller in a manner similar to that in FIG. 30 is also possible.

When an output buffer controller is provided inside of the single-core CPU, the arbiter unit 1308 and the inter-core selector 1309 as in FIG. 30 are not needed in the CPU, and the output buffer controller in the CPU may be directly connected to the output port of the CPU. In addition, in the single-core CPU, the input port 1302 may be directly connected to the core.

In addition, even for a case of the multi-core CPU, the second embodiment in FIG. 30 may be modified as below if there is no case in which packets having the same data payload are output while being addressed to plural cores.

More specifically, the input port 1302 may be directly connected to the branching unit 1305b, and the branching unit 1305b may be directly connected to the CPU cores 1301a and 1301b. In such a case, the branching unit 1305b may be a one-input/two-output demultiplexer.

Furthermore, in such a case, the duplicate check unit 1001, the data packet restoration unit 1002, the selector 1003, the branching unit 1305a, the OR circuit 1306a, and the OR circuit 1306b in FIG. 30 are omissible. In addition, the routing table unit 1304 may be replaced with one which only obtains the output port information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A controller that controls data transfer between a processor and a data transfer device, the controller comprising:
a storage unit that stores first data, including first control information and a first data body, that are outputted from the processor;
a first determination unit that
compares the first control information included in the first data and second control information included in second data, that also include a second data body, received from the processor after the first data are received from the processor, and
determines whether a first case, in which the first data body matches the second data body, holds true;
a management unit that
stores a portion of the second control information as duplicate information in the first case, and
stores the second data in the storage unit in a second case when the first case is not true; and
a control unit that controls output of data stored in the storage unit to the data transfer device.

2. The controller according to claim 1, wherein the first determination unit determines that the first case holds when one of the first data and the second data is for writing information stored in a memory unit provided in the processor to a memory device coupled to the controller, and another one of the first data and the second data is for transferring the information stored in the memory unit and requested by an other processor.

3. The controller according to claim 1,
further comprising: a creation unit that creates third data from the first data stored in the storage unit and the duplicate information stored in the management unit in the first case,
wherein the control unit outputs the third data created by the creation unit to the data transfer device in the first case, and outputs both the first data and the second data stored in the storage unit to the data transfer device in the second case.

4. The controller according to claim 1,
wherein the first and second control information in the first and second data, respectively, both include
requestor identification information for identifying a requestor device that outputs a request that causes an output of data from the processor, and
request identification information for identifying requests in the single requestor device identified by the requestor identification information, and
wherein the first determination unit determines that the first and second data bodies of the first data and the second data match when the requestor identification information in the first control information of the first data and the requestor identification information in the second control information of the second data are equal, and the request identification information in the first control information of the first data and the request identification information in the second control information of the second data are equal.

5. The controller according to claim 1, wherein the management unit includes a management memory unit that stores the duplicate information in any of its entries associated with an address of the storage unit where the first data is stored.

6. The controller according to claim 1,
wherein when the first data is outputted from the processor, the management unit stores a portion of the first control information of the first data, and
wherein the first determination unit refers to the portion of the first control information of the first data stored in the management unit and uses the portion in a comparison with the second control information of the second data.

7. The controller according to claim 1, further comprising:
a second determination unit that determines, from third control information of third data outputted from the data transfer device to the controller, whether the third data are created based on fourth and fifth data including a same data body;
a restoration unit that restores the fourth and fifth data from the third data when the second determination unit determines that the third data are created based on the fourth and fifth data; and
a transmission unit that transmits the fourth and fifth data restored by the restoration unit.

8. The controller according to claim 1, wherein the management unit discards the second data in the first case.

9. A data transfer device that is coupled to devices and that transfers data among the devices, the data transfer device comprising:
a transmission unit that transmits data outputted from any one of the devices toward another one of the devices;
a storage unit that stores first data, including first control information and a first data body, that are received from a first device and that are to be transmitted to a second device, before the first data are outputted to the second device;
a first determination unit that
compares second control information included in second data, that also include a second data body and are received from the first device and transmitted by the transmission unit to the second device after the first data are transmitted by the transmission unit with the first control information, and
determines whether a first case, in which the first data body matches the second data body, holds true;
a management unit that
stores a portion of the second control information as duplicate information in the first case, and
stores the second data in the storage unit in a second case when the first case is not true; and
a control unit that controls output of data stored in the storage unit to the second device.

10. The data transfer device according to claim 9,
further comprising: a creation unit that creates third data from the first data stored in the storage unit and the duplicate information stored in the management unit in the first case,
wherein the control unit outputs the third data created by the creation unit to the second device in the first case, and the control unit outputs both the first data and the second data stored in the storage unit to the second device in the second case.

11. The data transfer device according to claim 9,
further comprising:
a second determination unit that determines whether the first data are duplicate data created from third data to be transmitted to the second device and fourth data that include a same data body as the third data, from the first control information of the first data; and
a restoration unit that restores the third and fourth data from the first data when the first data are the duplicate data, and
wherein the transmission unit transmits the third and fourth data that are restored by the restoration unit, or transmits the first data, according to a determination by the second determination unit.

12. The data transfer device according to claim 11,
wherein the second determination unit further determines whether a third case, in which the fourth data are to be transmitted to the second device, holds true when the first data are the duplicate data,
wherein the transmission unit transmits the first data toward the second device when the second determination unit determines that the third case holds true, and
wherein the transmission unit transmits the third and fourth data restored by the restoration unit toward respective destinations when the first data are the duplicate data and when the second determination unit determines that the third case does not hold true.

13. The data transfer device according to claim 11, wherein the restoration unit includes: a duplicate data correction unit that restores the third data from the first data by deleting a portion of the first control information of the first data.

14. The data transfer device according to claim 11, wherein the restoration unit includes:
a control information restoration unit that restores fourth control information of the fourth data from the first control information of the first data; and
a data creation unit that restores the fourth data by concatenating the fourth control information of the fourth data restored by the control information restoration unit to the first data body.

15. The data transfer device according to claim 11,
wherein the fourth data are for writing information stored in a memory unit provided in a first processor coupled to the first device to a memory device coupled to a third device, and the third data are for transferring stored information stored in the memory unit to a second processor that is coupled to the second device and that requests the stored information stored in the memory unit, or
wherein the third data are for writing information stored in the memory unit to a memory device coupled to the second device, and the fourth data are for transferring the stored information stored in the memory unit to a third processor that is coupled to the third device and that requests the stored information stored in the memory unit.

16. A control method of an information processing device that includes controllers each connected to a processor and a data transfer device that transfers data among the controllers, the control method comprising:
outputting first data and second data from the processor of any of the controllers to a corresponding controller connected thereto;
receiving the first data by the corresponding controller;
receiving the second data by the corresponding controller after receiving the first data;

comparing first control information of the first data and second control information of the second data by the corresponding controller;

determining whether a first case in which the first data and the second data include a same data body holds true according to a result of the comparing by the corresponding controller;

creating, in the first case, third data from the first data and a portion of the second control information of the second data by the corresponding controller;

outputting the third data from the corresponding controller to the data transfer device;

determining whether the first case holds true according to third control information of the third data by the data transfer device;

determining whether destinations of the first data and the second data are identical according to the third control information of the third data, by the data transfer device;

transmitting the third data from the data transfer device to a same destination when the destinations of the first data and the second data are identical;

restoring the first data and the second data from the third data according to the third control information of the third data when the destinations of the first data and the second data are different, by the data transfer device; and transmitting the restored first data and the restored second data from the data transfer device with one of the controllers being the destination of the first data and another one of the controllers bing the destination of the second data, both controllers being other than the corresponding controller, according to the third control information of the third data when the destinations of the first data and the second data are different.

17. The control method of the information processing device according to claim 16, further comprising:

outputting both the first data and the second data from the corresponding controller to the data transfer device in a second case when the first case is not true;

transmitting the first data from the data transfer device to one of the controllers, other than the corresponding controller, according to the first control information of the first data in the second case; and transmitting the second data from the data transfer device to one of the controllers, other than the corresponding controller, according to the second control information of the second data in the second case.

18. The control method of the information processing device according to claim 17, further comprising: discarding the second data at the corresponding controller in the first case.

* * * * *

UNITED STATES PATENT AND TRADEMARK OFFICE
CERTIFICATE OF CORRECTION

| | |
|---|---|
| PATENT NO. | : 8,375,152 B2 |
| APPLICATION NO. | : 13/097500 |
| DATED | : February 12, 2013 |
| INVENTOR(S) | : Yoshihiro Kitahara |

It is certified that error appears in the above-identified patent and that said Letters Patent is hereby corrected as shown below:

In the Claims:

Column 70, Line 4, In Claim 16, delete "bing" and insert -- being --, therefor.

Signed and Sealed this
Twenty-first Day of May, 2013

Teresa Stanek Rea
*Acting Director of the United States Patent and Trademark Office*